(12) United States Patent
Ichii

(10) Patent No.: US 8,773,489 B2
(45) Date of Patent: Jul. 8, 2014

(54) OPTICAL SCANNING APPARATUS AND IMAGE FORMING APPARATUS

(71) Applicant: Daisuke Ichii, Kanagawa (JP)

(72) Inventor: Daisuke Ichii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/676,336

(22) Filed: Nov. 14, 2012

(65) Prior Publication Data

US 2013/0127973 A1 May 23, 2013

(30) Foreign Application Priority Data

Nov. 21, 2011 (JP) ................... 2011-253402

(51) Int. Cl.
*B41J 2/385* (2006.01)
*B41J 15/14* (2006.01)
*B41J 27/00* (2006.01)

(52) U.S. Cl.
USPC ........... 347/259; 347/137; 347/243; 347/244; 347/261

(58) Field of Classification Search
USPC ......... 347/111, 112, 129, 134, 137, 224, 225, 347/233, 241, 243, 244, 256, 258, 259, 260, 347/261
See application file for complete search history.

(56) References Cited

U.S. PATENT DOCUMENTS

| | | | |
|---|---|---|---|
| 5,805,199 A | 9/1998 | Aoki | |
| 2005/0099663 A1 | 5/2005 | Hayashi | |
| 2006/0285187 A1 | 12/2006 | Ichii et al. | |
| 2007/0211324 A1 | 9/2007 | Sakai et al. | |
| 2007/0211325 A1 | 9/2007 | Ichii | |
| 2007/0253047 A1 | 11/2007 | Ichii et al. | |
| 2007/0253048 A1 | 11/2007 | Sakai et al. | |
| 2008/0024849 A1 | 1/2008 | Hayashi et al. | |
| 2008/0025759 A1 | 1/2008 | Ichii et al. | |
| 2008/0055672 A1 | 3/2008 | Watanabe et al. | |
| 2008/0055692 A1 | 3/2008 | Saisho et al. | |
| 2008/0068690 A1 | 3/2008 | Ichii | |
| 2008/0068693 A1 | 3/2008 | Hayashi et al. | |
| 2008/0100895 A1 | 5/2008 | Hayashi et al. | |
| 2008/0123159 A1 | 5/2008 | Hayashi et al. | |
| 2008/0174843 A1* | 7/2008 | Masuda et al. | ................ 359/201 |
| 2008/0192319 A1 | 8/2008 | Miyatake et al. | |
| 2008/0204842 A1 | 8/2008 | Arai et al. | |

(Continued)

FOREIGN PATENT DOCUMENTS

| | | |
|---|---|---|
| JP | 6-123844 | 5/1994 |
| JP | 9-138363 | 5/1997 |

(Continued)

*Primary Examiner* — Alessandro Amari
*Assistant Examiner* — Kendrick Liu
(74) *Attorney, Agent, or Firm* — Oblon, Spivak, McClelland, Maier & Neustadt, L.L.P.

(57) ABSTRACT

An optical scanning apparatus for scanning a target surface using a plurality of light beams simultaneously along a first direction of the target surface. The apparatus has a light source having a plurality of light emitting elements; an optical deflector to deflect the plurality of light beams coming from the light source; and a scanning optical system to guide the plurality of light beams deflected by the optical deflector to the target surface. The scanning optical system includes a lens, disposed after the optical deflector, having the strongest power in a second direction perpendicular to the first direction. A plurality of scan lines, corresponding to the plurality of light beams deflected by the optical deflector, intersect or contact each other at an optical face of the lens.

9 Claims, 47 Drawing Sheets

(56) References Cited

U.S. PATENT DOCUMENTS

| | | |
|---|---|---|
| 2008/0212999 A1 | 9/2008 | Masuda et al. |
| 2008/0247021 A1 | 10/2008 | Ichii |
| 2008/0266633 A1 | 10/2008 | Hirakawa et al. |
| 2008/0267663 A1 | 10/2008 | Ichii et al. |
| 2009/0060582 A1 | 3/2009 | Ichii et al. |
| 2009/0065685 A1 | 3/2009 | Watanabe et al. |
| 2009/0175657 A1 | 7/2009 | Yoshii et al. |
| 2009/0195849 A1 | 8/2009 | Ichii et al. |
| 2009/0295900 A1 | 12/2009 | Ichii |
| 2009/0315967 A1 | 12/2009 | Hayashi et al. |
| 2010/0060712 A1 | 3/2010 | Sato et al. |
| 2010/0183337 A1 | 7/2010 | Kubo et al. |
| 2010/0195681 A1 | 8/2010 | Tatsuno et al. |
| 2010/0214633 A1 | 8/2010 | Sato et al. |
| 2011/0052263 A1* | 3/2011 | Tatsuno et al. ............... 399/221 |
| 2011/0141217 A1 | 6/2011 | Ichii |
| 2011/0199454 A1 | 8/2011 | Ichii |
| 2011/0205325 A1 | 8/2011 | Ichii |
| 2011/0221857 A1 | 9/2011 | Tatsuno et al. |
| 2012/0044315 A1 | 2/2012 | Shibayama et al. |

FOREIGN PATENT DOCUMENTS

| | | |
|---|---|---|
| JP | 9-274152 | 10/1997 |
| JP | 2000-267031 | 9/2000 |
| JP | 2005-092129 | 4/2005 |
| JP | 2006-103248 | 4/2006 |
| JP | 2007-025165 | 2/2007 |
| JP | 2010-164813 | 7/2010 |

* cited by examiner

FIRST SCAN LENS

|   | OPTICAL PLANE AT INCIDENCE SIDE | OPTICAL PLANE AT EXIT SIDE |
|---|---|---|
| Ry | −167.982mm | −68.172mm |
| K | — | — |
| A | $4.056003 \times 10^{-7}$ | $4.737715 \times 10^{-7}$ |
| B | $9.619422 \times 10^{-11}$ | $1.070403 \times 10^{-10}$ |
| C | $-1.162474 \times 10^{-13}$ | $2.308141 \times 10^{-15}$ |
| D | $3.339705 \times 10^{-17}$ | $-1.438722 \times 10^{-17}$ |
| E | $-3.402134 \times 10^{-21}$ | $3.148794 \times 10^{-21}$ |
| Rz | −75.124mm | −184.015mm |
| a | — | $6.907164 \times 10^{-6}$ |
| b | — | $-2.356390 \times 10^{-6}$ |
| c | — | $-2.575996 \times 10^{-10}$ |
| d | — | $-3.01512 \times 10^{-9}$ |
| e | — | $-3.402947 \times 10^{-13}$ |
| f | — | $8.098388 \times 10^{-13}$ |

FIG. 15

SECOND SCAN LENS

|   | OPTICAL PLANE AT INCIDENCE SIDE | OPTICAL PLANE AT EXIT SIDE |
|---|---|---|
| Ry | −1978mm | 761.314mm |
| K | − | − |
| A | $7336778 \times 10^{-8}$ | $-6.267788 \times 10^{-8}$ |
| B | $-2.104869 \times 10^{-12}$ | $6.643522 \times 10^{-12}$ |
| C | $-4.926925 \times 10^{-16}$ | $-8.072230 \times 10^{-16}$ |
| D | $3.210575 \times 10^{-20}$ | $3.407595 \times 10^{-20}$ |
| E | $-5.445485 \times 10^{-25}$ | $-4.591071 \times 10^{-25}$ |
| Rz | 82.483mm | −65.295mm |
| a | $-1.050430 \times 10^{-6}$ | $-1.830049 \times 10^{-6}$ |
| b | $-2.973053 \times 10^{-7}$ | $5.231767 \times 10^{-7}$ |
| c | $-3.922934 \times 10^{-11}$ | $-2.865882 \times 10^{-11}$ |
| d | $-2.092126 \times 10^{-11}$ | $-4.166906 \times 10^{-11}$ |
| e | − | $4.954106 \times 10^{-16}$ |
| f | − | $-1.440279 \times 10^{-15}$ |
| g | − | $-6.406647 \times 10^{-20}$ |
| h | − | $5.035779 \times 10^{-20}$ |

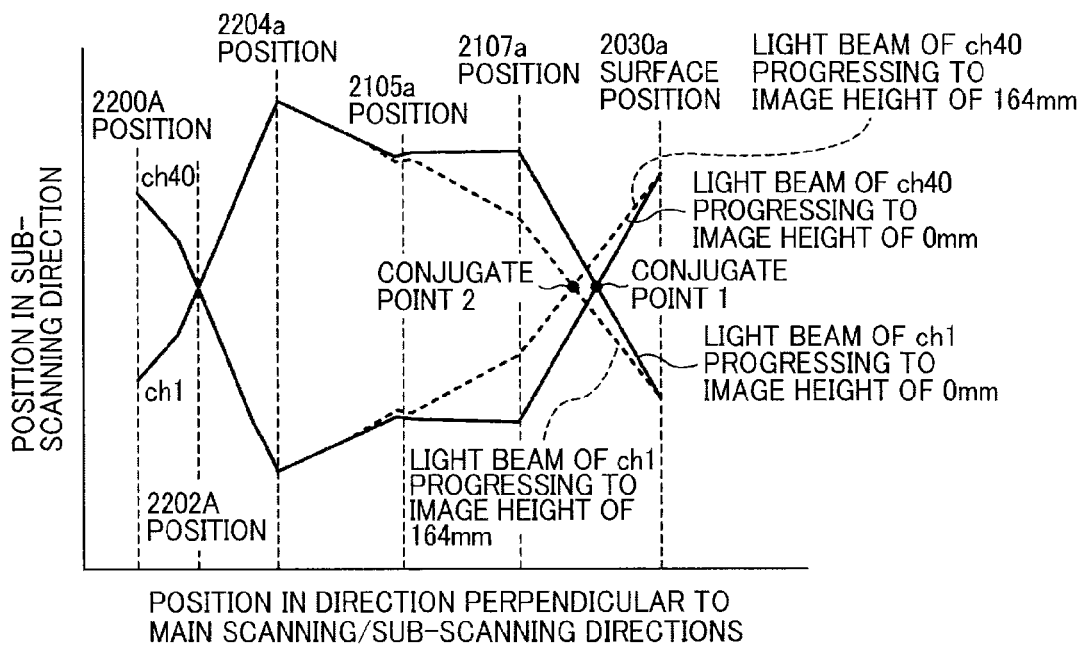
FIG. 21A (COMPARISON EXAMPLE 1)
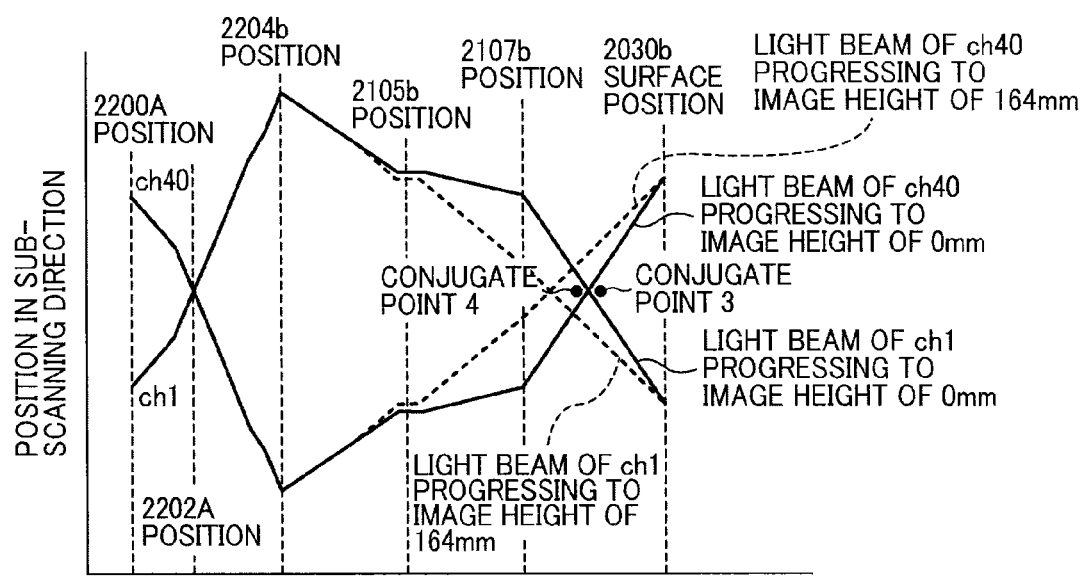
FIG. 21B (COMPARISON EXAMPLE 1)

(COMPARISON EXAMPLE 2)

(COMPARISON EXAMPLE 2)

(MODIFIED EXAMPLE 1)
2ch 600dpi
(PHOTOCONDUCTOR 2030a)

(MODIFIED EXAMPLE 1)
2ch 600dpi
(PHOTOCONDUCTOR 2030b)

(COMPARISON EXAMPLE 3)

(COMPARISON EXAMPLE 3)

(COMPARISON EXAMPLE 4)
2ch 600dpi (COMPARISON EXAMPLE 4)
2ch 600dpi (COMPARISON EXAMPLE 5)
4ch 1200dpi (COMPARISON EXAMPLE 5)
4ch 1200dpi (COMPARISON EXAMPLE 6)
4ch 1200dpi (PHOTOCONDUCTOR 2030a)

(COMPARISON EXAMPLE 6)
4ch 1200dpi (PHOTOCONDUCTOR 2030b)

(MODIFIED EXAMPLE 3)
8ch 1200dpi (MODIFIED EXAMPLE 3)
8ch 1200dpi (COMPARISON EXAMPLE 7)
8ch 1200dpi
(PHOTOCONDUCTOR 2030a)

(COMPARISON EXAMPLE 7)
8ch 1200dpi
(PHOTOCONDUCTOR 2030b)

(COMPARISON EXAMPLE 8)
8ch 1200dpi (COMPARISON EXAMPLE 8)
8ch 1200dpi

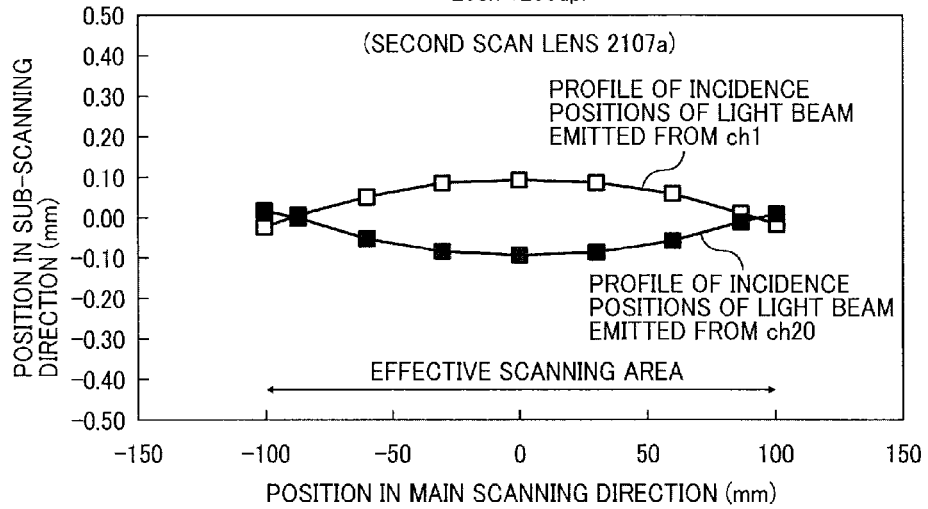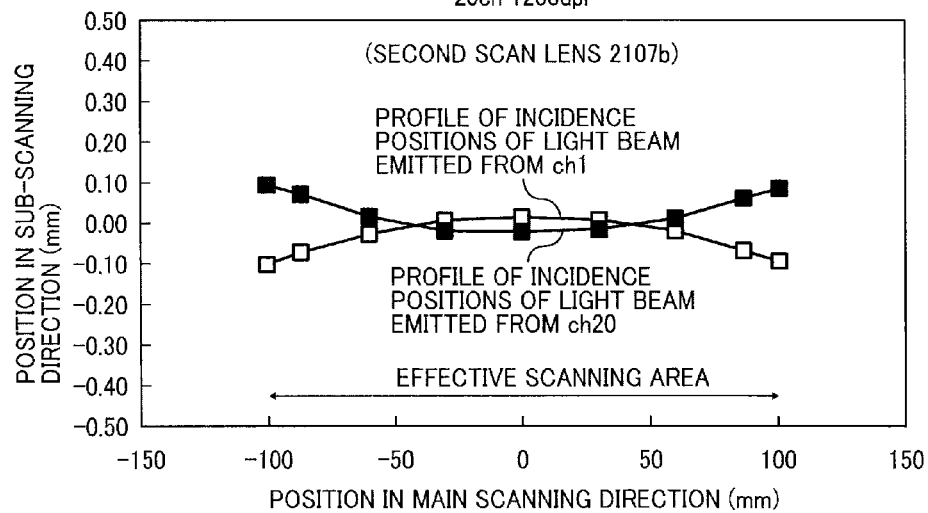

(MODIFIED EXAMPLE 4)
20ch 1200dpi
(PHOTOCONDUCTOR 2030a)

(MODIFIED EXAMPLE 4)
20ch 1200dpi
(PHOTOCONDUCTOR 2030b)

OPTICAL SCANNING APPARATUS AND IMAGE FORMING APPARATUS

CROSS-REFERENCE TO RELATED APPLICATION

This application claims priority to Japanese Patent Application No. 2011-253402, filed on Nov. 21, 2011 in the Japan Patent Office, which is hereby incorporated by reference herein in its entirety.

BACKGROUND

1. Technical Field

The present invention relates to an optical scanning apparatus and an image forming apparatus, and more particularly to an optical scanning apparatus to scan a target surface using a plurality of light beams, and an image forming apparatus employing the optical scanning apparatus.

2. Description of the Background Art

Image forming apparatuses using electrophotography use a laser beam for optical scanning. Such image forming apparatuses use an optical scanning apparatus typically including a polygon scanner (e.g., polygon mirror), by which a surface of a photoconductive drum is scanned by the laser beam to form a latent image on the surface of the photoconductive drum. Such electrophotographic image forming apparatuses enhance image quality by forming images with high image density, and enhance image forming productivity by forming images with high speed. Such high image density and high speed imaging can be achieved by scanning the drum surface, that is, by irradiating the drum surface with a plurality of light beams simultaneously, a method that can be called multi-beam scanning.

For example, JP-3549666-B (JP-H09-274152-A) discloses a multi-beam scanning system that reduces differences in curvature of scanning lines to a given level so that images can be produced correctly.

However, as for such multi-beam scanning system, if the numbers of light beams become three or more and ambient temperature changes, the beam pitch on the target surface in the sub-scanning direction starts to fluctuate greatly.

SUMMARY

The present invention is conceived in light of the above-described problems, and provides a novel optical scanning apparatus for scanning a target surface using a plurality of light beams simultaneously along a first direction of the target surface. The optical scanning apparatus includes a light source having a plurality of light emitting elements to emit light beams; an optical deflector to deflect the plurality of light beams coming from the light source; and a scanning optical system to guide the plurality of light beams deflected by the optical deflector to the target surface, the scanning optical system including a lens, disposed after the optical deflector, having the strongest power in a second direction perpendicular to the first direction. A plurality of scan lines, corresponding to the plurality of light beams deflected by the optical deflector, intersect or contact each other at an optical face of the lens.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 15 shows example parameters of a second scan lens;

FIG. 21A and FIG. 21B respectively show positional relationship between a second scan lens and conjugate points with respect to an aperture in comparison example 1;

Figure 26A:
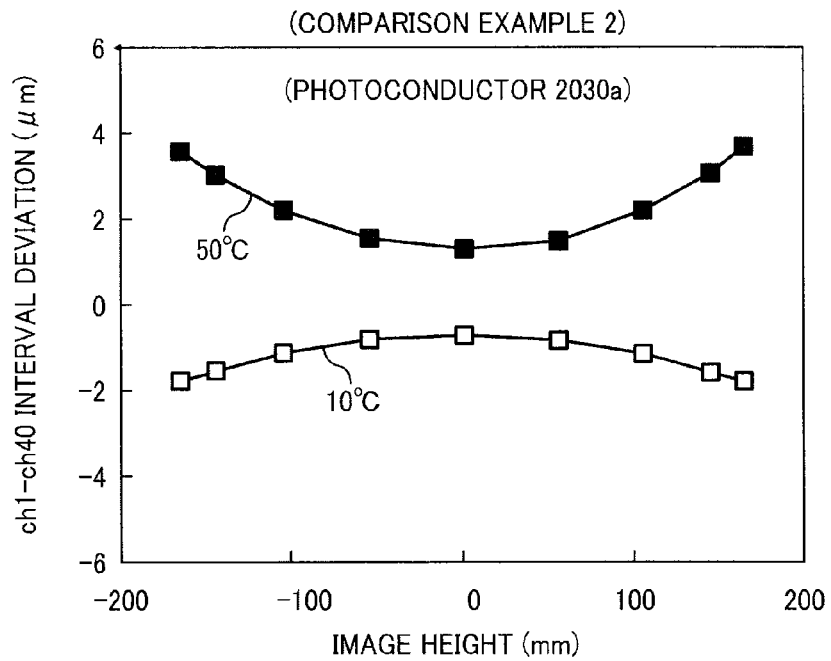
Figure 26B:
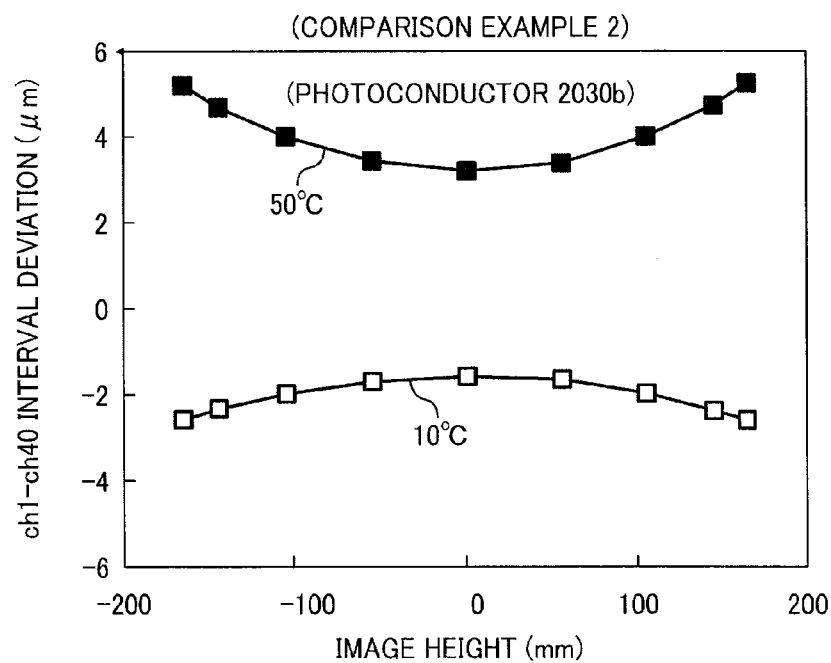
Figure 27A:
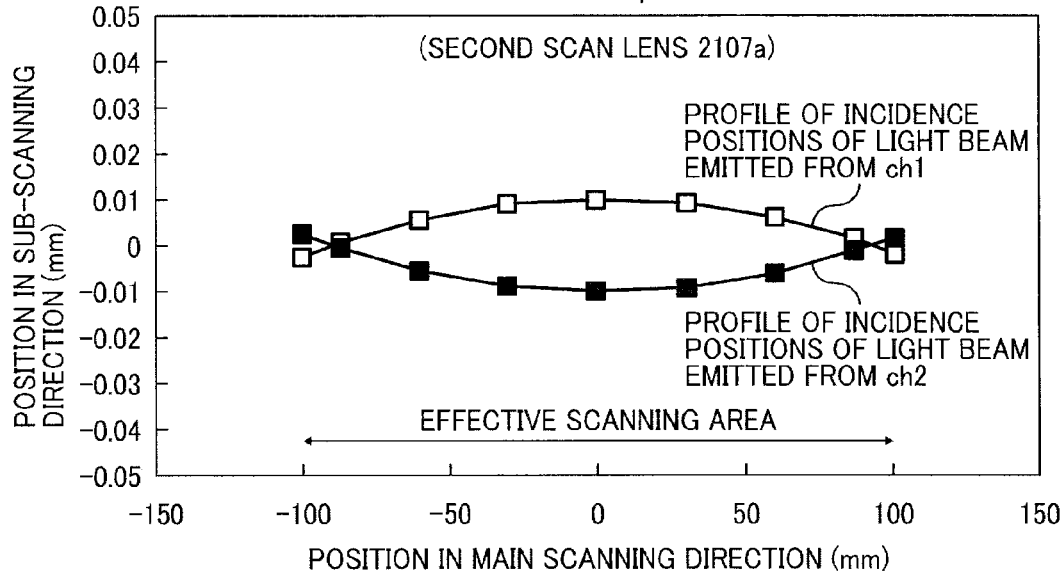
Figure 27B:
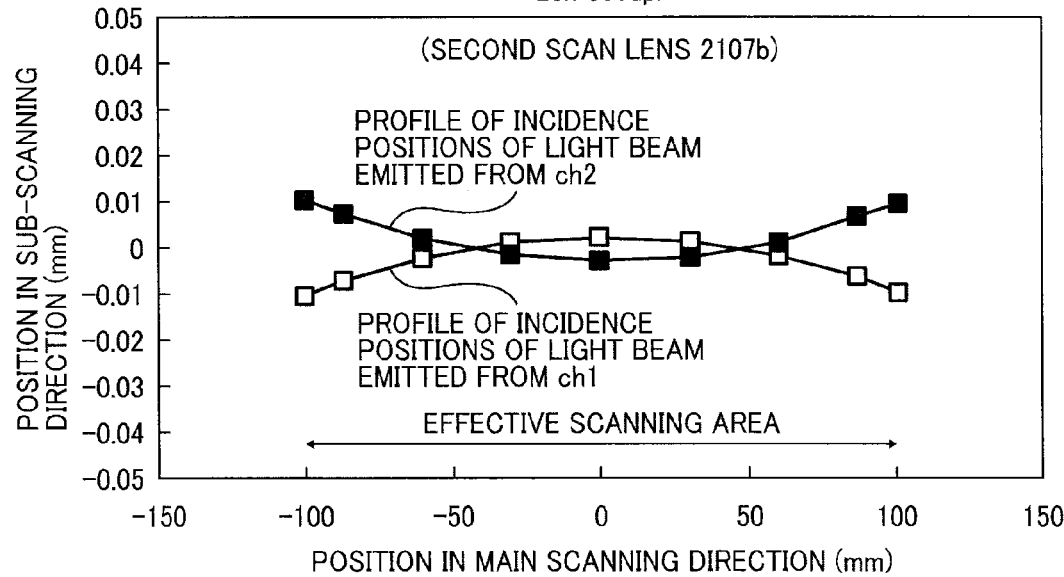
Figure 28A:
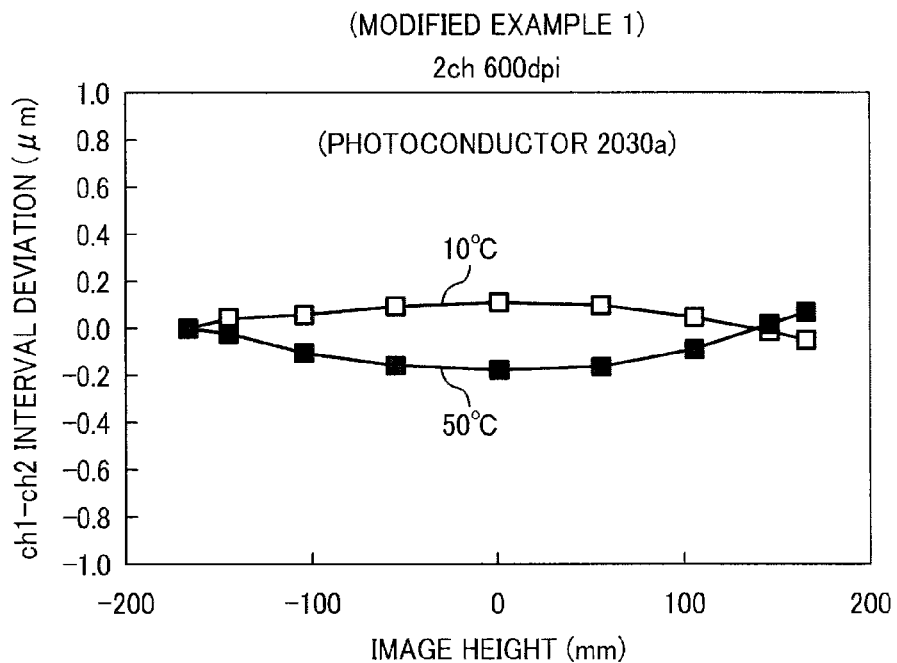
Figure 28B:
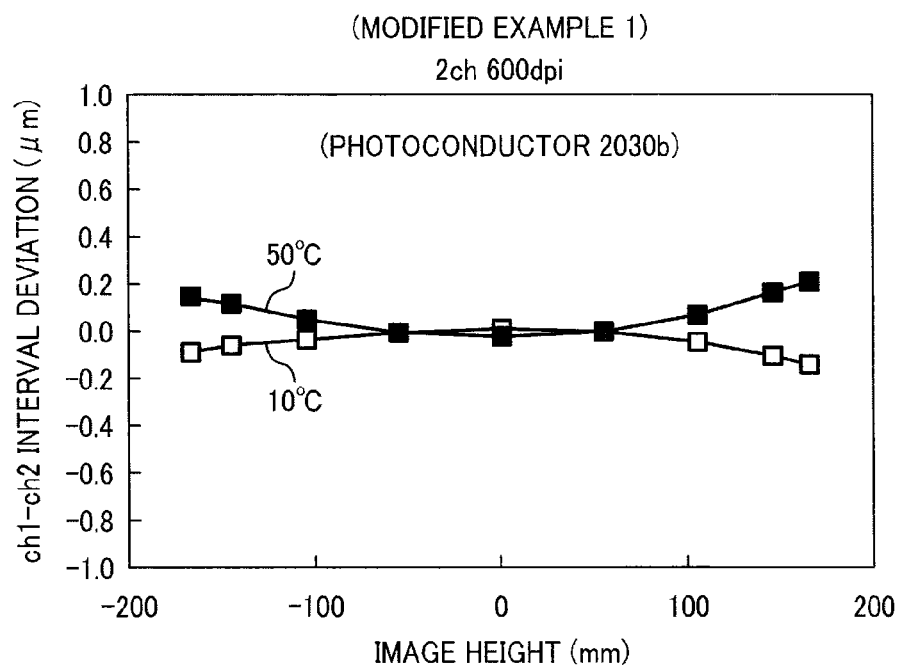
Figure 29A:
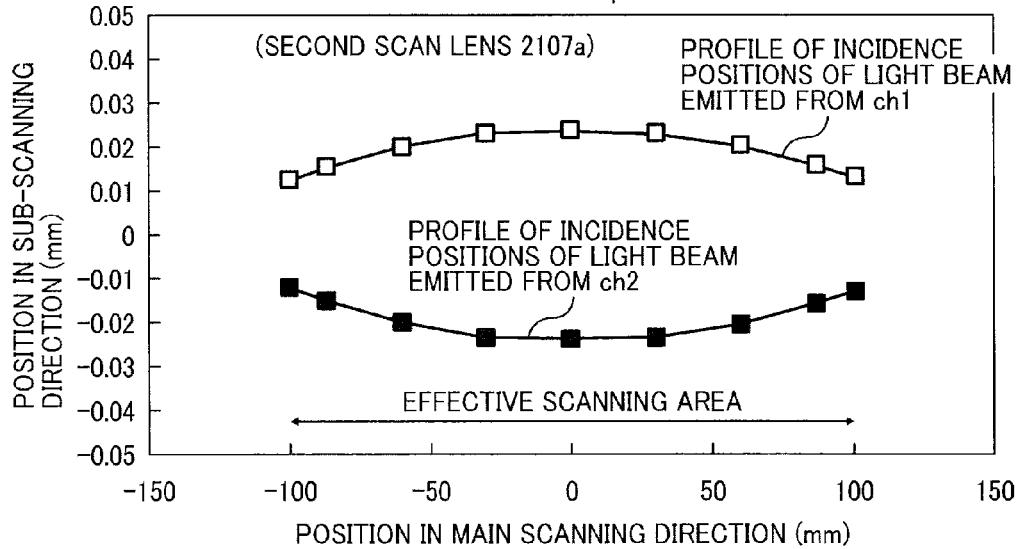
Figure 29B:
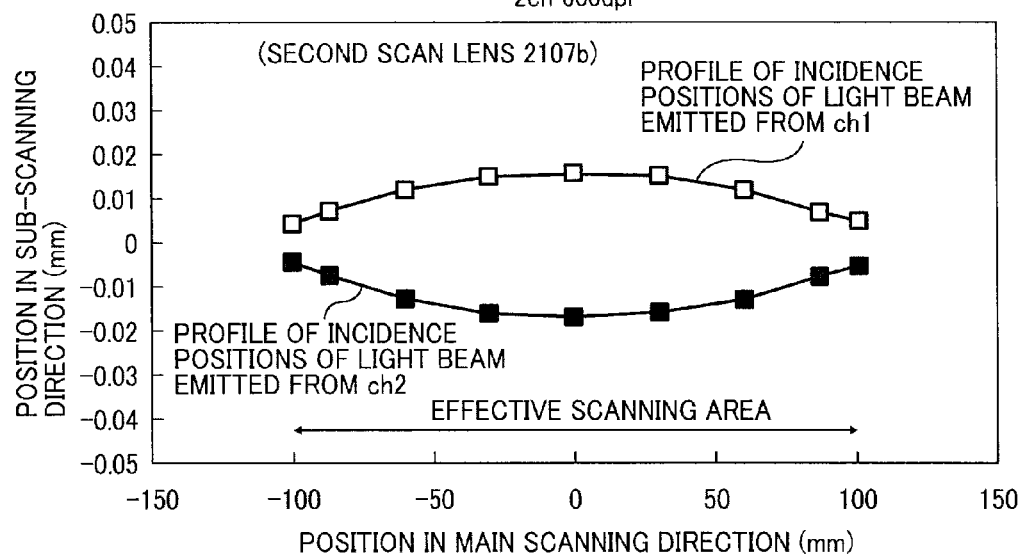
Figure 30A:
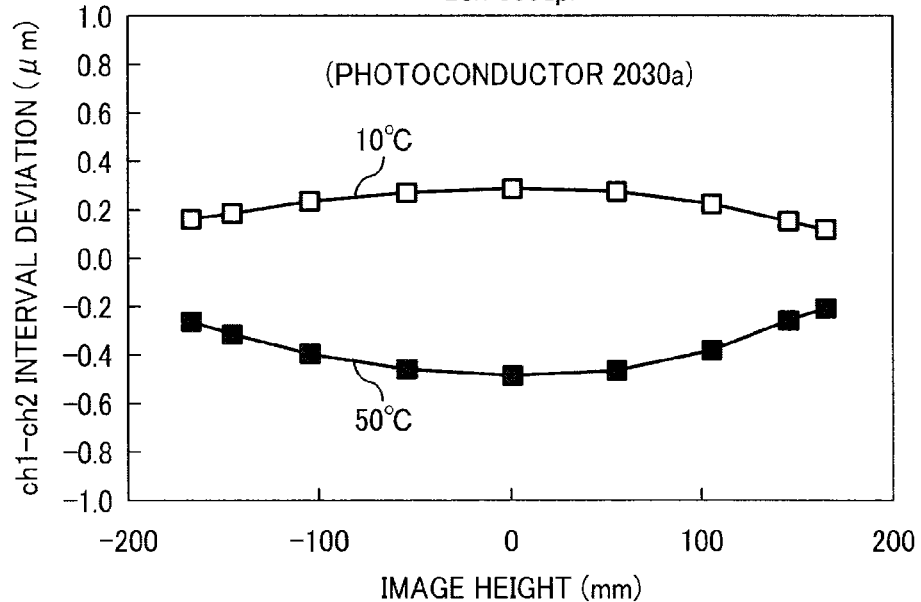
Figure 30B:
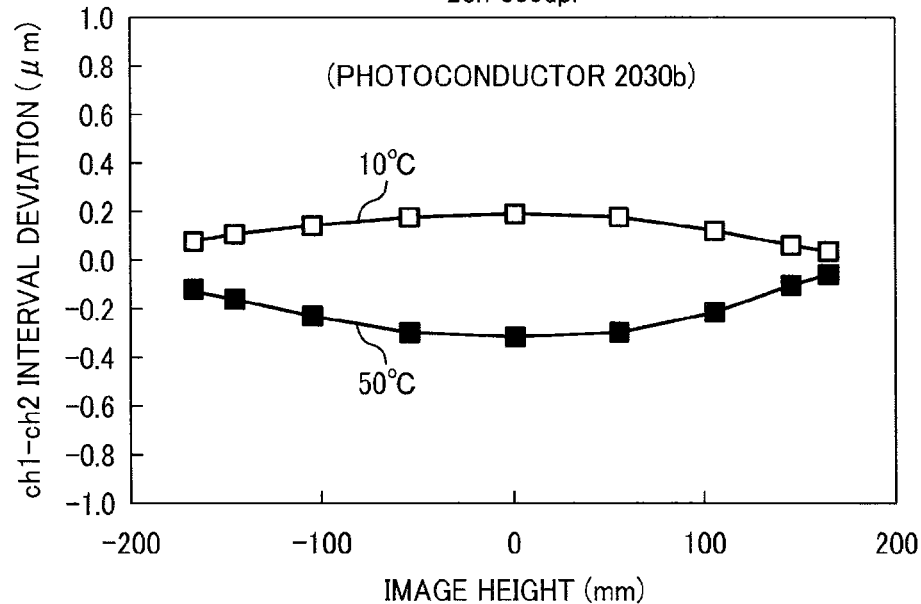
Figure 31A:
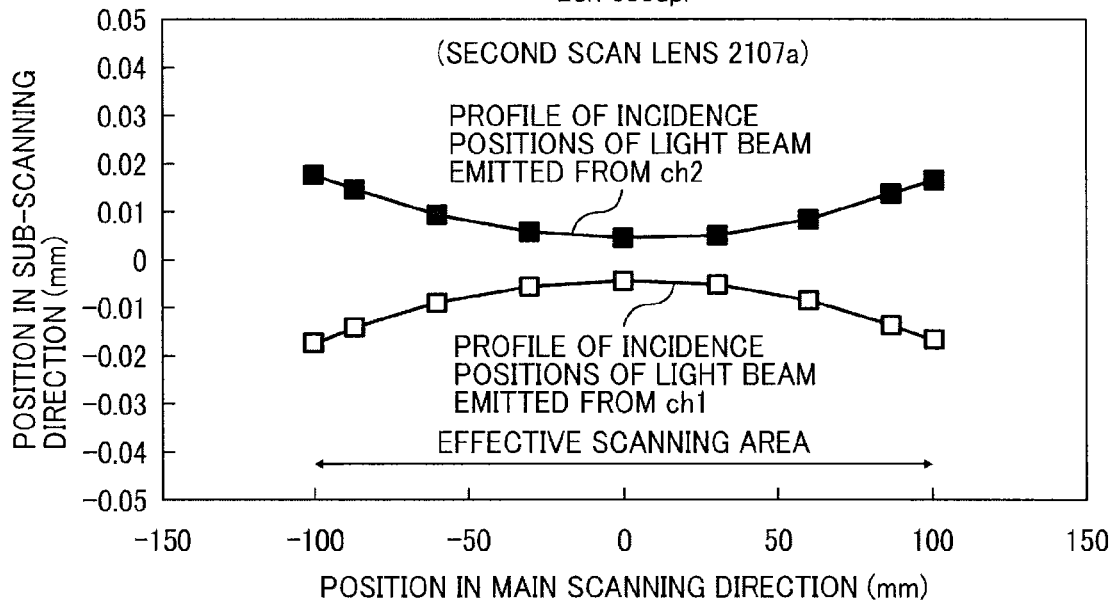
Figure 31B:
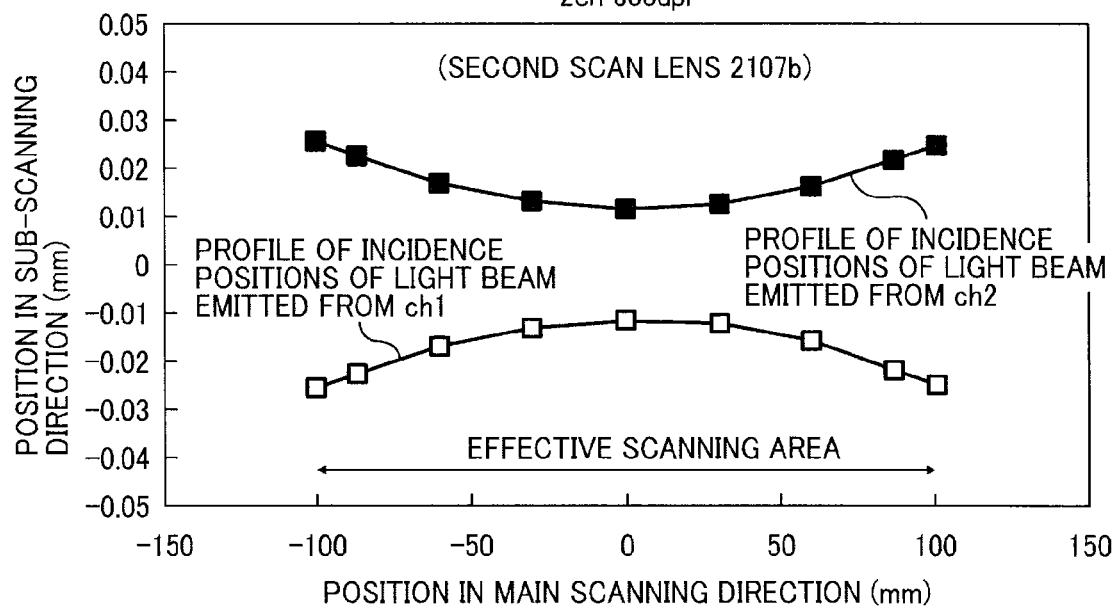
Figure 32A:
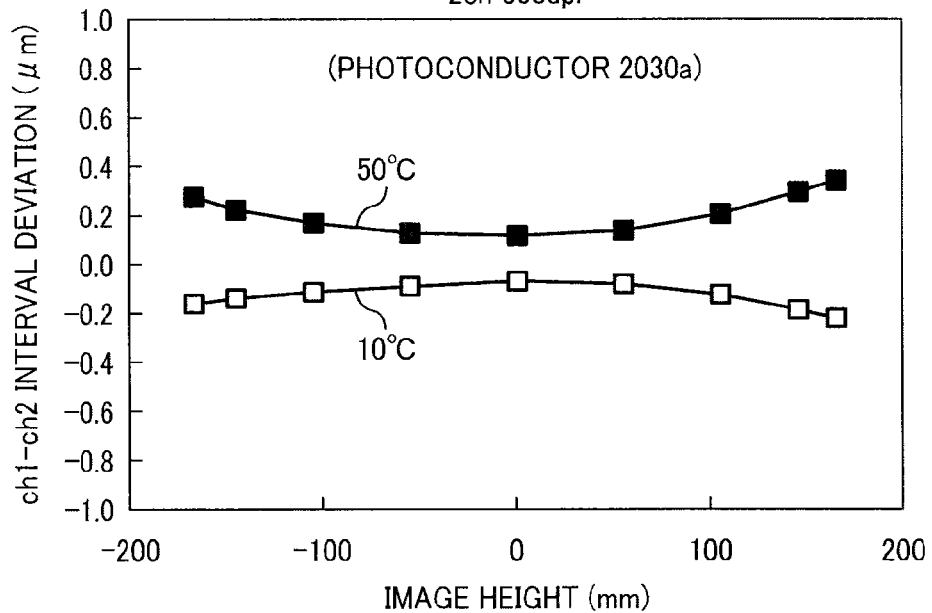
Figure 32B:
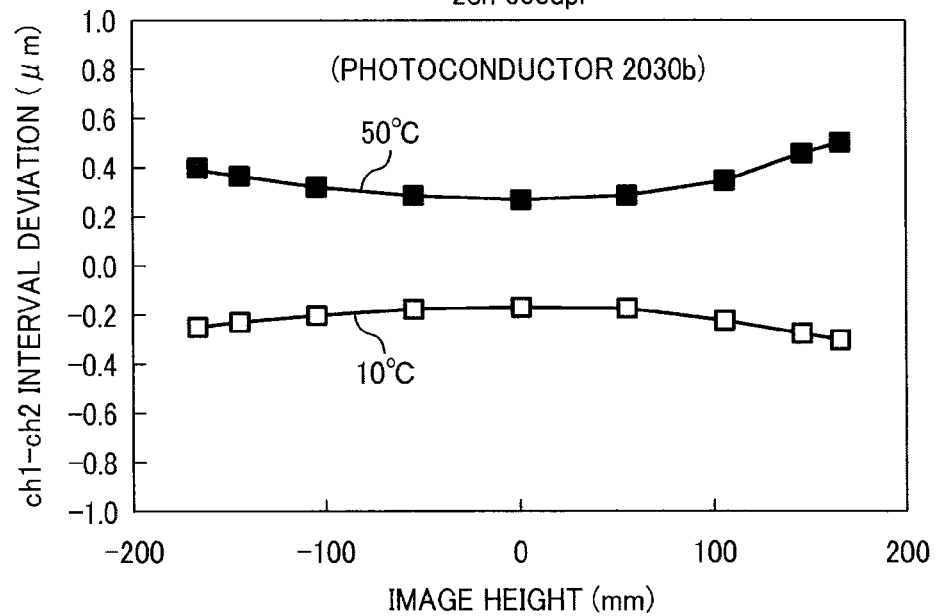
Figure 33A:
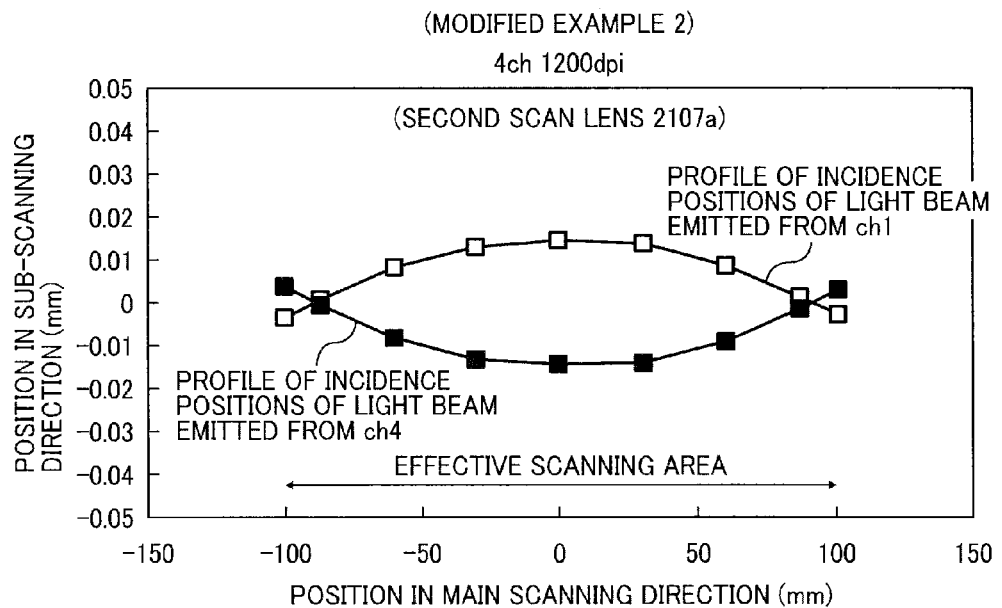
Figure 33B:
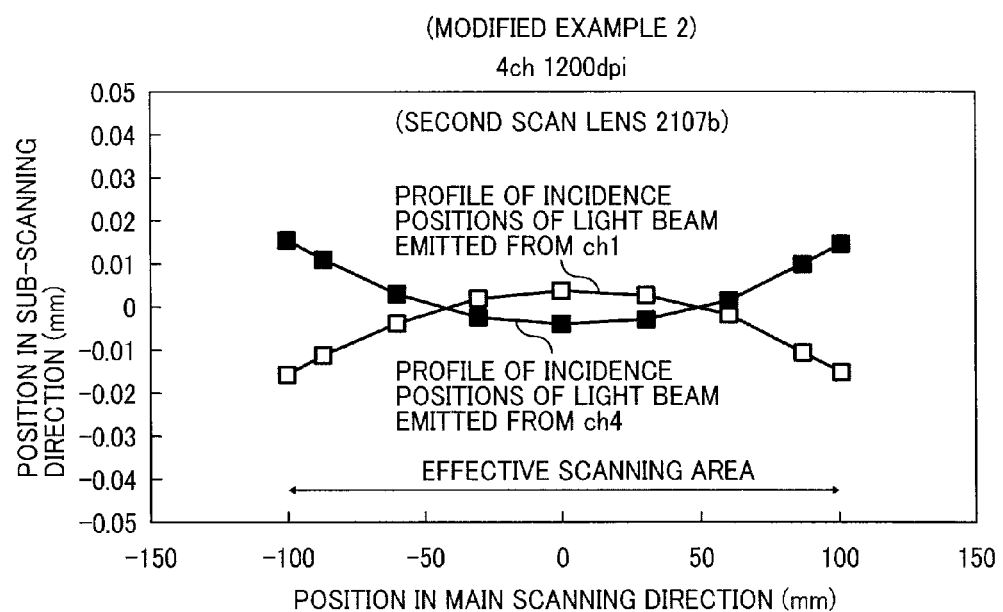
Figure 34A:
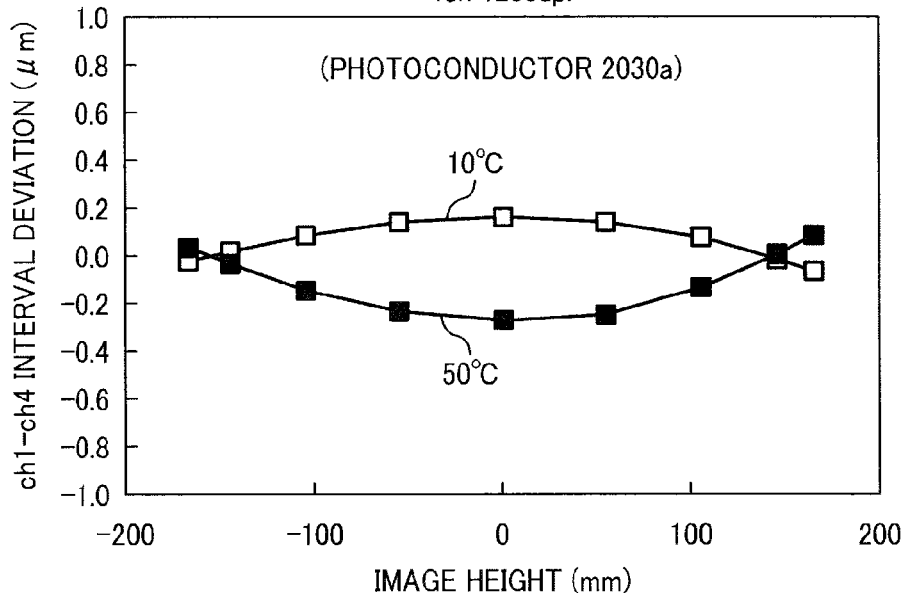
Figure 34B:
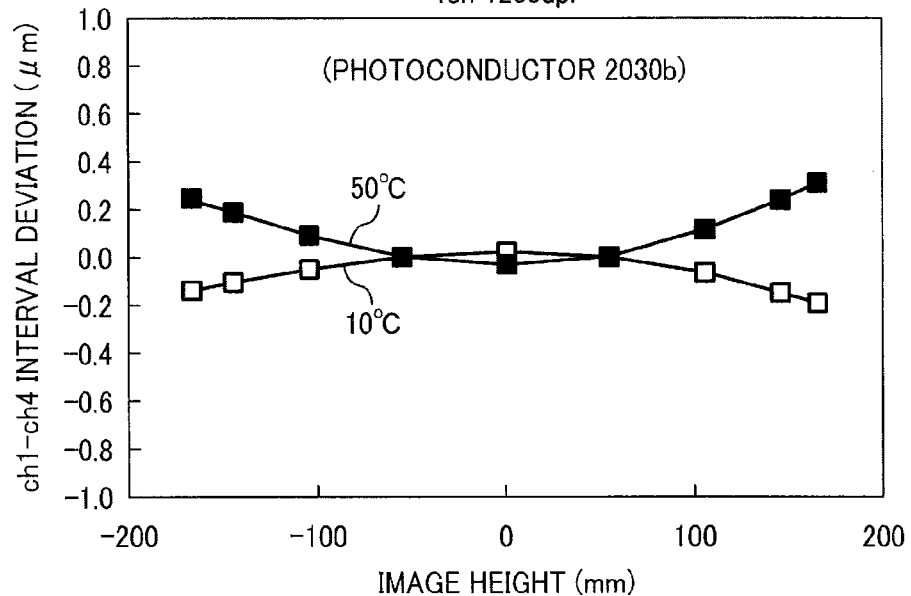
Figure 35A:
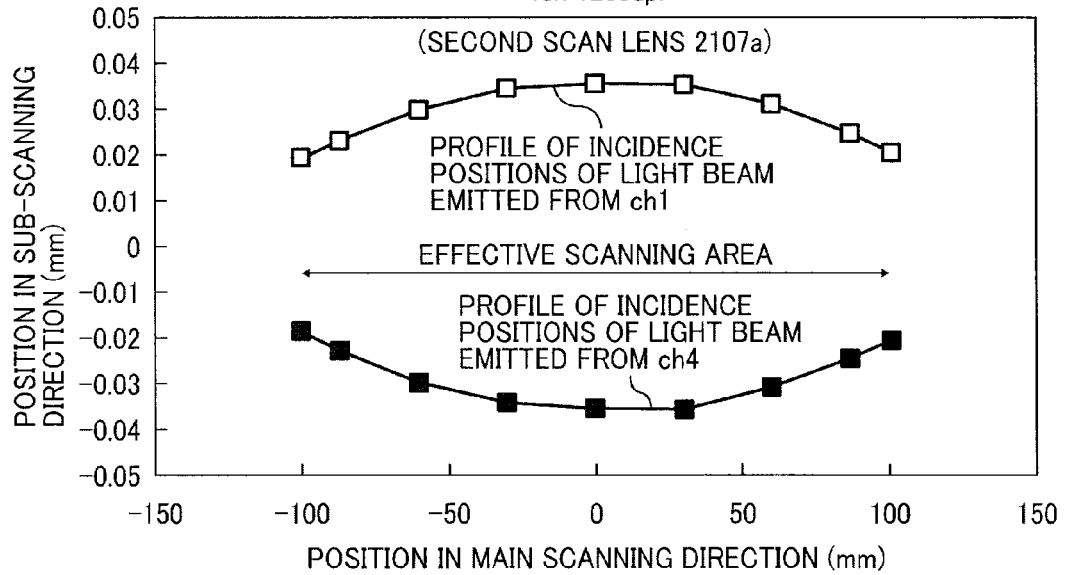
Figure 35B:
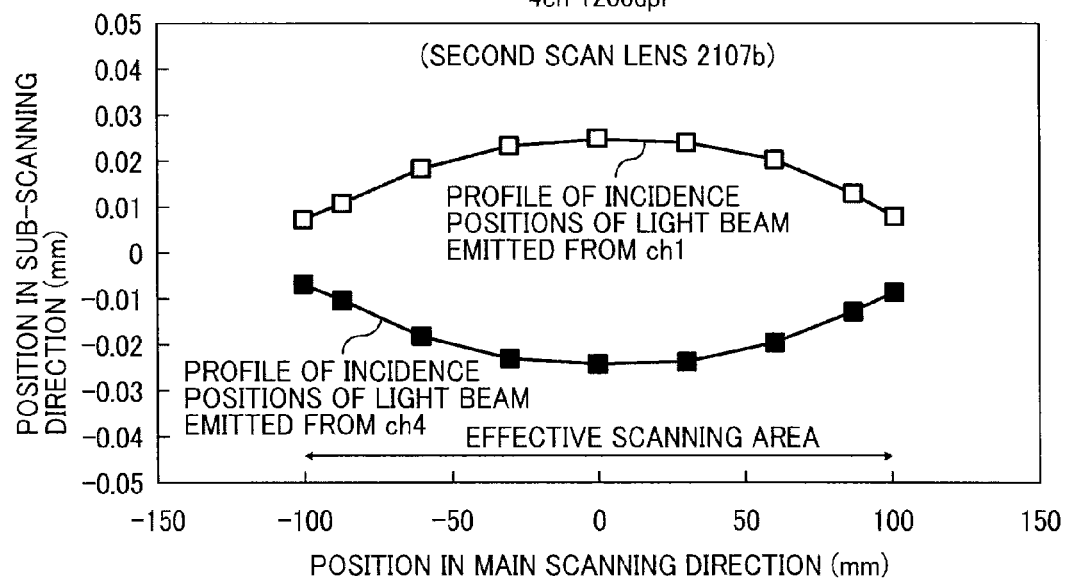
Figure 36A:
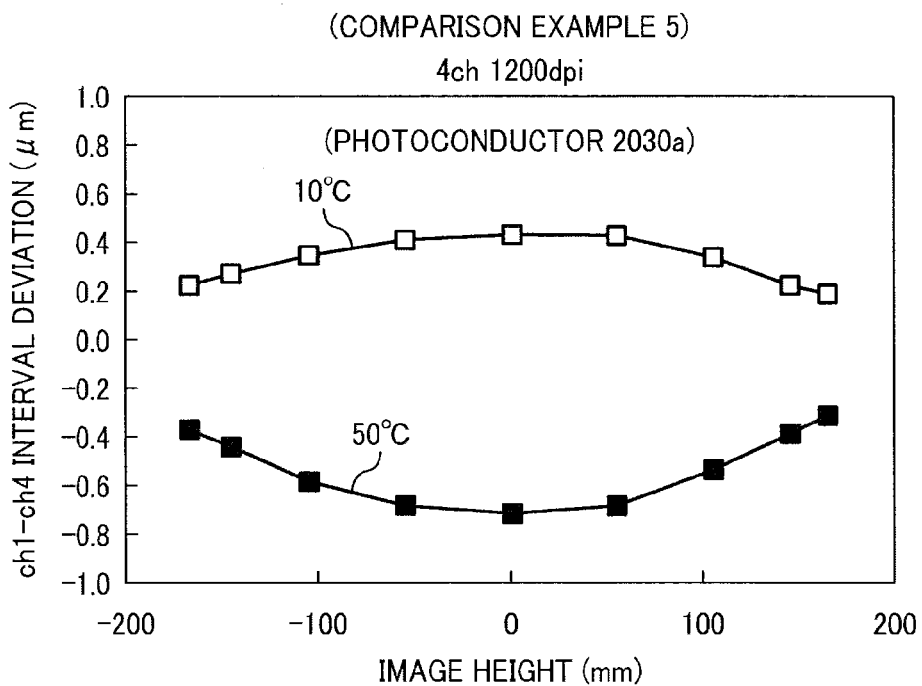
Figure 36B:
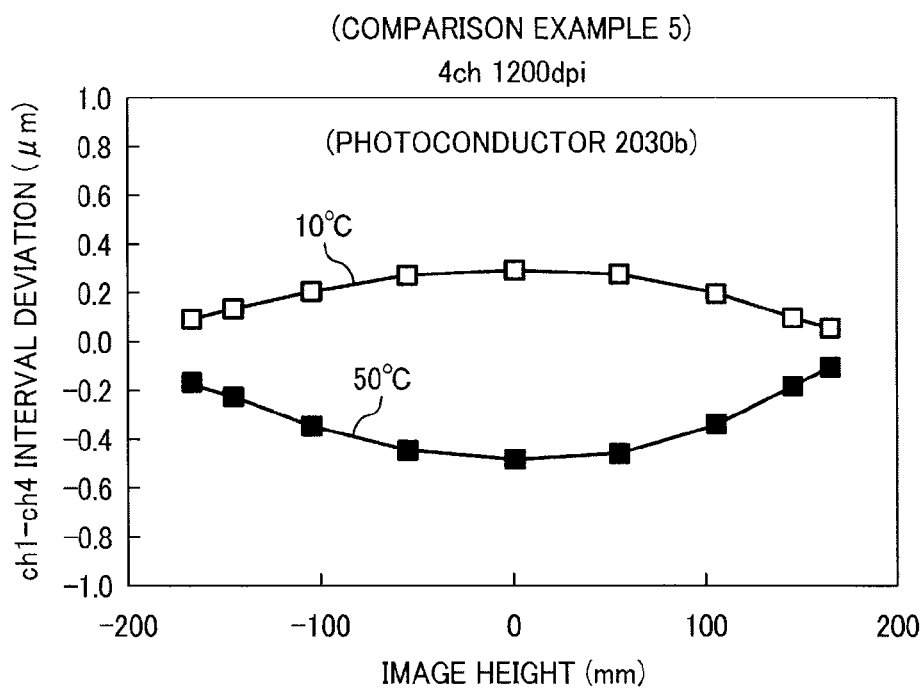
Figure 37A:
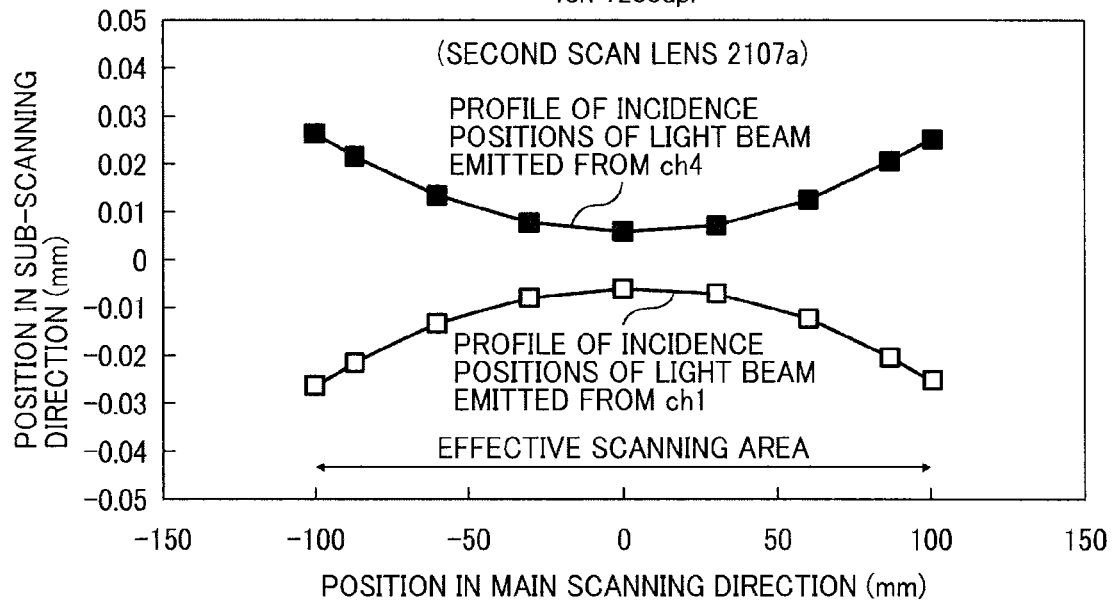
Figure 37B:
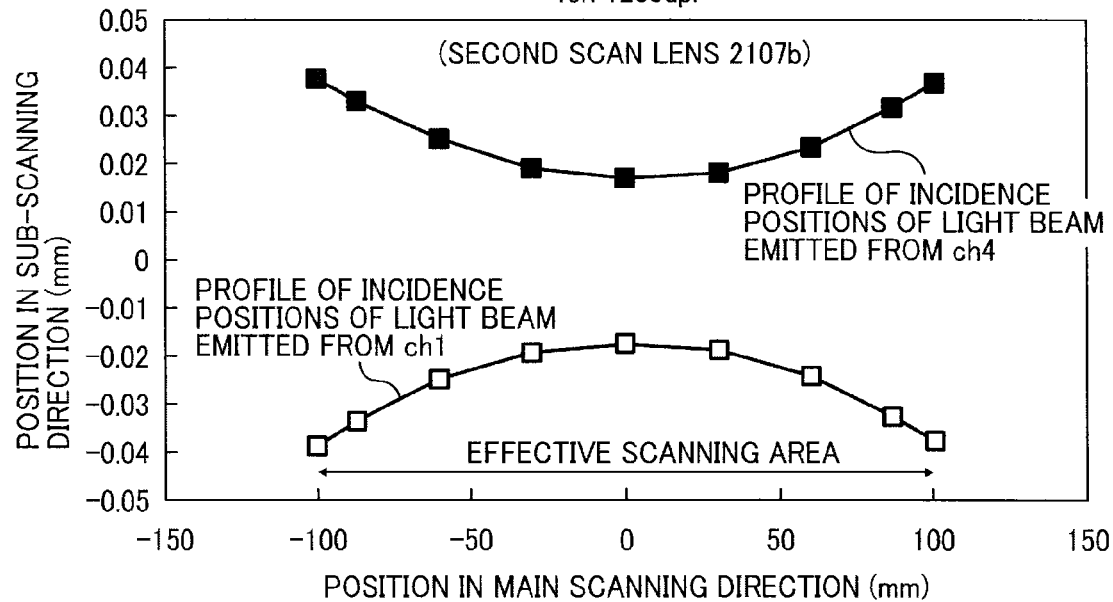
Figure 38A:
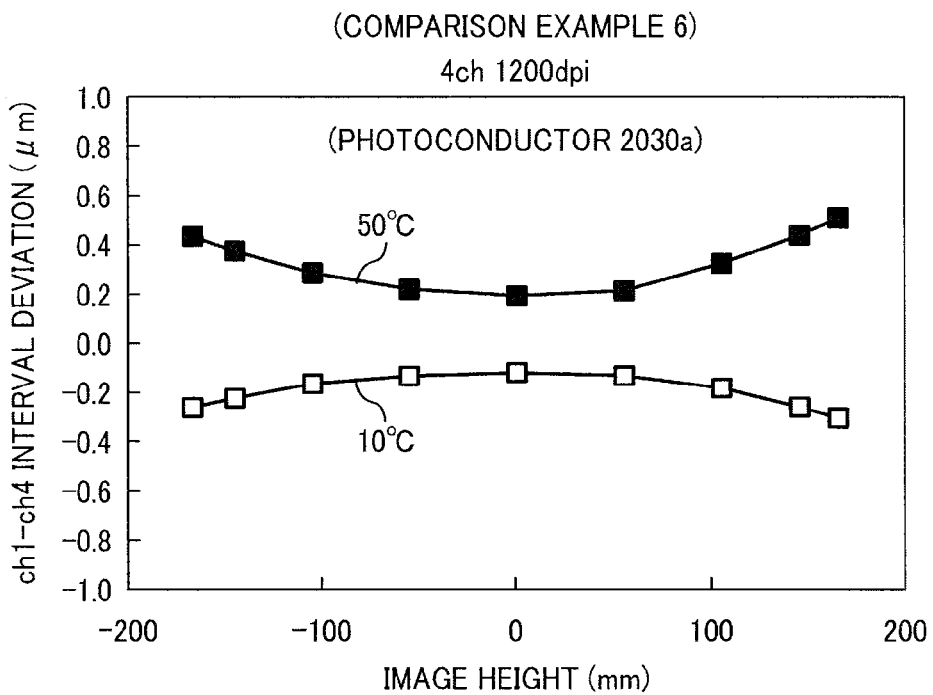
Figure 38B:
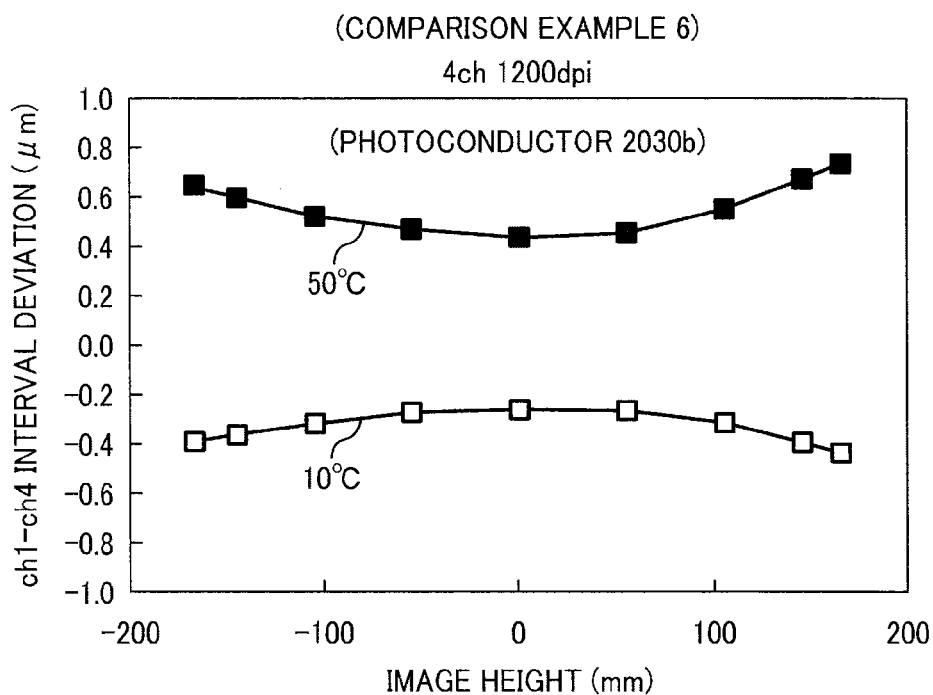
Figure 39A:
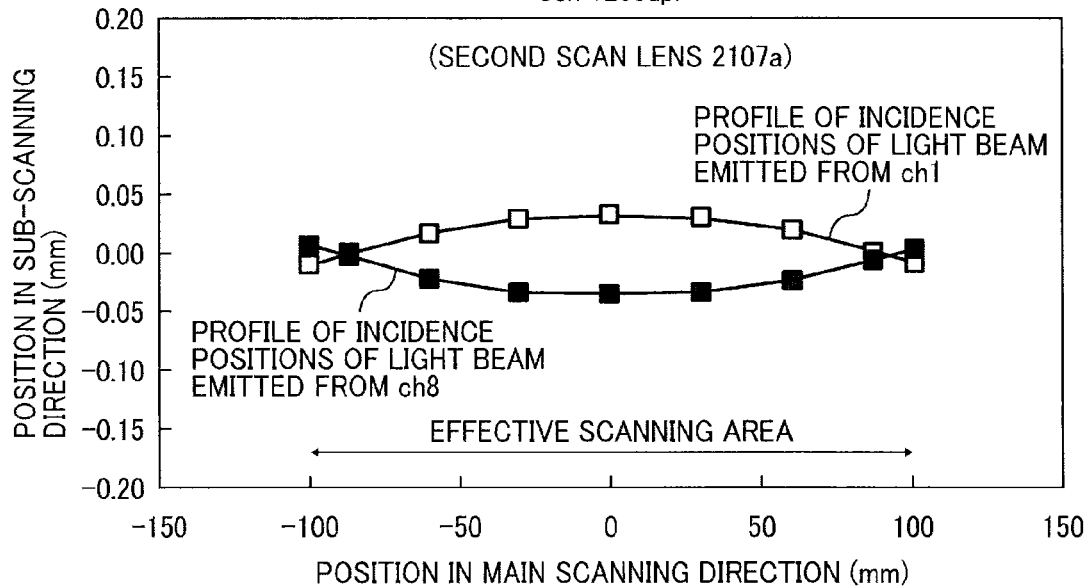
Figure 39B:
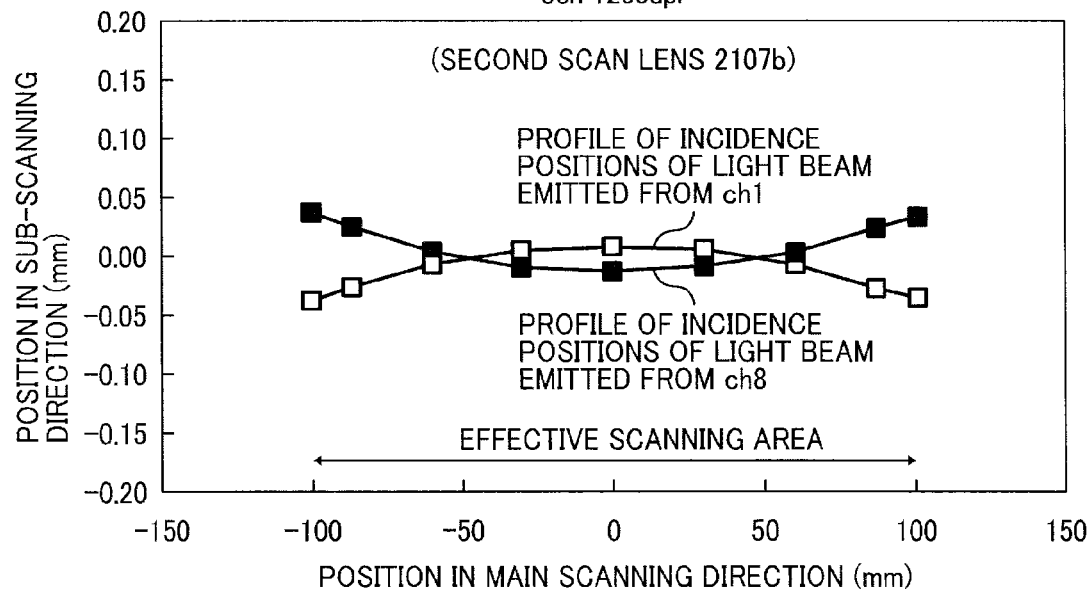
Figure 40A:
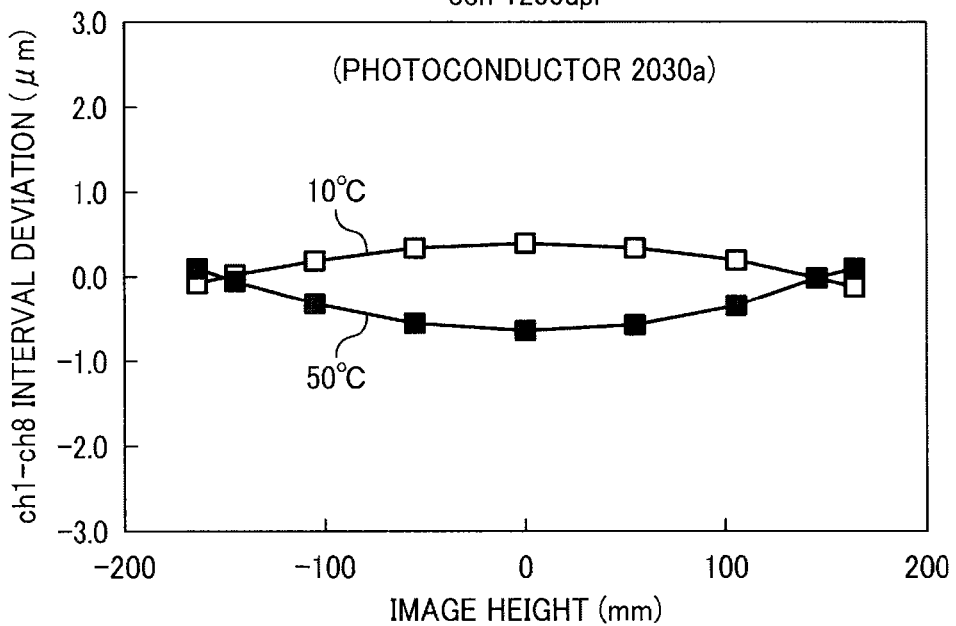
Figure 40B:
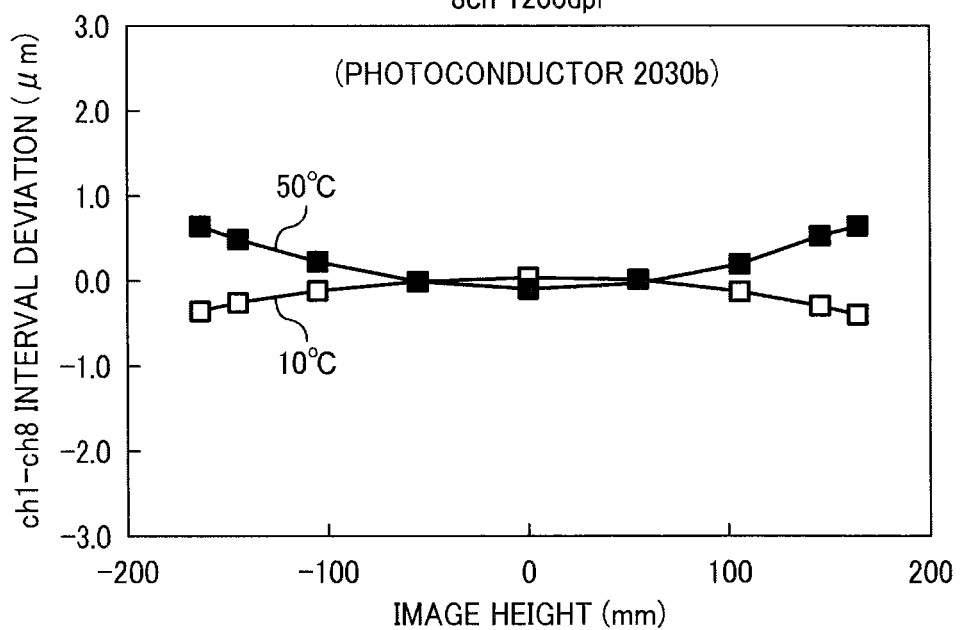
Figure 41A:
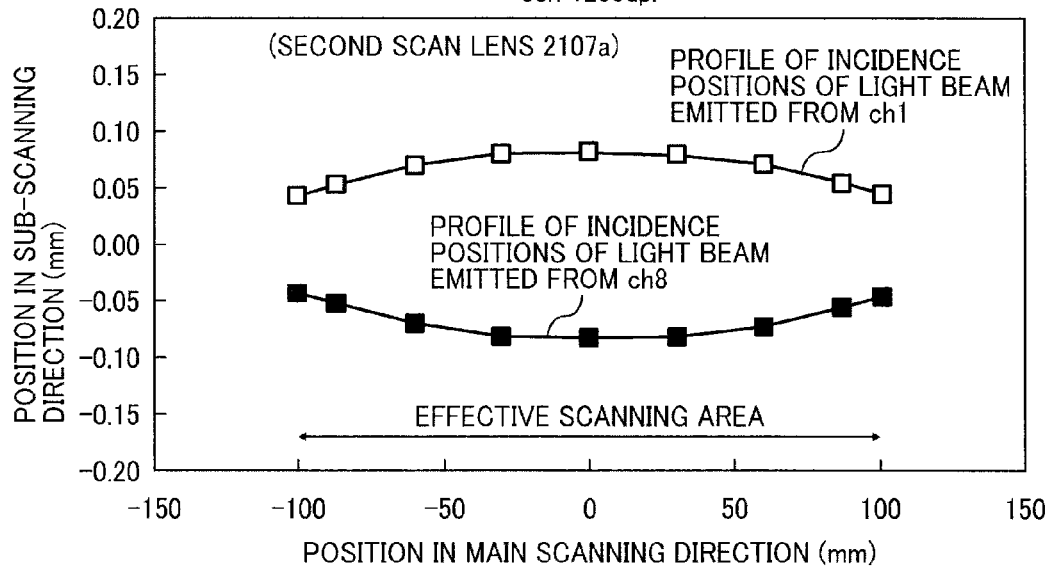
Figure 41B:
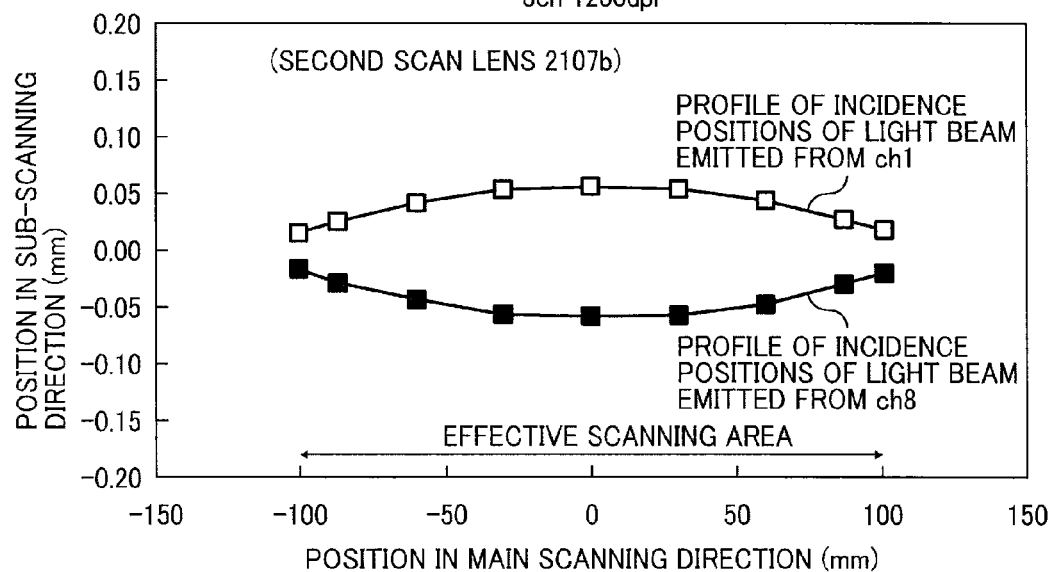
Figure 42A:
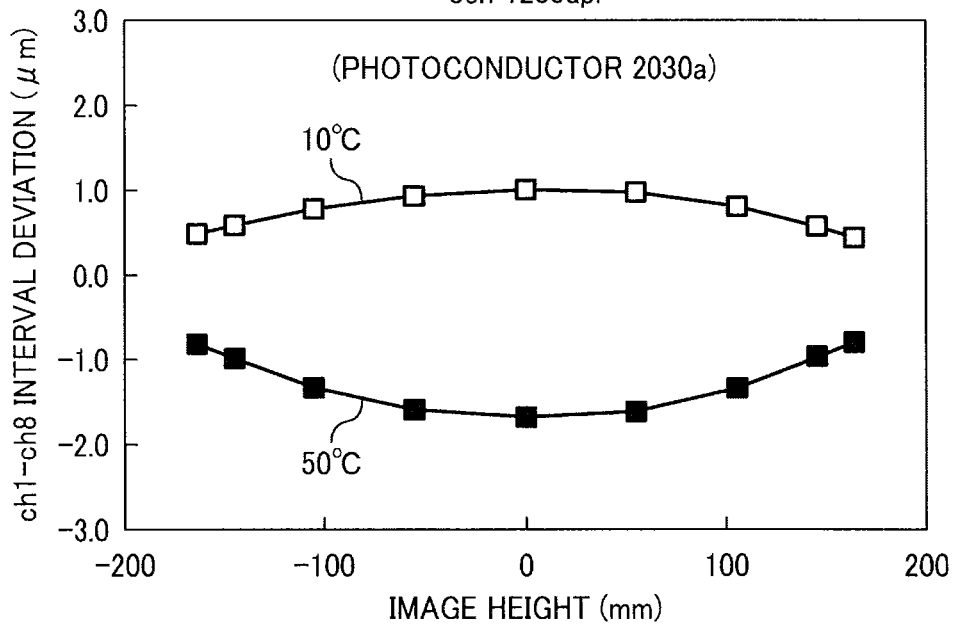
Figure 42B:
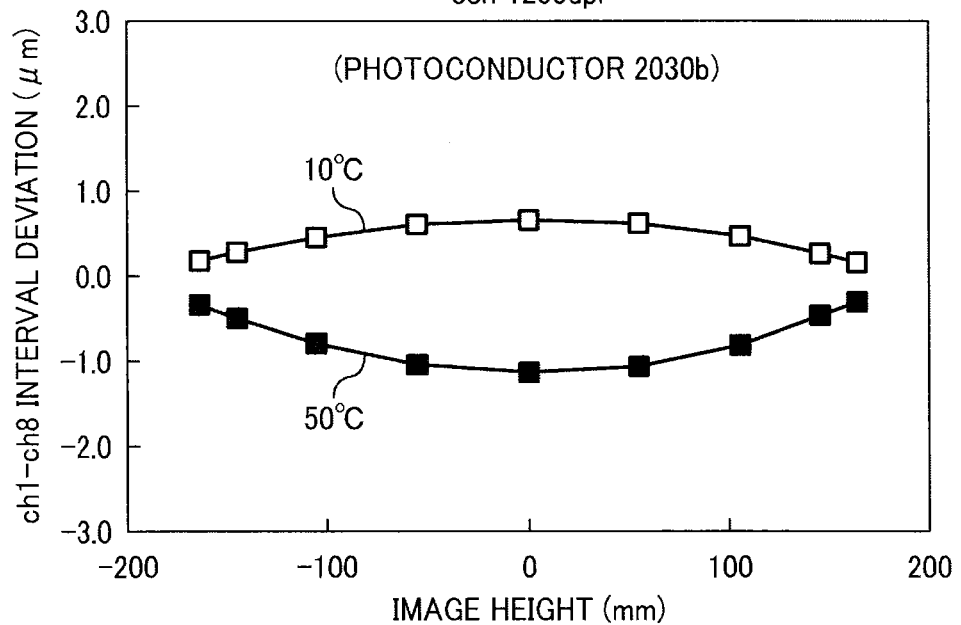
Figure 43A:
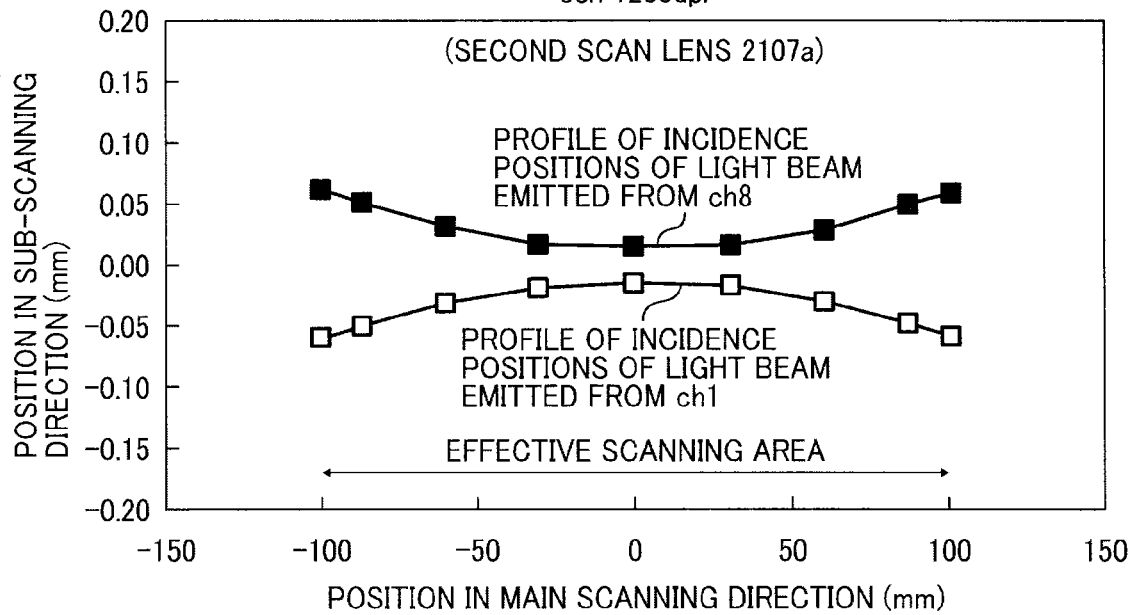
Figure 43B:
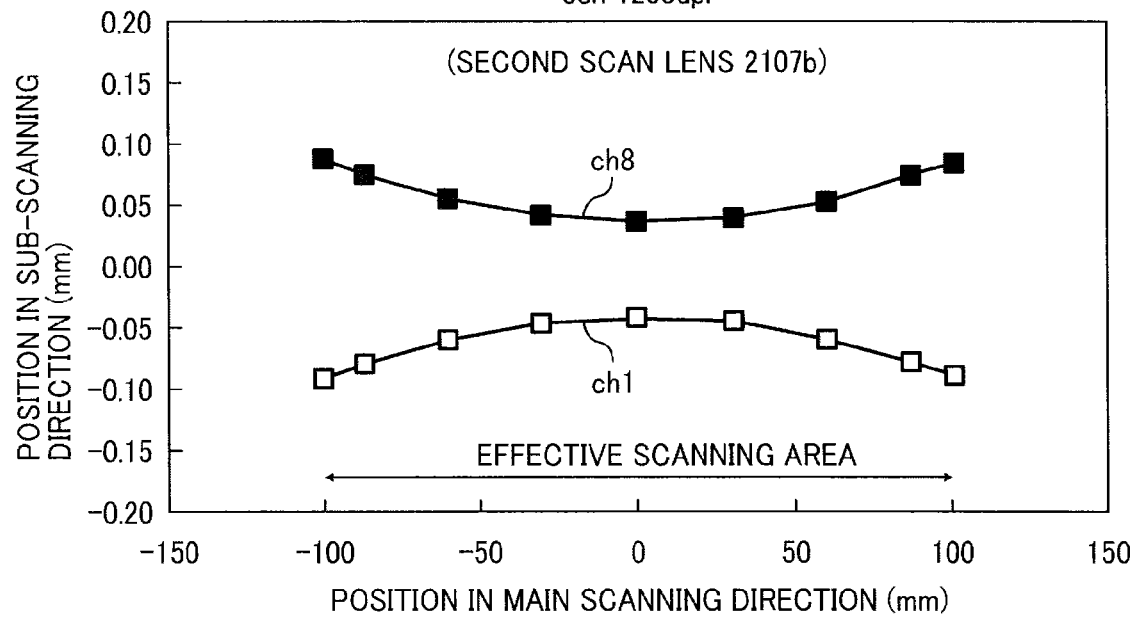
Figure 44A:
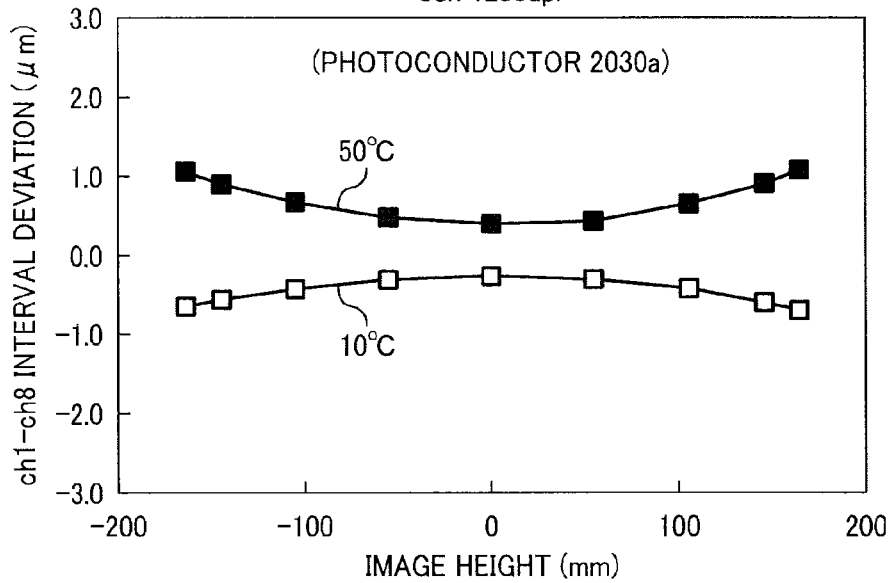
Figure 44B:
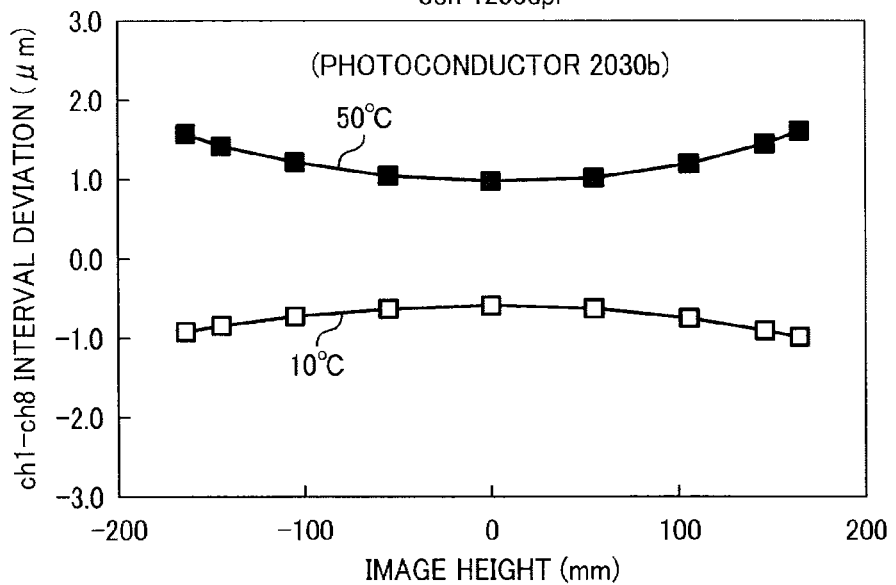
Figure 46A:
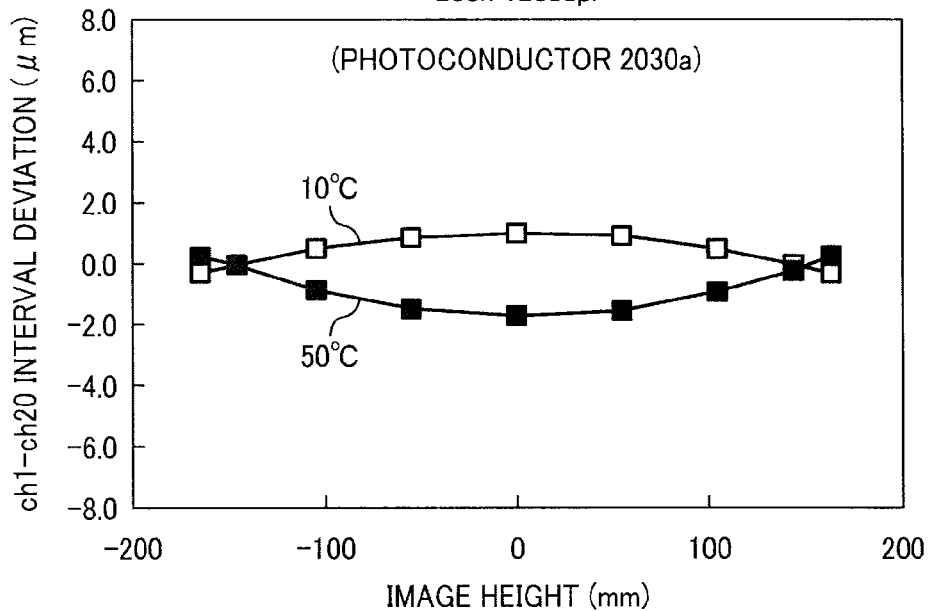
Figure 46B:
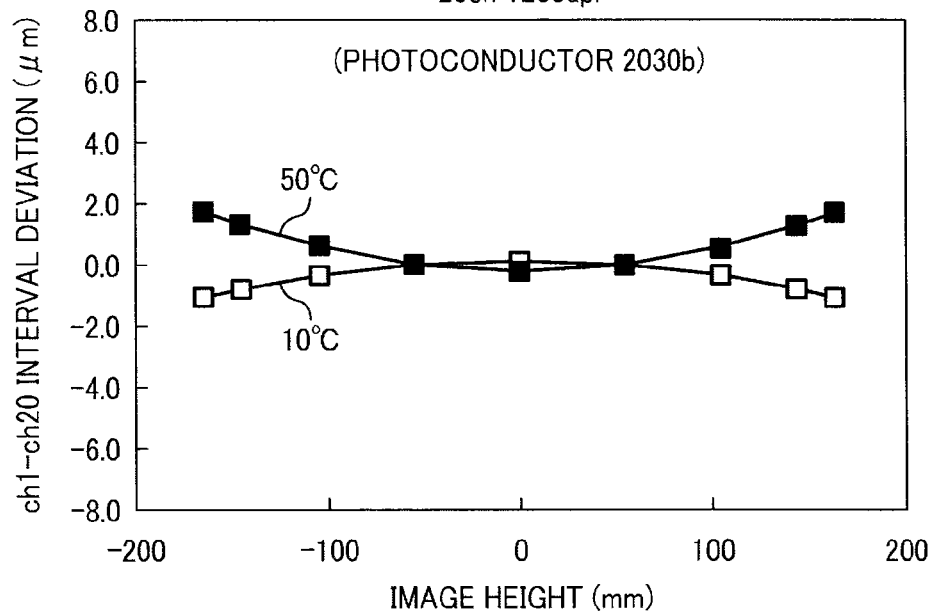
Figure 47A:
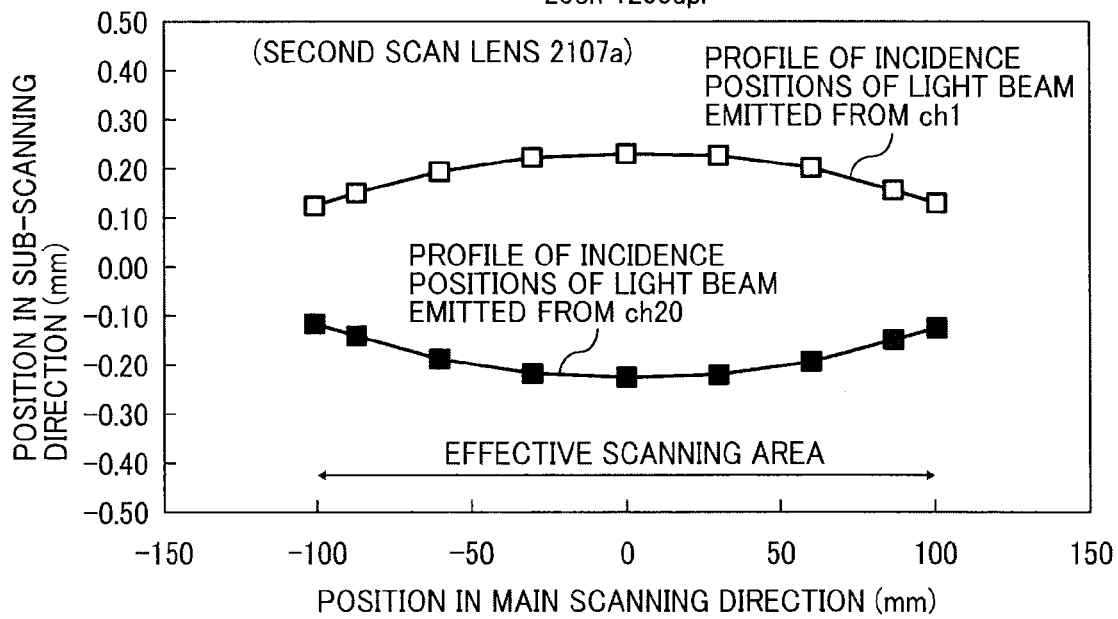
Figure 47B:
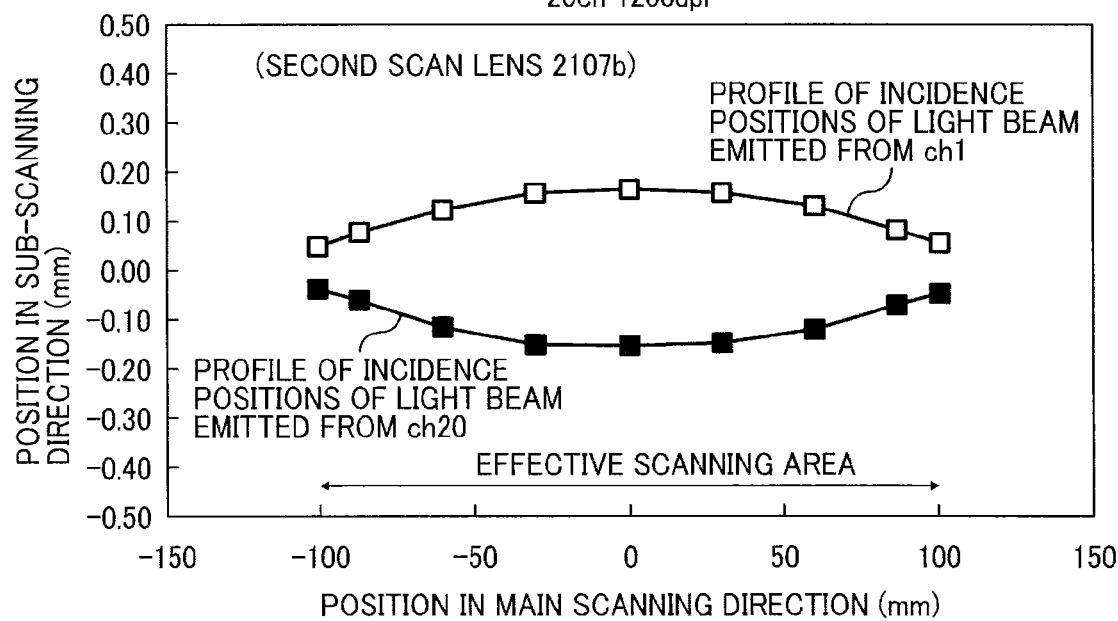
Figure 48A:
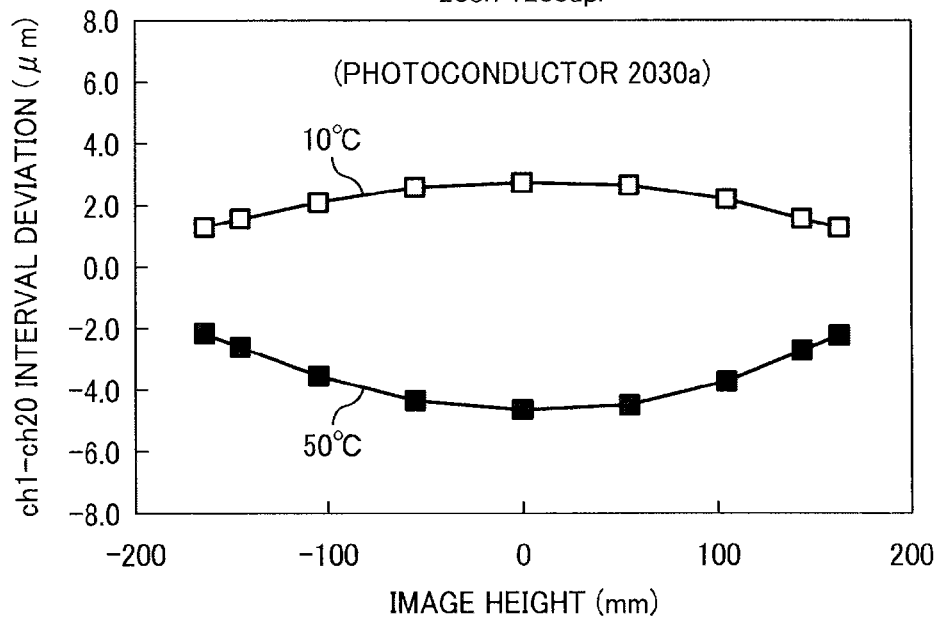
Figure 48B:
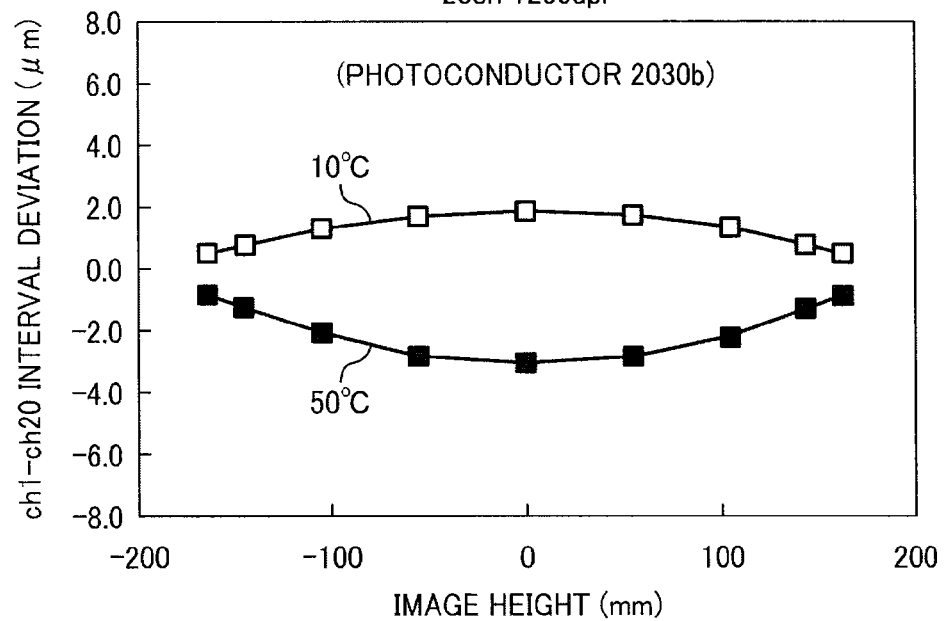
Figure 49A:
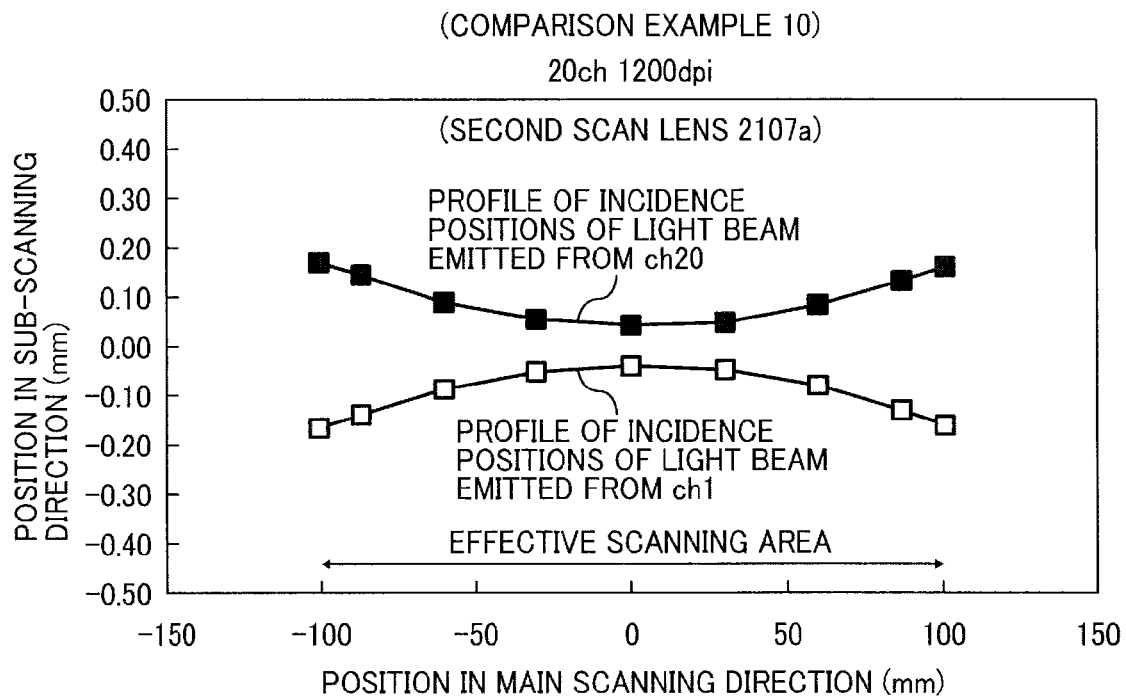
Figure 49B:
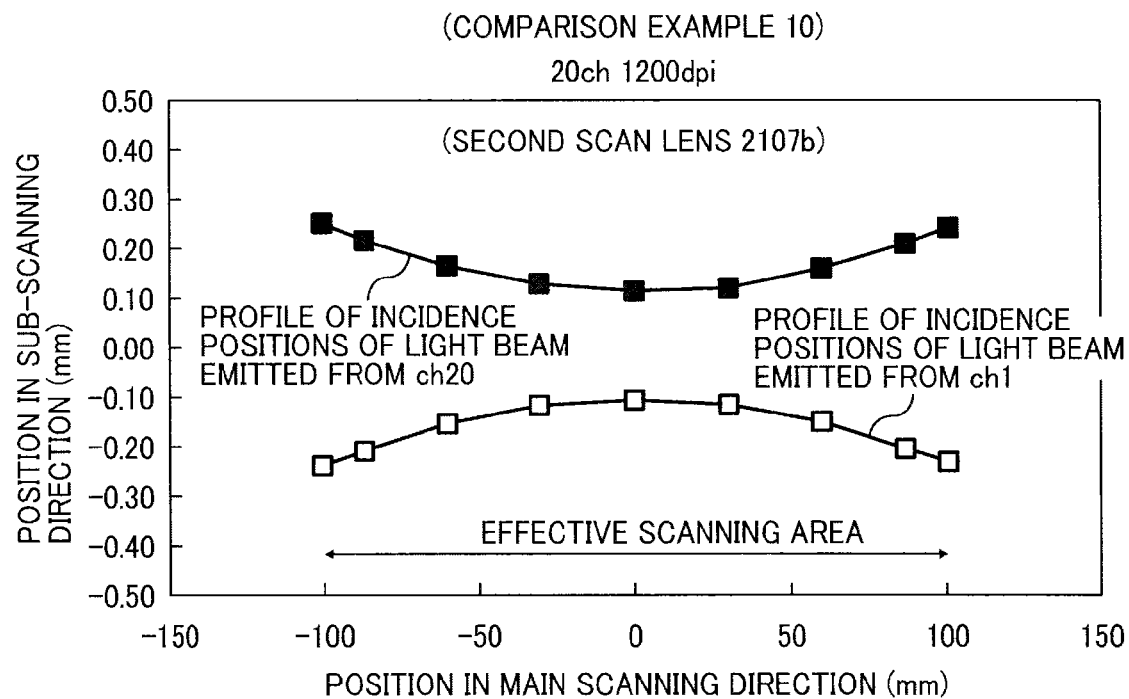
Figure 50A:
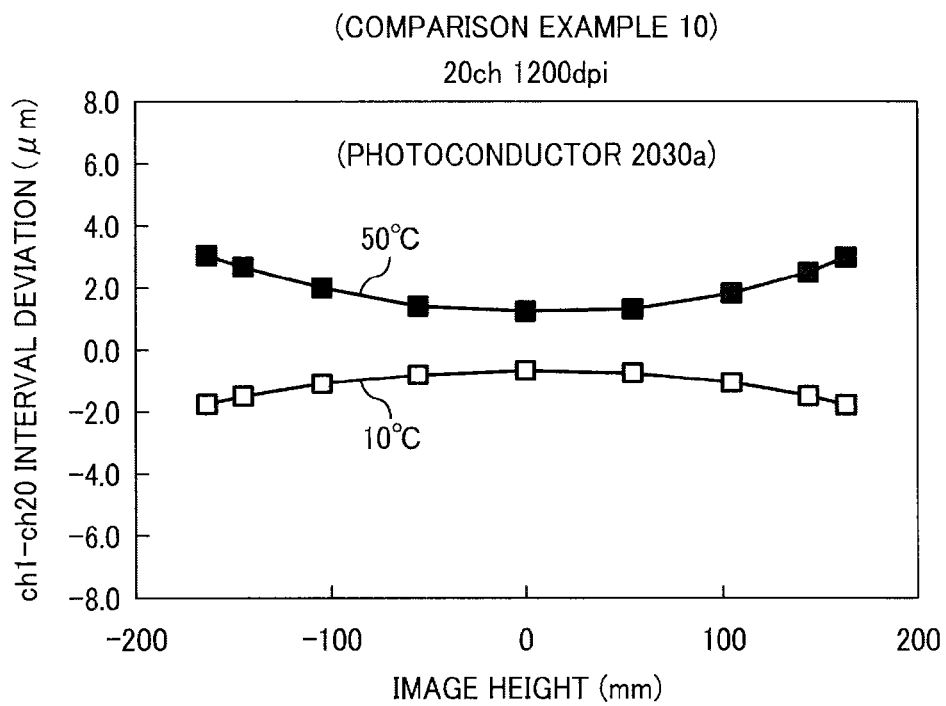
Figure 50B:
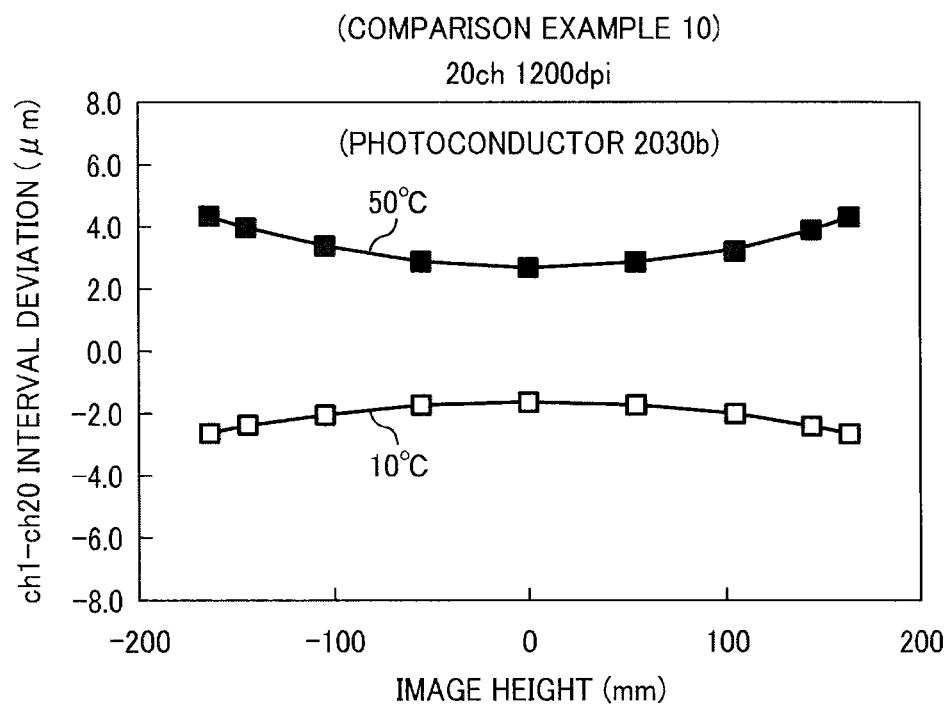
Figure 51:
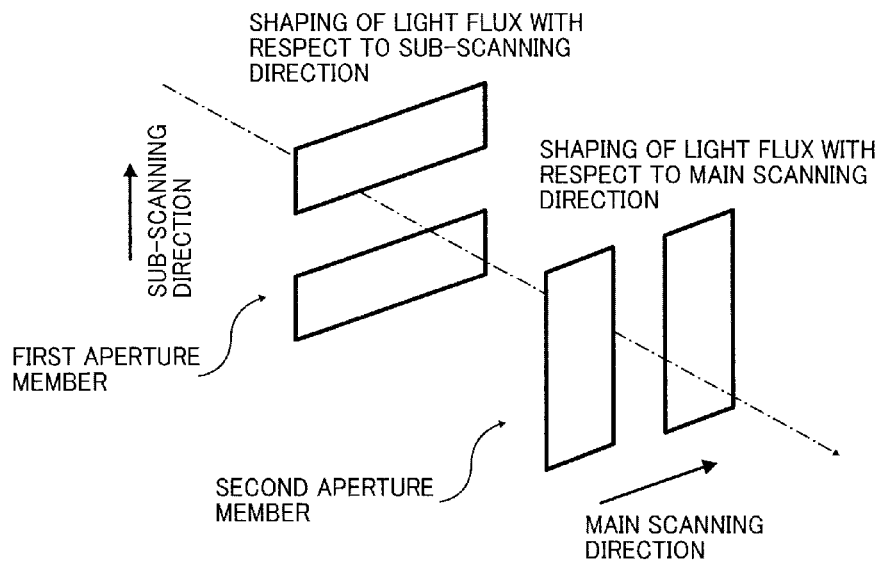
Figure 52:
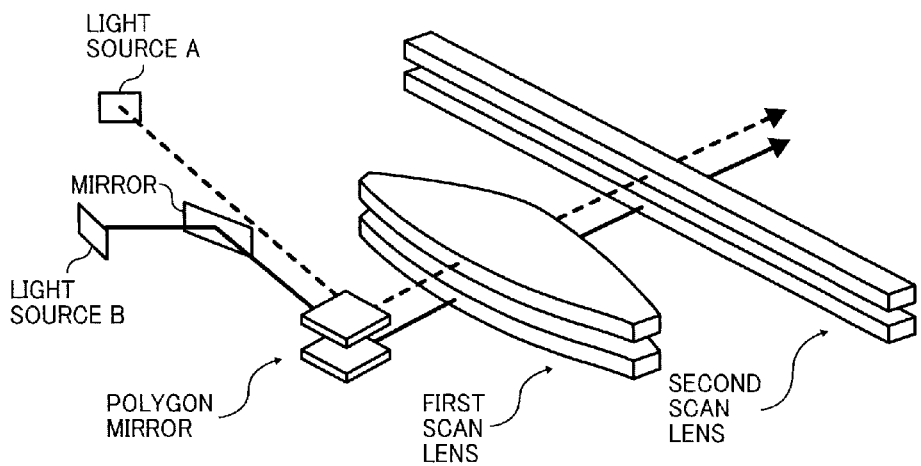
Figure 53:
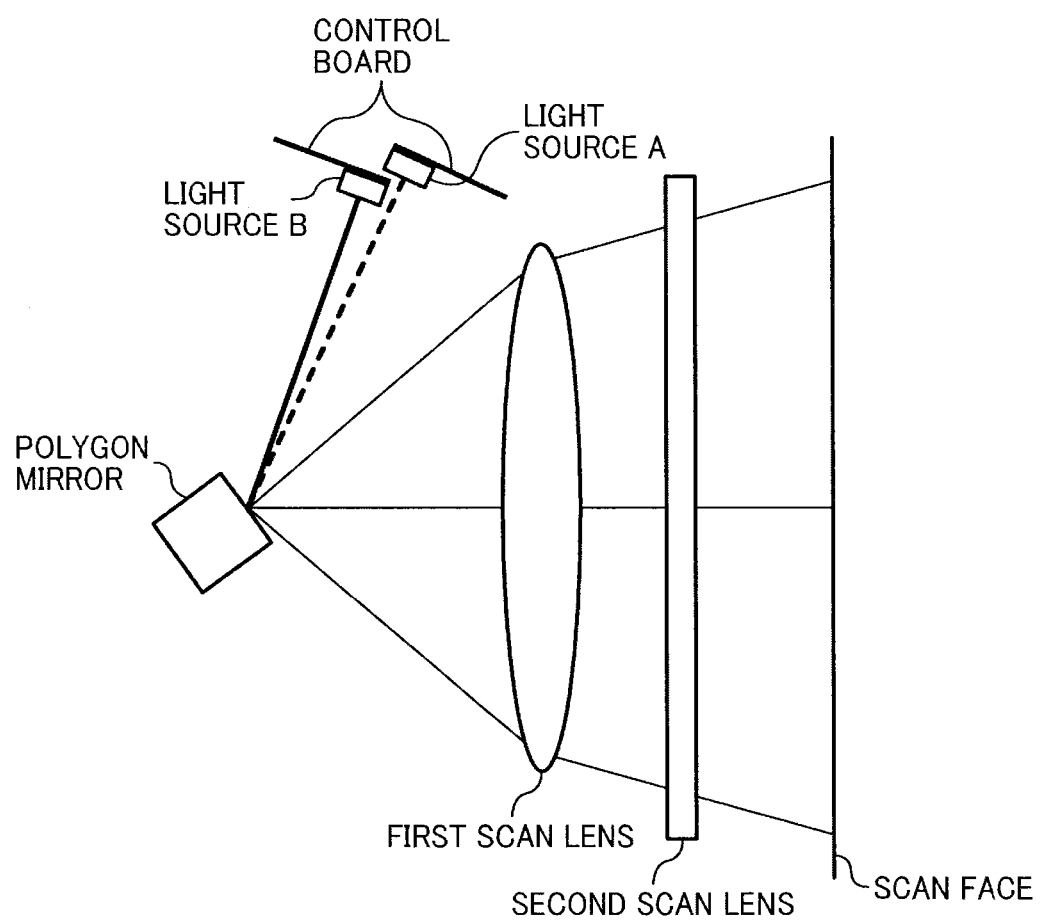

FIG. 26A and FIG. 26B respectively show relationship between ch1-ch40 interval deviation and temperature change in comparison example 2;

FIG. 27A and FIG. 27B respectively show incidence positions of light beam emitted from light-emitting element ch1 and incidence positions of light beam emitted from the light-emitting element ch2 at the second scan lens in modified example 1;

FIG. 28A and FIG. 28B respectively show relationship between ch1-ch2 interval deviation and temperature change in modified example 1;

FIG. 29A and FIG. 29B respectively show incidence positions of light beam emitted from light-emitting element ch1 and incidence positions of light beam emitted from light-emitting element ch2 at the second scan lens in comparison example 3;

FIG. 30A and FIG. 30B respectively show relationship between ch1-ch2 interval deviation and temperature change in comparison example 3;

FIG. 31A and FIG. 31B respectively show incidence positions of light beam emitted from light-emitting element ch1 and the incidence positions of light beam emitted from light-emitting element ch2 at the second scan lens in comparison example 4;

FIG. 32A and FIG. 32B respectively show relationship between ch1-ch2 interval deviation and temperature change in comparison example 4;

FIG. 33A and FIG. 33B respectively show incidence positions of light beam emitted from light-emitting element ch1 and the incidence positions of light beam emitted from light-emitting element ch4 at the second scan lens in modified example 2;

FIG. 34A and FIG. 34B respectively show relationship between ch1-ch4 interval deviation and temperature change in modified example 2;

FIG. 35A and FIG. 35B respectively show incidence positions of light beam emitted from light-emitting element ch1 and incidence positions of light beam emitted from light-emitting element ch4 at the second scan lens in comparison example 5;

FIG. 36A and FIG. 36B respectively show relationship between ch1-ch4 interval deviation and temperature change in comparison example 5;

FIG. 37A and FIG. 37B respectively show incidence positions of light beam emitted from light-emitting element ch1 and incidence positions of light beam emitted from light-emitting element ch4 at the second scan lens in comparison example 6;

FIG. 38A and FIG. 38B respectively show relationship between ch1-ch4 interval deviation and temperature change in comparison example 6;

FIG. 39A and FIG. 39B respectively show incidence positions of light beam emitted from light-emitting element ch1 and incidence positions of light beam emitted from light-emitting element ch8 at the second scan lens in modified example 3;

FIG. 40A and FIG. 40B respectively show relationship between ch1-ch8 interval deviation and temperature change in modified example 3;

FIG. 41A and FIG. 41B respectively show incidence positions of light beam emitted from light-emitting element ch1 and incidence positions of light beam emitted from light-emitting element ch8 at the second scan lens in comparison example 7;

FIG. 42A and FIG. 42B respectively show relationship between ch1-ch8 interval deviation and temperature change in comparison example 7;

FIG. 43A and FIG. 43B respectively show incidence positions of light beam emitted from light-emitting element ch1 and incidence positions of light beam emitted from light-emitting element ch8 at the second scan lens in comparison example 8;

FIG. 44A and FIG. 44B respectively show relationship between ch1-ch8 interval deviation and temperature change in comparison example 8;

FIG. 45A and FIG. 45B show incidence positions of light beam emitted from light-emitting element ch1 and incidence positions of light beam emitted from light-emitting element ch20 at the second scan lens in modified example 4;

FIG. 46A and FIG. 46B show relationship between ch1-ch20 interval deviation and temperature change in modified example 4;

FIG. 47A and FIG. 47B show incidence positions of light beam emitted from light-emitting element ch1 and incidence positions of light beam emitted from light-emitting element ch20 at the second scan lens in comparison example 9;

FIG. 48A and FIG. 48B show relationship between ch1-ch20 interval deviation and temperature change in comparison example 9;

FIG. 49A and FIG. 49B show incidence position of light beam emitted from light-emitting element ch1 and incidence positions of light beam emitted from light-emitting element ch20 at the second scan lens in comparison example 10;

FIG. 50A and FIG. 50B show relationship between ch1-ch20 interval deviation and temperature change in comparison example 10;

FIG. 51 shows an aperture plate of another modified example;

FIG. 52 shows an example of an optical scanning apparatus not using a beam splitter; and FIG. 53 shows another example of an optical scanning apparatus not using a beam splitter.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, an apparatus or system according to an example embodiment is described hereinafter.

Figure 1:
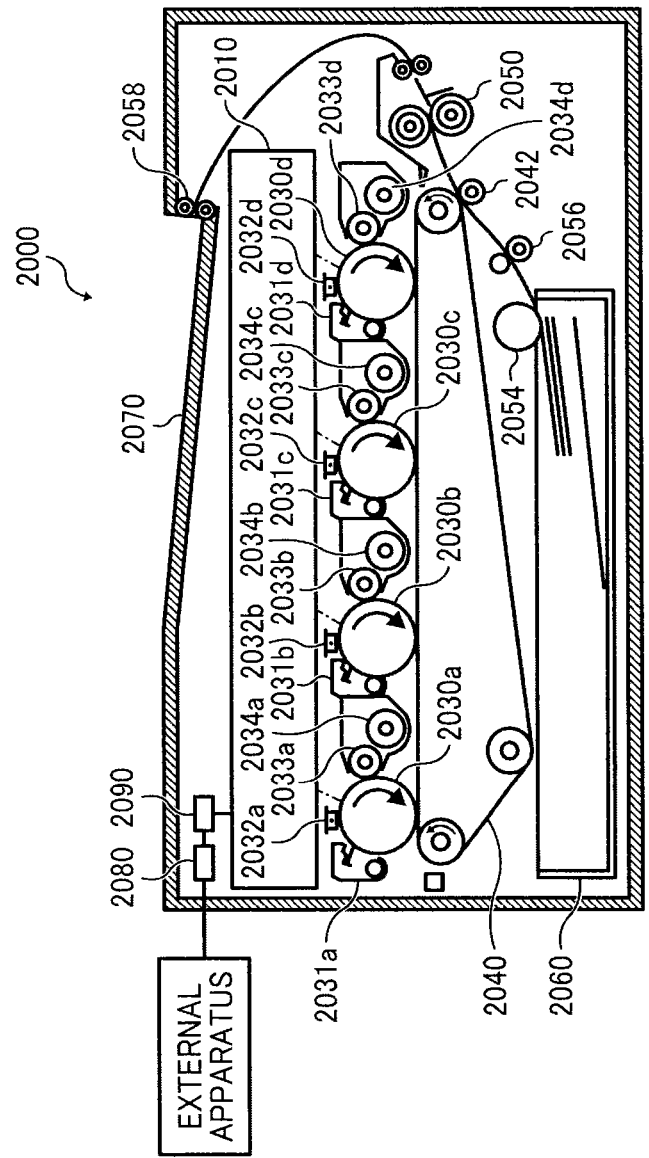
FIG. 1 shows a schematic configuration of an image forming apparatus according to an example embodiment.

A description is now given an image forming apparatus 2000 according to an example embodiment with reference to FIGS. 1 to 26. FIG. 1 shows a schematic configuration of the image forming apparatus 2000.

The image forming apparatus 2000 is, for example, a multi-color printer employing a tandem system which can form a full-color image by superimposing four colors such as black, cyan, magenta, and yellow. The image forming apparatus 2000 includes, for example, an optical writing unit 2010, four photoconductors 2030a, 2030b, 2030c, 2030d, four cleaning units 2031a, 2031b, 2031c, 2031d, four chargers 2032a, 2032b, 2032c, 2032d, four development rollers 2033a, 2033b, 2033c, 2033d, a transfer belt 2040, a transfer roller 2042, a fusing roller 2050, a sheet-feed roller 2054, a sheet-ejection roller 2058, a sheet tray 2060, a sheet-ejection tray 2070, a communication controller 2080, and an apparatus controller 2090 that controls above each unit as a whole.

The communication controller 2080 controls bi-directional communications with external apparatuses such as personal computers via a network.

The apparatus controller 2090 includes, for example, a central processing unit (CPU), a read only memory (ROM), a random access memory (RAM), and an analog/digital (A/D) converter. The ROM stores software programs using coding readable by the CPU, and data to be used with the software programs. The RAM can be used as a working memory. The A/D converter converts analog data to digital data. Further, the apparatus controller 2090 can receives image information from the external apparatuses, and then transmits such image information to the optical writing unit 2010.

The photoconductor 2030a, the charger 2032a, the development roller 2033a, and the cleaning unit 2031a are assembled as an image forming station to form an image of black (hereinafter, K station).

The photoconductor 2030b, the charger 2032b, the development roller 2033b, and the cleaning unit 2031b are assembled as an image forming station to form an image of cyan (hereinafter, C station).

The photoconductor 2030c, the charger 2032c, the development roller 2033c, and the cleaning unit 2031c are assembled as an image forming station to form an image of magenta (hereinafter, M station).

The photoconductor 2030d, the charger 2032d, the development roller 2033d, and the cleaning unit 2031d are assembled as an image forming station to form an image of yellow (hereinafter, Y station).

Each of the photoconductors has a photoconductive layer as a surface layer, which is used as a scanned face. Each of the photoconductors can be rotated in a direction shown by an arrow by a driving unit.

Each of the chargers charges the surface of corresponding photoconductor uniformly.

Based on multi-color image information such as black, cyan, magenta, and yellow image information received from the apparatus controller 2090, the optical writing unit 2010 generates a modulated light beam for each color to scan a corresponding charged photoconductor drum using the modulated light beam, by which a latent image corresponding to each color image information can be formed on the corresponding photoconductor drum. As the photoconductor drum rotates, such latent image is moved to a position facing a corresponding development roller. The optical writing unit 2010 will be described in detail later.

A scanning area on each photoconductor drum that image information is written may be referred to "image forming area" or "effective imaging area."

Each development roller is supplied with corresponding color toner, supplied from a corresponding toner cartridge, as the development roller rotates to form a thin layer of toner uniformly on the surface of the development roller. When the toner on the development roller contacts the surface of corresponding photoconductor drum, toner moves only to the light-exposed portion on the surface of photoconductor drum, and adheres on such portion. As such, each development roller supplies toner to the latent image formed on the surface of corresponding photoconductor drum to develop the latent image as a toner image. The toner image is transferred to the transfer belt 2040 as the photoconductor drum rotates.

Yellow, magenta, cyan, and black toner images are sequentially superimposed on the transfer belt 2040 at a given timing to form a color image.

The sheet tray 2060 stores recording media such as recording sheets. The sheet-feed roller 2054 disposed near the sheet tray 2060 can be used to feed out the recording sheets one by one from the sheet tray 2060. The recording sheet can be fed to a nip between the transfer belt 2040 and the transfer roller 2042 at a given timing to transfer the color image from the transfer belt 2040 to the recording sheet. Then, the recording sheet transferred with the color image is fed to the fusing roller 2050.

The fusing roller 2050 applies heat and pressure to the recording sheet to fuse the toner on the recording sheet. Upon fusing the toner image, the recording sheet is transported to the sheet-ejection tray 2070 via the sheet-ejection roller 2058, and stacked on the sheet-ejection tray 2070 one by one.

Each of the cleaning unit removes remaining toner from the surface of corresponding photoconductor drum. Upon removing the remaining toner, the photoconductor drum can be set at a position facing the corresponding charger again.

Figure 2:
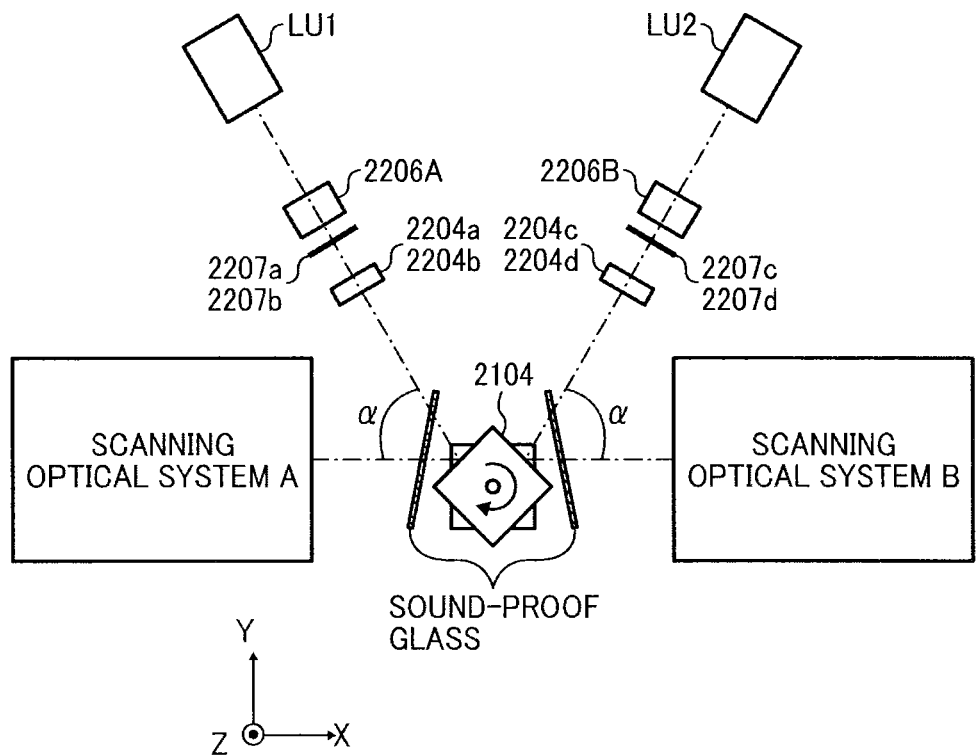
FIG. 2 shows schematic configuration of an optical scanning apparatus used for the image forming apparatus of FIG. 1.
Figure 3:
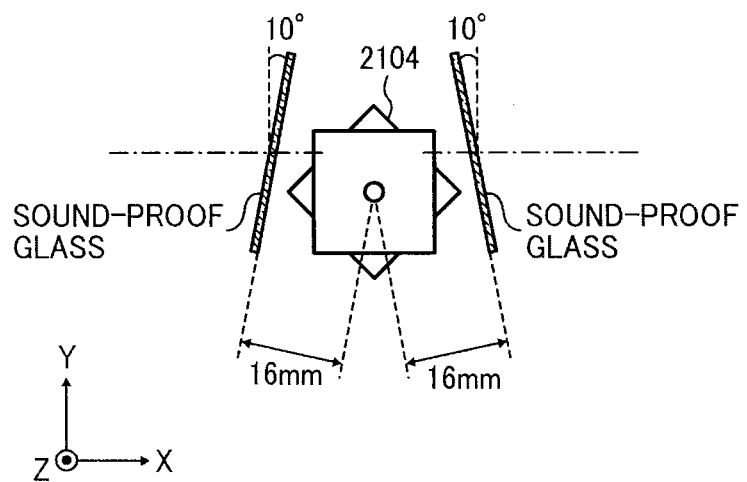
FIG. 3 shows schematic configuration of a sound-proof glass.
Figure 10:
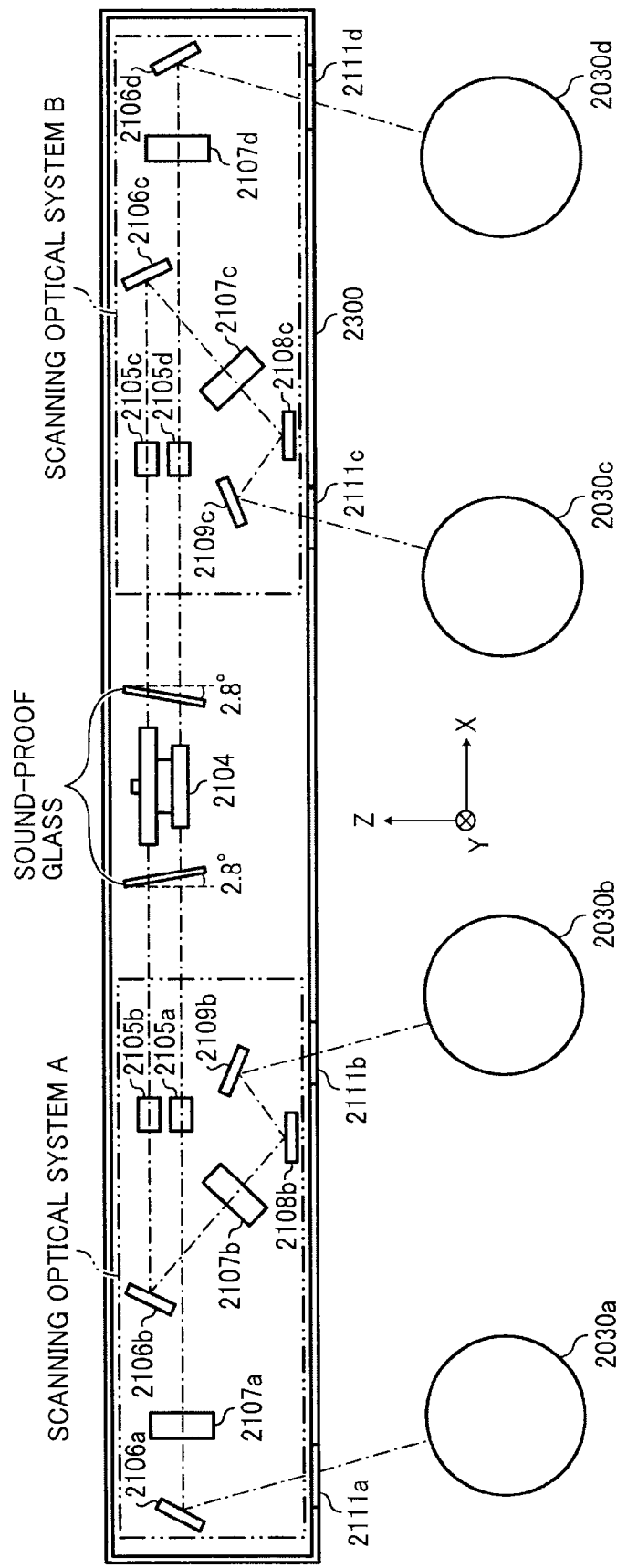
FIG. 10 shows schematic configuration of a scanning optical system A and a scanning optical system B.

A description is given of a configuration of the optical writing unit 2010. As shown in FIG. 2, the optical writing unit 2010 includes, for example, two light source units LU1 and LU2, two beam splitters (or light flux splitters) 2206A, 2206B, four ¼ wavelength plate 2207a, 2207b, 2207c, 2207d, four cylindrical lenses 2204a, 2204b, 2204c, 2204d, a polygon mirror 2104, a scanning optical system A, a scanning optical system B, and a scan controller, and such units and devices installed in an optical housing 2300 as shown in FIG. 10.

In this description, X, Y, Z three-dimensional orthogonal coordinate system is used, in which the long side direction of each photoconductor drum (i.e., rotation axis direction) is aligned to the Y-axis direction, and the rotation axis direction of the polygon mirror 2104 is aligned to the Z-axis direction. Therefore, the Z-axis direction is parallel to the rotation axis direction of the polygon mirror 2104.

Figure 7:
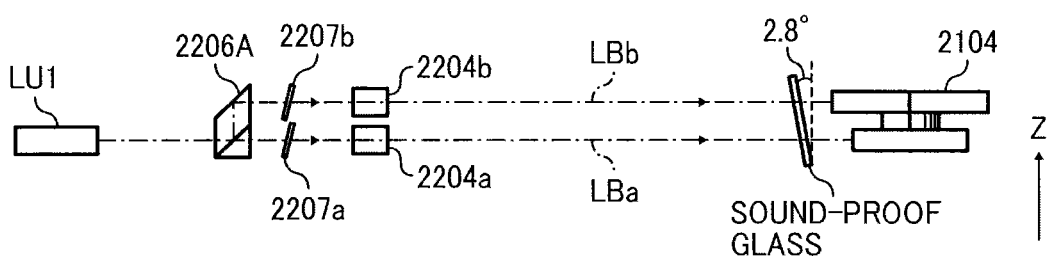
FIG. 7 shows schematic configuration of optical members or devices disposed between the light source unit LU1 and a polygon minor.

Further, in FIG. 2, the ¼ wavelength plate 2207a is positioned at the −Z side of the ¼ wavelength plate 2207b, and the cylindrical lens 2204a is positioned at the −Z side of the cylindrical lens 2204*b* (see FIG. 7). Further, the ¼ wavelength plate 2207*d* is positioned at the –Z side of the ¼ wavelength plate 2207*c*, the cylindrical lens 2204*d* is positioned at the –Z side of the cylindrical lens 2204*c* (see FIG. 8).

The optical housing 2300 has, for example, four light-exit windows (e.g., slit), through which light passes through and then goes to the corresponding photoconductor drum. Each of the light-exit windows is covered by dustproof glasses 2111*a*, 2111*b*, 2111*c*, 2111*d*, respectively as shown in FIG. 10.

Hereinafter, the direction corresponding to the main scanning direction is referred to "main scanning direction," the direction corresponding to the sub-scanning direction is referred to "sub-scanning direction". Further, a direction perpendicular to both of the main scanning direction and the sub-scanning direction is referred to "direction perpendicular to the main-scanning/sub-scanning directions."

The polygon mirror 2104 may be enclosed by a sound-proof wall having a sound-proof glass. The light can pass through the sound-proof glass disposed at a given position of the sound-proof wall. The distance between the rotation center of the polygon mirror 2104 and each sound-proof glass is, for example, 16 mm (see FIG. 3). Further, for example, each of the sound-proof glasses may be slanted with respect to the Y-axis direction about 10 degrees, and the Z-axis direction about 2.8 degrees.

Figure 4:
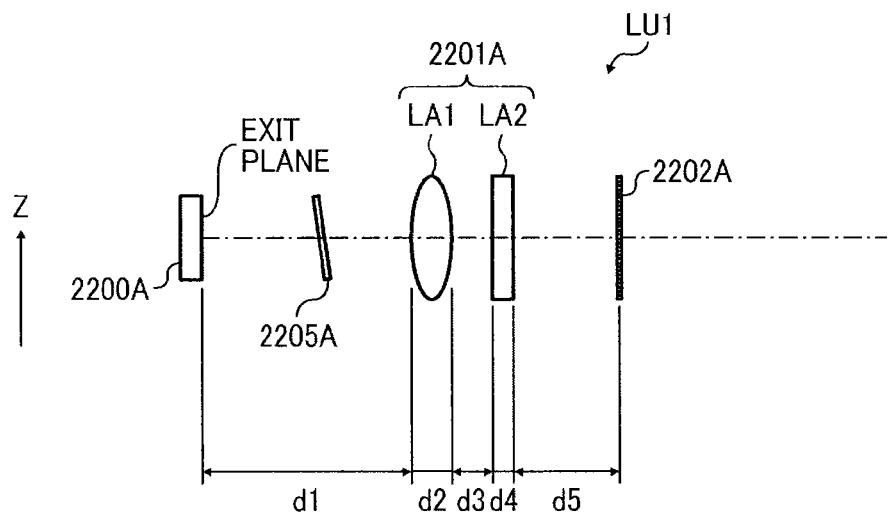
FIG. 4 shows schematic configuration of a light source unit LU1.

As shown in FIG. 4, the light source unit LU1 includes, for example, a light source 2200A, a ¼ wavelength plate 2205A, a coupling optical system 2201A, and an aperture plate 2202A. Such optical members or devices are attached at given locations while maintaining given positional relationships with each other in a holder of the light source unit LU1.

Figure 5:
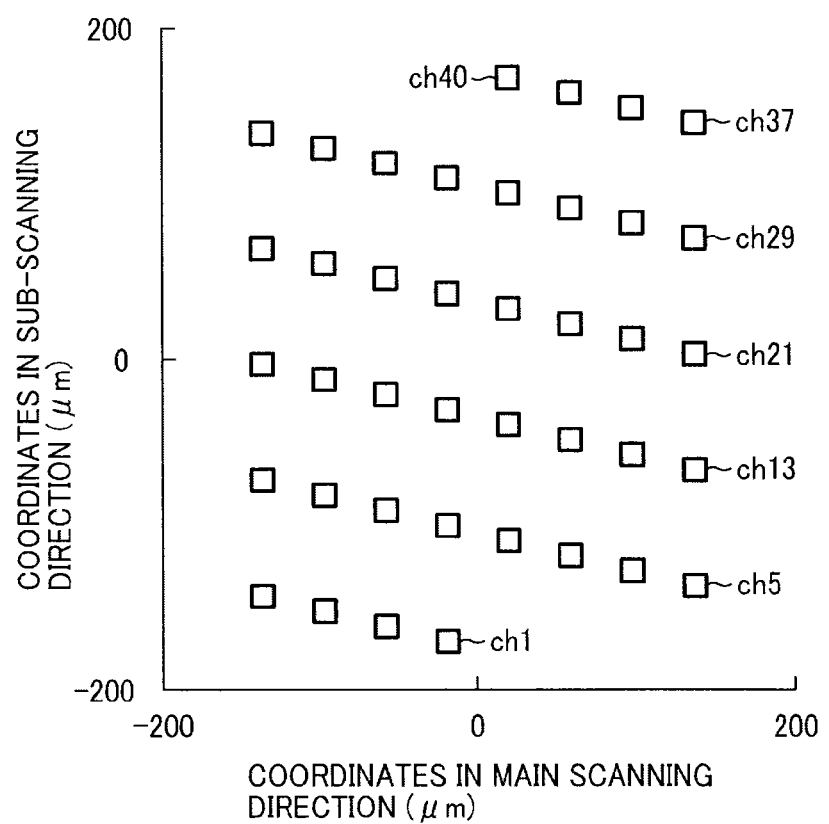
FIG. 5 shows schematic configuration of a surface emitting laser array.

As shown in FIG. 5, the light source 2200A includes, for example, forty (40) light emitting elements ch1 to ch40 arranged in the two dimensional space. In FIG. 5, each position of the forty light emitting elements is indicated by coordinates setting the center of arrangement of the light emitting elements as the base point.

The forty light emitting elements can be disposed with a given pattern. For example, as shown in FIG. 5, when all of the light emitting elements are projected to a virtual line extending in the sub-scanning direction (e.g., Z-axis direction), the light emitting elements can be disposed with the given pattern, in which the interval between the adjacent light emitting elements is set equal for the light emitting elements. In this specification, the interval between the adjacent light emitting elements means the center-to-center distance of adjacent two light emitting elements.

Each of the light emitting elements may be a vertical-cavity surface emitting laser (VCSEL) having an oscillation wavelength of, for example, 782 nm. As such, the light source 2200A may be, for example, a surface emitting laser array.

In this specification, the light emitted from each of the light emitting elements such as channel 1 (ch1) is referred to a light beam, and the light emitted from the light source such as light source 2200A is referred to light flux. Therefore, when a plurality of light emitting elements is turned ON concurrently, a plurality of light beams is emitted, and a group of the plurality of light beams becomes the light flux.

The divergence angle of light beam emitted from each of the light emitting elements at a normal condition, which is the full width half maximum of far field pattern (FFP), is, for example, 6.7 degrees for both of the main scanning direction and the sub-scanning direction.

Further, the light beam emitted from each of the light emitting elements is linearly polarized light having a light deflection direction (i.e., oscillation direction of electric field vector), parallel to the sub-scanning direction.

As shown in FIG. 4, the ¼ wavelength plate 2205A is disposed on the optical path of light flux emitted from the light source 2200A, and the ¼ wavelength plate 2205A converts the light flux from linearly polarized light to circular polarized light.

The coupling optical system 2201A is configured with two lenses LA1 and LA2, by which the light flux passed through the ¼ wavelength plate 2205A is set as substantially parallel light.

The lens LA1 is, for example, a glass lens disposed on the optical path of light flux passing through the ¼ wavelength plate 2205A. The lens LA1 has, for example, the focal length of 34.18 mm and the thickness (d2 of FIG. 4) of 5 mm.

The lens LA2 is, for example, a resin lens disposed on the optical path of light flux passing through the lens LA1. The lens LA2 has, for example, the focal length of –396.79 mm, and the thickness (d4 of FIG. 4) of 2 mm.

The distance between the exit plane of the light source 2200A and the incidence plane of the lens LA1 (d1 of FIG. 4) is, for example, 34.3 mm. The distance between the exit plane of the lens LA1 and the incidence plane of the lens LA2 (d3 of FIG. 4) is, for example, 3 mm. Further, the combined focal length of the lens LA1 and the lens LA2 is, for example, 37 mm.

The aperture plate 2202A has an aperture, by which the light flux coming from the coupling optical system 2201A is shaped. The aperture has a given length in the main scanning direction, for example, 5.6 mm, and a given length in the sub-scanning direction (e.g., Z-axis direction), for example, 0.9 mm. The distance between the exit plane of the lens LA2 and the aperture plate 2202A (d5 of FIG. 4) is, for example, 14 mm.

To set the light-path length before the polygon mirror 2104 as short as possible, the aperture plate 2202A is disposed at a position after the coupling optical system 2201A, wherein such position is relatively at the light source 2200A side compared to the combined focal point of the coupling optical system 2201A set after the coupling optical system 2201A.

The light flux passing through the aperture of the aperture plate 2202A becomes the light flux emitted from the light source unit LU1.

As for the light source unit LU1, manufacturing error and assembly error of each optical member or device can be adjusted by the lens LA1. Therefore, after optical members or devices are attached and fixed at given positions in the holder of the light source unit LU1, the lens LA1 is fixed at a given position in the holder, wherein the position and posture of the lens LA1 is set in a manner so that desired light flux can pass through the aperture of the aperture plate 2202A.

Figure 6:
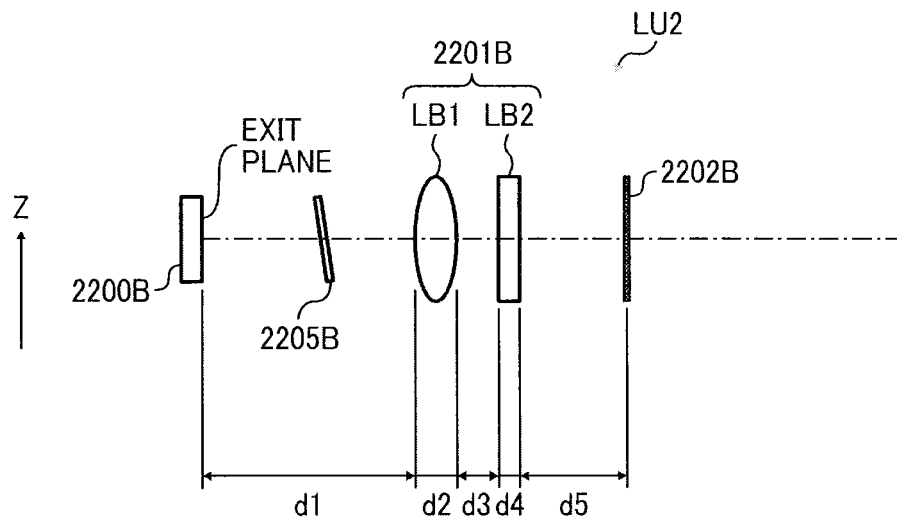
FIG. 6 shows schematic configuration of a light source unit LU2.

As shown in FIG. 6, the light source unit LU2 includes, for example, a light source 2200B, a ¼ wavelength plate 2205B, a coupling optical system 2201B, an aperture plate 2202B. Such optical members or devices are maintained at given locations in a holder of the light source unit LU2. As similar to the light source 2200A, the light source 2200B is, for example, a surface emitting laser array.

The ¼ wavelength plate 2205B is disposed on the optical path of light flux emitted from the light source 2200B, and converts the light flux from linearly polarized light to circular polarized light.

The coupling optical system 2201B is configured with two lenses LB1 and LB2, by which the light flux passed through the ¼ wavelength plate 2205B is set as substantially parallel light.

The lens LB1 is, for example, a glass lens disposed on the optical path of light flux passing through the ¼ wavelength plate 2205B. The lens LB1 has, for example, the focal length of 34.18 mm and the thickness (d2 of FIG. 6) of 5 mm.

The lens LB2 is, for example, a resin lens disposed on the optical path of light flux passing through the lens LB1. The lens LB2 has, for example, the focal length of −396.79 mm, and the thickness (d4 of FIG. 6) of 2 mm.

The distance between the exit plane of the light source 2200B and the incidence plane of the lens LB1 (d1 of FIG. 6) is, for example, 34.3 mm. The distance between the exit plane of the lens LB1 and the incidence plane of the lens LB2 (d3 of FIG. 6) is, for example, 3 mm. Further, the combined focal length of the lens LB1 and the lens LB2 is, for example, 37 mm.

The aperture plate 2202B has an aperture, by which the light flux coming from the coupling optical system 2201B is shaped. The aperture has a given length in the main scanning direction, for example, 5. 6 mm, and a given length in the sub-scanning direction (e.g., Z-axis direction), for example, 0.9 mm. The distance between the exit plane of the lens LB2 and the aperture plate 2202B (d5 of FIG. 6) is, for example, 14 mm.

To set the light-path length before the polygon mirror 2104 as short as possible, the aperture plate 2202B is disposed at a position after the coupling optical system 2201B, wherein such position is relatively at the light source 2200B side compared to the combined focal point of the coupling optical system 2201B set after the coupling optical system 2201B.

The light flux passing through the aperture of the aperture plate 2202B becomes the light flux emitted from the light source unit LU2.

As for the light source unit LU2, manufacturing error and assembly error of each optical member or device can be adjusted by the lens LB1. Therefore, after optical members or devices are attached and fixed at given positions in the holder of the light source unit LU2, the lens LB1 is fixed at a given position in the holder, wherein the position and posture of the lens LB1 is set in a manner so that desired light flux can pass through the aperture of the aperture plate 2202B.

The coupling optical system disposed for the light source unit can suppress deviation of the beam waist position when the ambient temperature changes.

As shown in FIG. 7, the beam splitter 2206A is disposed at a position on the optical path of beam emitted from the light source unit LU1, and splits the light flux into two light fluxes. Further, as shown in FIG. 8, the beam splitter 2206B is disposed at a position on the optical path of light flux emitted from the light source unit LU2, and splits the light flux into two light fluxes.

Figure 9:
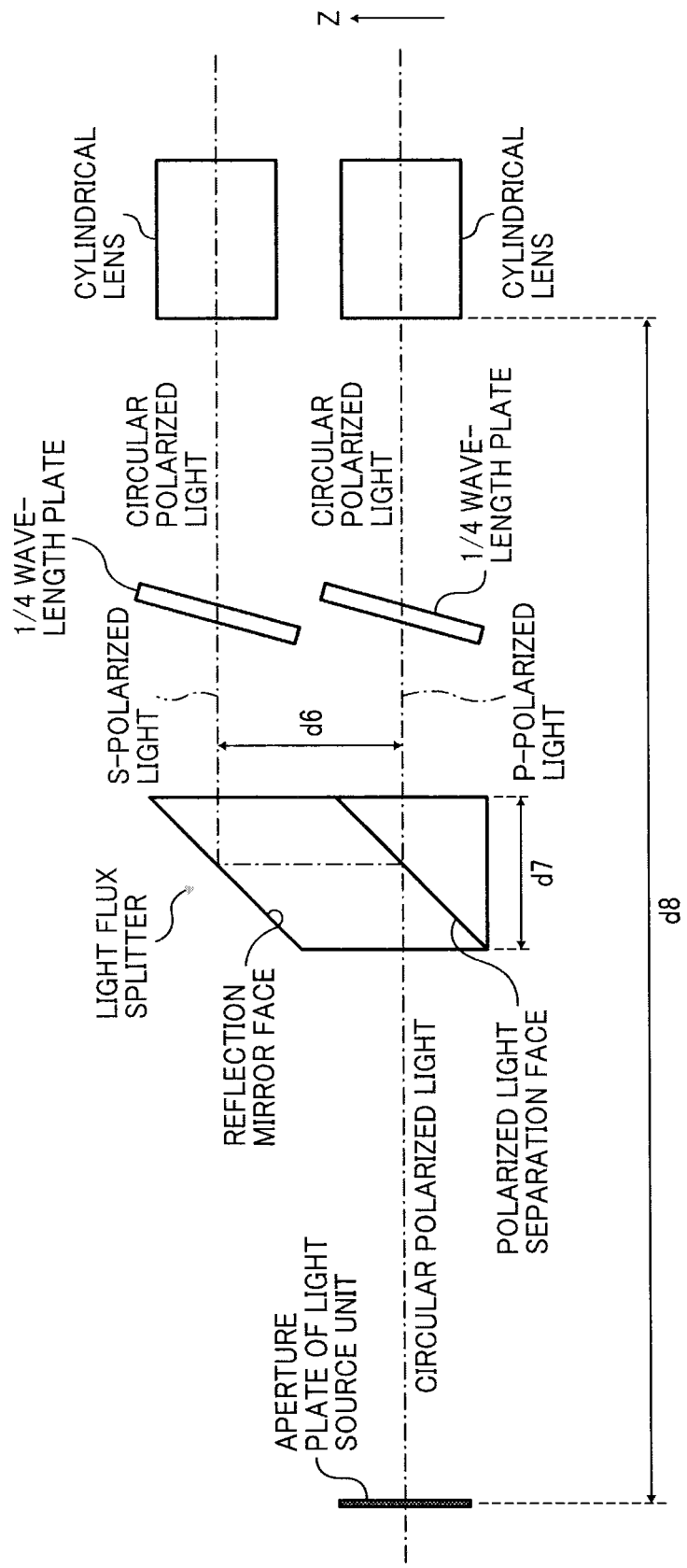
FIG. 9 shows schematic configuration of a beam splitter.

As shown in FIG. 9, the beam splitter includes, for example, a polarized light separation face to pass p-polarized light and reflect s-polarized light, and a reflection mirror face disposed at a position parallel to the polarized light separation face and on the optical path of light flux, reflected at the polarized light separation face. As such, the beam splitter splits the incidence light flux into two light fluxes in parallel with each other. For example, the incidence light flux is split into two light fluxes separated with each other in the Z-axis direction.

For example, the interval of two light fluxes (d6 of FIG. 9) split by the beam splitter (i.e., interval in Z-axis direction) is, for example, 8 mm. The thickness of beam splitter (d7 of FIG. 9) is, for example, 5.7 mm. Further, the polarized light separation face, for example, passes s-polarized light and reflects p-polarized light.

Figure 8:
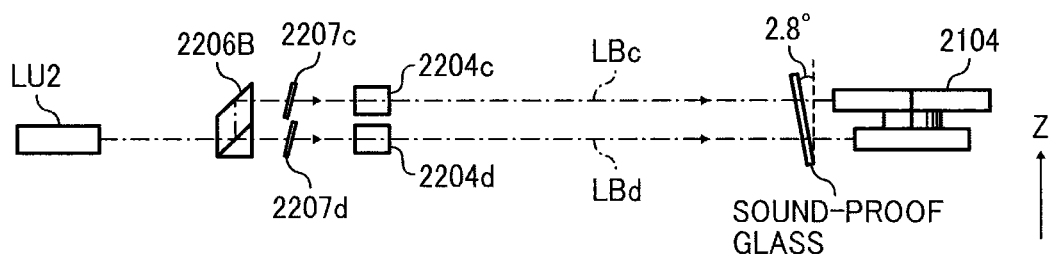
FIG. 8 shows schematic configuration of optical members or devices disposed between the light source unit LU2 and a polygon minor.

Hereinafter, as shown in FIG. 7, the light flux that passes through the polarized light separation face of the beam splitter 2206A is referred "light flux LBa", and the light flux that reflects on the polarized light separation face of the beam splitter 2206A is referred "light flux LBb." Further, as shown in FIG. 8, the light flux that passes through the polarized light separation face of the beam splitter 2206B is referred "light flux LBd", the light flux that reflects on the polarized light separation face of the beam splitter 2206B is referred "light flux LBc."

The ¼ wavelength plate 2207a is disposed on the optical path of the light flux LBa emitted from the beam splitter 2206A, and converts the light flux from linearly polarized light to circular polarized light.

The ¼ wavelength plate 2207b is disposed on the optical path of the light flux LBb emitted from the beam splitter 2206A, and converts the light flux from linearly polarized light to circular polarized light.

The light flux LBa passing the ¼ wavelength plate 2207a and the light flux LBb passing the ¼ wavelength plate 2207b are circular polarized light having the same rotation direction. In such a case, the shading difference between the photoconductor 2030a and the photoconductor 2030b can be reduced.

The ¼ wavelength plate 2207c is disposed on the optical path of the light flux LBc emitted from the beam splitter 2206B, and converts the light flux from linearly polarized light to circular polarized light.

The ¼ wavelength plate 2207d is disposed on the optical path of the light flux LBd emitted from the beam splitter 2206B, and converts the light flux from linearly polarized light to circular polarized light.

The light flux LBc passing the ¼ wavelength plate 2207c and the light flux LBd passing the ¼ wavelength plate 2207d are circular polarized light having the same rotation direction. In such a case, the shading difference between the photoconductor 2030c and the photoconductor 2030d can be reduced.

Each ¼ wavelength plate is slanted with respect to the exit plane of the corresponding light source to suppress the returning of light to the light source.

Each cylindrical lens is, for example, a glass cylindrical lens having the center thickness of, for example, 3 mm, and the focal length of, for example, 60 mm. When each cylindrical lens is viewed from the Z-axis direction, the distance between the aperture plate of the corresponding light source unit and the incidence plane of the cylindrical lens (d8 of FIG. 9) is, for example, 85.3 mm.

The cylindrical lens 2204a is disposed on the optical path of the light flux LBa passing the ¼ wavelength plate 2207a, and focuses the light flux near the deflection face of the polygon mirror 2104 in the Z-axis direction.

The cylindrical lens 2204b is disposed on the optical path of the light flux LBb passing the ¼ wavelength plate 2207b, and focuses the light flux near the deflection face of the polygon mirror 2104 in the Z-axis direction.

The cylindrical lens 2204c is disposed on the optical path of the light flux LBc passing the ¼ wavelength plate 2207c, and focuses the light flux near the deflection face of the polygon mirror 2104 in the Z-axis direction.

The cylindrical lens 2204d is disposed on the optical path of the light flux LBd passing the ¼ wavelength plate 2207d, and focuses the light flux near the deflection face of the polygon mirror 2104 in the Z-axis direction.

When the scanning optical system is fixed in the optical housing 2300, each cylindrical lens is fixed at a given position in the optical housing 2300 to set a desired beam spot diameter and a desired scan line interval on a surface of corresponding photoconductor drum. Specifically, the cylindrical lens is fixed in the optical housing 2300 by adjusting a position in the sub-scanning direction (e.g., Z-axis direction), a position in the main scanning direction, a position in the direction perpendicular to the main-scanning/sub-scanning directions, and a posture along an axis parallel to the direction perpendicular to the main-scanning/sub-scanning directions.

When viewed from the Z-axis direction, the incidence direction of the light flux that enters the polygon mirror 2104 and the X-axis direction define an angle of a (see FIG. 2), which is, for example, 64 degrees.

An optical system disposed between the light source and the polygon mirror 2104 may be referred to an optical system disposed before a deflector.

The polygon mirror 2104 has, for example, two stages having four sided-mirrors for each stage, and each mirror is used as the deflection face that reflects light. The radius of inscribed circle of the four-sided mirrors is, for example, 8 mm.

The light flux LBa coming from the cylindrical lens 2204a and the light flux LBd coming from the cylindrical lens 2204d can be deflected by the four-sided mirrors of the first stage (or lower stage) while the light flux LBb coming from the cylindrical lens 2204b and the light flux LBc coming from the cylindrical lens 2204c can be deflected by the four-sided mirrors of the second stage (or upper stage).

The light flux coming from the cylindrical lens 2204a and the cylindrical lens 2204b may be deflected to the −X side of the polygon mirror 2104 while the light flux coming from the cylindrical lens 2204c and the cylindrical lens 2204d may be deflected to the +X side of the polygon mirror 2104.

When viewed from the Z-axis direction, the four-sided mirrors of the first stage and the four-sided mirrors of the second stage are shifted their positions with a given angle such as 45 degrees (see FIG. 2), and can be rotated in a given direction. The write-scanning process can be conducted by deflecting light alternately on the first stage mirrors and the second stage mirrors. With such a configuration, the write-scanning process can be conducted to two photoconductor drums by using one single light source.

The light-path length of the light flux emitted from the light source 2200A and deflected by the four-sided mirrors of the first stage is shorter than the light-path length of the light flux emitted from the light source 2200A and deflected by the four-sided mirrors of the second stage by the distance d6 (e.g., 8 mm).

Similarly, the light-path length of the light flux emitted from the light source 2200B and deflected by the four-sided mirrors of the first stage is shorter than the light-path length of the light flux emitted from the light source 2200B and deflected by the four-sided mirrors of the second stage by the distance d6.

As such, the light flux emitted from one light source can be split into two light fluxes by the light flux splitter. As for the two light fluxes, the light-path length of one light flux extending from the light source and the polygon mirror is different from the light-path length of another light flux extending from the light source and the polygon mirror by the distance of d6.

As shown in FIG. 10, the scanning optical system A is disposed at, for example, the −X side of the polygon mirror 2104. The scanning optical system A includes, for example, two first scan lenses 2105a, 2105b, two second scan lenses 2107a, 2107b, and four reflection mirrors 2106a, 2106b, 2108b, 2109b.

The first scan lens 2105a, the second scan lens 2107a, and the reflection mirror 2106a are optical members or devices to guide the light flux LBa deflected by the polygon mirror 2104 to the photoconductor 2030a via the dustproof glass 2111a. Such optical members or devices are used as optical members or devices of the K station. Hereinafter, an optical system having the first scan lens 2105a, the second scan lens 2107a, and the reflection mirror 2106a may be referred to "K optical system."

The first scan lens 2105b, the second scan lens 2107b, and three reflection mirrors 2106b, 2108b, 2109b are optical members or devices to guide the light flux LBb deflected by the polygon mirror 2104 to the photoconductor 2030b via the dustproof glass 2111b. Such optical members or devices are used as optical members or devices of the C station. Hereinafter, an optical system having the first scan lens 2105b, the second scan lens 2107b, and three reflection mirrors 2106b, 2108b, 2109b may be referred to "C optical system."

As shown in FIG. 10, the scanning optical system B is disposed at, for example, the +X side of the polygon mirror 2104. The scanning optical system B includes, for example, two first scan lenses 2105c, 2105d, two second scan lenses 2107c, 2107d, and four reflection mirrors 2106c, 2106d, 2108c, 2109c.

The first scan lens 2105c, the second scan lens 2107c, and three reflection mirrors 2106c, 2108c, 2109c are optical members or devices to guide the light flux LBc deflected by the polygon mirror 2104 to the photoconductor 2030c via the dustproof glass 2111c. Such optical members or devices are used as optical members or devices of the M station. Hereinafter, an optical system having the first scan lens 2105c, the second scan lens 2107c, and three reflection mirrors 2106c, 2108c, 2109c may be referred to "M optical system."

The first scan lens 2105d, the second scan lens 2107d, and the reflection mirror 2106d are optical members or devices to guide the light flux LBd deflected by the polygon mirror 2104 to the photoconductor 2030d via the dustproof glass 2111d. Such optical members or devices are used as optical members or devices of the Y station. Hereinafter, an optical system having the first scan lens 2105d, the second scan lens 2107d, and the reflection mirror 2106d may be referred to "Y optical system."

The lateral magnification in the sub-scanning direction of each of four optical systems such as K, C, M, Y optical systems is set, for example, to −0.75 times.

Each of the first scan lenses is, for example, a resin lens having the center thickness of, for example, 17 mm. Further, each of the second scan lenses is, for example, a resin lens having the center thickness of, for example, 5 mm.

The distance between the rotation center of the polygon mirror 2104 and the surface of the each of the photoconductor drums is, for example, 304 mm.

When a plurality of light emitting elements is concurrently tuned ON at each light source, the plurality of light beams irradiates the surface of each photoconductor drum, by which a plurality of beam spots is formed on the surface of each photoconductor drum.

The plurality of beam spots can be formed on the surface of each photoconductor drum along the axis direction (or long side direction) of each photoconductor drum as the polygon mirror 2104 rotates. The forming direction of beam spots corresponds to the main scanning direction (or a first direction), and the rotation direction of the photoconductor drum corresponds to the sub-scanning direction (or a second direction).

The size of beam spot on the surface of each photoconductor drum is designed, for example, 60 µm in the main scanning direction, and 60 µm in the sub-scanning direction, but not limited thereto.

The scanning process employed for an example embodiment may be the interlace scanning, in which the writing density in the sub-scanning direction is set, for example, 4800 dot per inch (dpi). When forty light emitting elements are used in such a configuration, the sub-scanning direction interval between the beam spot formed by the light beam of a light-emitting element ch1 and the beam spot formed by the light beam of a light-emitting element ch40 (hereinafter, ch1-ch40 interval) is designed to, for example, 407 μm. Further, the ambient temperature is designed to, for example, 25 Celsius degrees.

As above described, the scanning optical system A and the scanning optical system B can employ a similar configuration. Further, the optical members or devices of the scanning optical system A and the optical members or devices of the scanning optical system B can be disposed symmetrical positions with respect to the Y-Z plane extending along the rotation center of the polygon mirror 2104.

Figure 11:
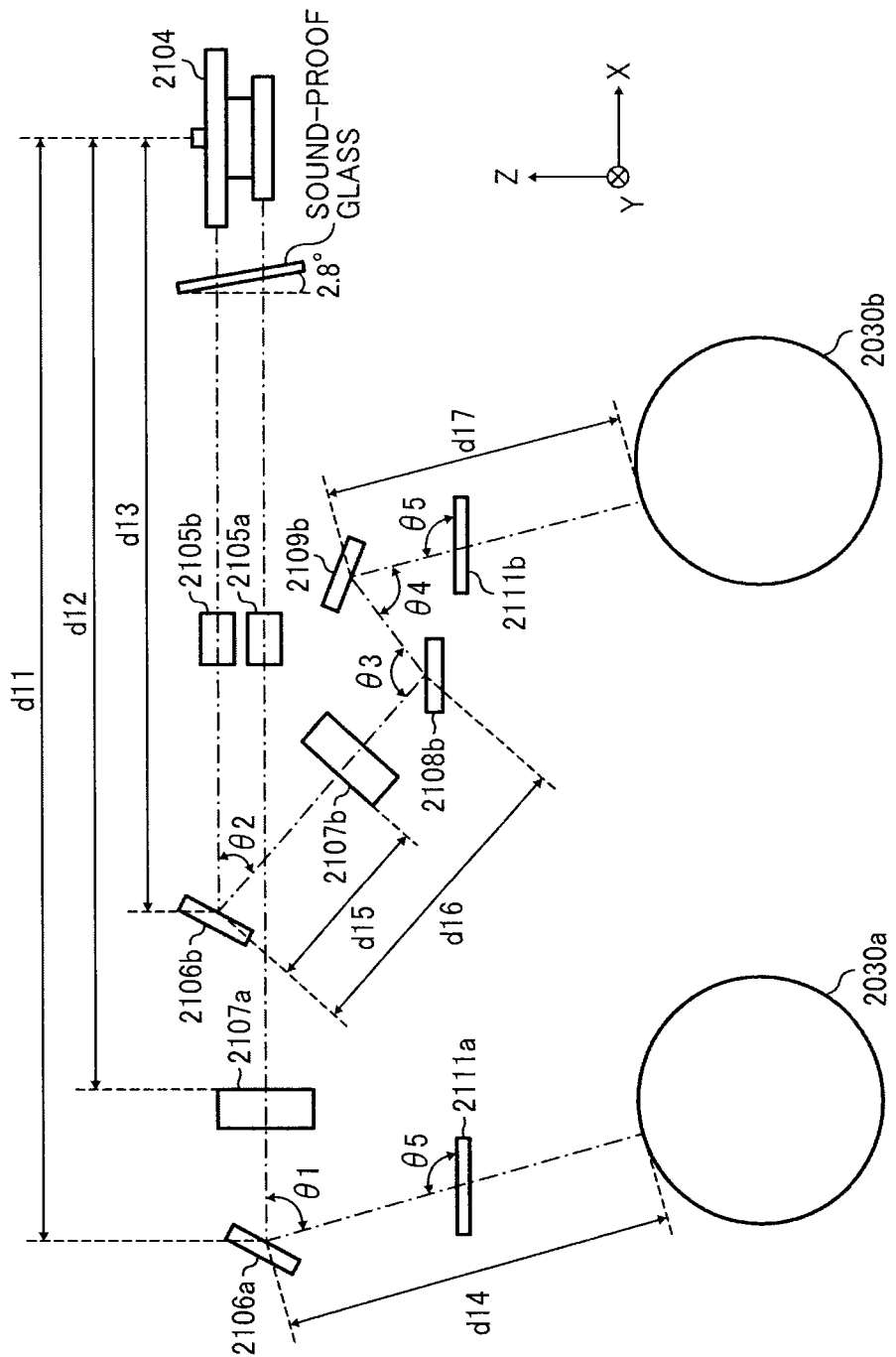
FIG. 11 shows an expanded view of the scanning optical system A.

FIG. 11 shows an example of an arrangement pattern of optical members or devices of the scanning optical system A. In this arrangement, the distance d11 between the rotation center of the polygon mirror 2104 and the reflection point of the reflection mirror 2106a is, for example, 205.8 mm; the distance d12 between the rotation center of the polygon mirror 2104 and the base point of the incidence plane of the second scan lens 2107a is, for example, 169 mm; and the distance d13 between the rotation center of the polygon mirror 2104 and the reflection point of the reflection mirror 2106b is, for example, 125 mm.

Further, the distance d14 between the reflection point of the reflection mirror 2106a and the surface of the photoconductor 2030a is, for example, 98.2 mm.

Further, the distance d15 between the reflection point of the reflection mirror 2106b and the base point of the incidence plane of the second scan lens 2107b is, for example, 44 mm; the distance d16 between the reflection point of the reflection mirror 2106b and the reflection point of the reflection mirror 2108b is, for example, 76 mm; the distance between the reflection point of the reflection mirror 2108b and the reflection point of the reflection mirror 2109b is, for example, 30 mm; and the distance d17 between the reflection point of the reflection mirror 2109b and the surface of the photoconductor 2030b is, for example, 73 mm.

Further, the reflection angle θ1 at the reflection mirror 2106a is, for example, 75 degrees; the reflection angle θ2 at the reflection mirror 2106b is, for example, 41 degrees; the reflection angle θ3 at the reflection minor 2108b is, for example, 103.2 degrees; and the reflection angle θ4 at the reflection mirror 2109b is, for example, 69.2 degrees.

Further, the angle θ5 set by the progression direction of the light flux progressing to each photoconductor drum and the dustproof glass is, for example, 105 degrees.

Figure 12:
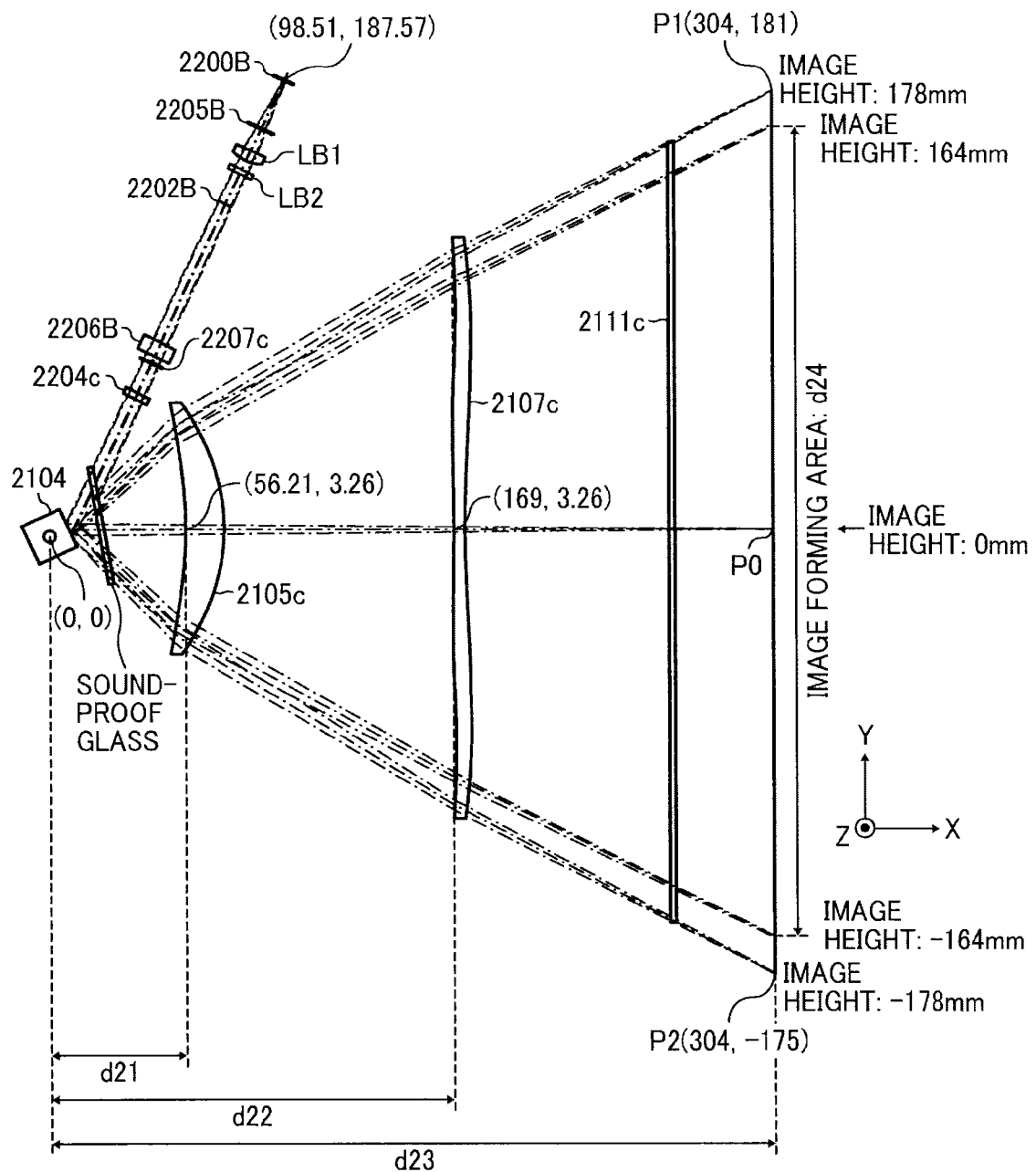
FIG. 12 shows an example of an arrangement pattern of scan lenses.

FIG. 12 shows an example of an arrangement pattern of scan lenses used for the light flux LBc deflected by the polygon mirror 2104. For simplicity of the explanation, the light path of the light flux LBc is shown in the XY plane. In such arrangement, the distance d21 between the rotation center of the polygon minor 2104 and the base point of the incidence plane of the first scan lens 2105c is, for example, 56.21 mm; the distance d22 between the rotation center of the polygon mirror 2104 and the base point of the incidence plane of the second scan lens 2107c is, for example, 169 mm; and the distance d23 between the rotation center of the polygon mirror 2104 and a target surface (i.e., surface of photoconductor 2030c) is, for example, 304 mm.

Further, the length or width d24 of the image forming area is, for example, 328 mm. When the center of the image forming area (i.e., point P0 in FIG. 12) is set zero (0), the coordinates in the Y-axis direction with respect to the point P0 is referred to "image height." In an example shown in FIG. 12, the image height at the +Y end side of the image forming area is 164 mm, and the image height at the −Y end side of the image forming area is 164 mm.

In an example embodiment, a synchronization detection sensor is disposed at a position corresponding the position P1 in FIG. 12 (e.g., position corresponding to the image height of 178 mm), and a synchronization detection sensor is disposed at a position corresponding the position P2 in FIG. 12 (e.g., position corresponding to the image height of −178 mm). Each of the synchronization detection sensors outputs a signal corresponding to the received light intensity to the scan controller. Further, the synchronization detection sensor disposed at the position to receive light beam before starting the writing may be referred to a "front-end synchronization detection sensor," and the synchronization detection sensor disposed at the position to receive light beam after completing the writing may be referred to a "rear-end synchronization detection sensor".

When, for example, two dimensional coordinates setting the rotation center of the polygon mirror 2104 as the base point (0, 0) on the XY plane is assumed, the coordinates of the light source 2200B is (98.51, 187.57); the coordinates of the base point of the incidence plane of the first scan lens 2105c is (56.21, 3.26), the coordinates of the base point of the incidence plane of the second scan lens 2107c is (169, 3.26), the coordinates of P1 is (304, 181), and the coordinates of P2 is (304, −175), in which the unit of each of coordinates is millimeter (mm). Further, as for the Y-axis direction, the rotation center of the polygon mirror 2104 and the center of the effective scanning area may not match.

Figures 13, 14:
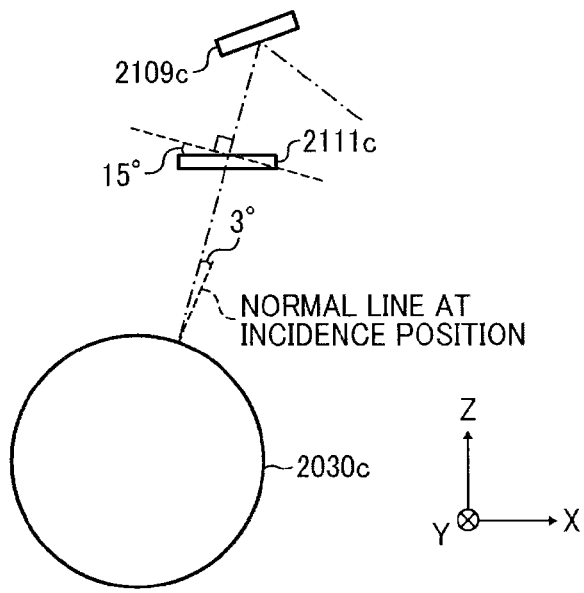
FIG. 13 shows an example of an arrangement pattern of a dustproof glass and a photoconductor drum.
FIG. 14 shows example parameters of a first scan lens.

Further, as shown in FIG. 13, each of the dustproof glasses is slanted to a plane perpendicular to the progression direction of the light flux that passes the each of the dustproof glasses, for example, by 15 degrees. Further, as shown in FIG. 13, the progression direction of the light flux that strikes each of the photoconductor drums is slanted with respect to the normal line at the incidence position, for example, by 3 degrees.

A cross-sectional shape of optical face of each scan lens in the main scanning direction, which is perpendicular to the Z-axis direction, is a free-form curve shape that can be expressed by the following equation (1), in which "x" is a depth in the X-axis direction, and further, "y" is a distance from the optical axis in the Y-axis direction. Further, K is conic constant, A, B, C, D are coefficients. Further, Cm=1/Ry, in which Ry is paraxial radius of curvature.

$$x(y, z) = \frac{y^2 \cdot Cm}{1 + \sqrt{1 - (1 + K) \cdot (y \cdot Cm)^2}} + A \cdot y^4 + B \cdot y^6 + C \cdot y^8 + D \cdot y^{10} + \frac{Cs(y) \cdot z^2}{1 + \sqrt{1 - (Cs(y) \cdot z)^2}} \quad (1)$$

Further, a cross-sectional shape of optical face of each scan lens in the sub-scanning direction, which is perpendicular to the Y-axis direction), is a shape that can be expressed by the following equation (2).

$$Cs(y) = \frac{1}{Rz} + a \cdot y + b \cdot y^2 + c \cdot y^3 + d \cdot y^4 + e \cdot y^5 + f \cdot y^6 + g \cdot y^7 + h \cdot y^8 + i \cdot y^9 + j \cdot y^{10} \quad (2)$$

Rz in the equation (2) is radius of curvature on the optical axis in the cross-section face in the sub-scanning direction. Further, a, b, c, d, e, f, g, h, i, j are coefficients.

Each of the first scan lenses has, for example, the same shape, and FIG. 14 shows one example of the first scan lens. Further, each of the second scan lenses has, for example, the same shape, and FIG. 15 shows one example of the second scan lens. Further, each of the reflection mirrors has, for example, the same shape.

The K optical system and C optical system are both configured with the first scan lens, the second scan lens, and the reflection mirror. The difference of the K optical system and C optical system is the numbers of the reflection mirror.

The M optical system and Y optical system are both configured with the first scan lens, the second scan lens, and the reflection mirror. The difference of the M optical system and Y optical system is the numbers of the reflection mirror.

The scan controller computes the scanning-start timing for each photoconductor drum based on an output signal of the front-end synchronization detection sensor set for each station. Further, based on the output signal of the front-end synchronization detection sensor and the output signal of the rear-end synchronization detection sensor for each station, the scan controller computes a scan time that is required by the beam to scan the target surface set between the front-end synchronization detection sensor and the rear-end synchronization detection sensor, and sets or re-sets the reference frequency of the pixel clock signal so that the numbers of pre-set pulse can be included in the scan time. With such a configuration, entire width magnification of images on a transfer belt, which is formed by at each station, can be set to a desired value constantly.

In an example embodiment, one light flux emitted from one light source is split in two light fluxes to scan two target surfaces, by which the numbers of light source can be reduced compared to the numbers of photoconductor drum. Especially, when a surface emitting laser array is used as the light source, the reduction of the numbers of surface emitting laser array can reduce cost greatly because the surface emitting laser array is relatively expensive.

Image forming apparatuses adapted for producing multi-color images using a multi-beam scanning system are required to set an interval for a plurality of beam spots in the sub-scanning direction (hereinafter, beam pitch in the sub-scanning direction) on the surface of each photoconductor drum. Specifically, a difference between a desired beam pitch and an actual beam pitch in the sub-scanning direction on the surface of each photoconductor drum is required to be set as small as possible. Hereinafter, such difference may be referred to "beam pitch deviation or fluctuation in the sub-scanning direction."

In general, scan lenses employ resin lenses to reduce cost such as manufacturing cost. However, compared to glass lenses, optical properties of resin lenses change greatly when temperature changes.

In an example embodiment, both of the first scan lens and the second scan lens are, for example, resin lenses. Further, the lens power of the second scan lens in the sub-scanning direction is set greater than the lens power of the first scan lens in the sub-scanning direction. Therefore, when the ambient temperature changes, the beam pitch deviation in the sub-scanning direction increases with an effect of the second scan lens. Further, as for the exit plane and incidence plane of the second scan lens, for example, the lens power in the sub-scanning direction of the exit plane is set greater the lens power in the sub-scanning direction of the incidence plane (see FIG. 15).

The inventor has researched various configurations, and devised a configuration that can reduce the beam pitch deviation in the sub-scanning direction caused by temperature change, in which incidence positions of a plurality of light beams entering a second scan lens is set closer as much as possible in the sub-scanning direction.

Figure 16A:
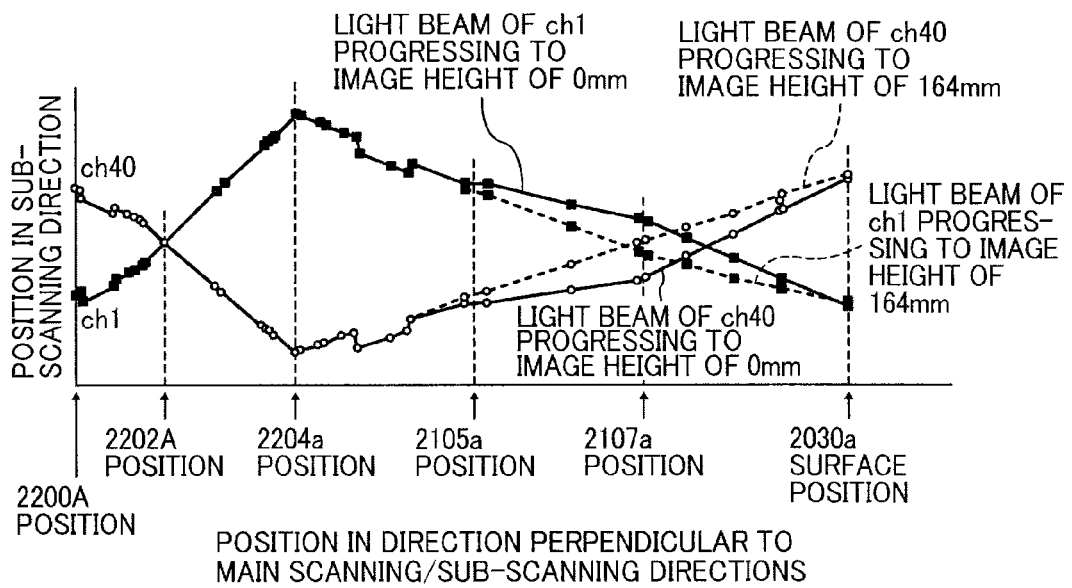
FIG. 16A and FIG. 16B respectively show a light path of a main light beam of light beams emitted from a light-emitting element ch1, and a light path of main light beam of light beams emitted from a light-emitting element ch40.

FIG. 16A shows a light path of a main light beam of light beams emitted from the light-emitting element ch1 of the light source 2200A and progressing to the photoconductor 2030a, and a light path of a main light beam of light beams emitted from the light-emitting element ch40 of the light source 2200A and progressing to the photoconductor 2030a.

Figure 16B:
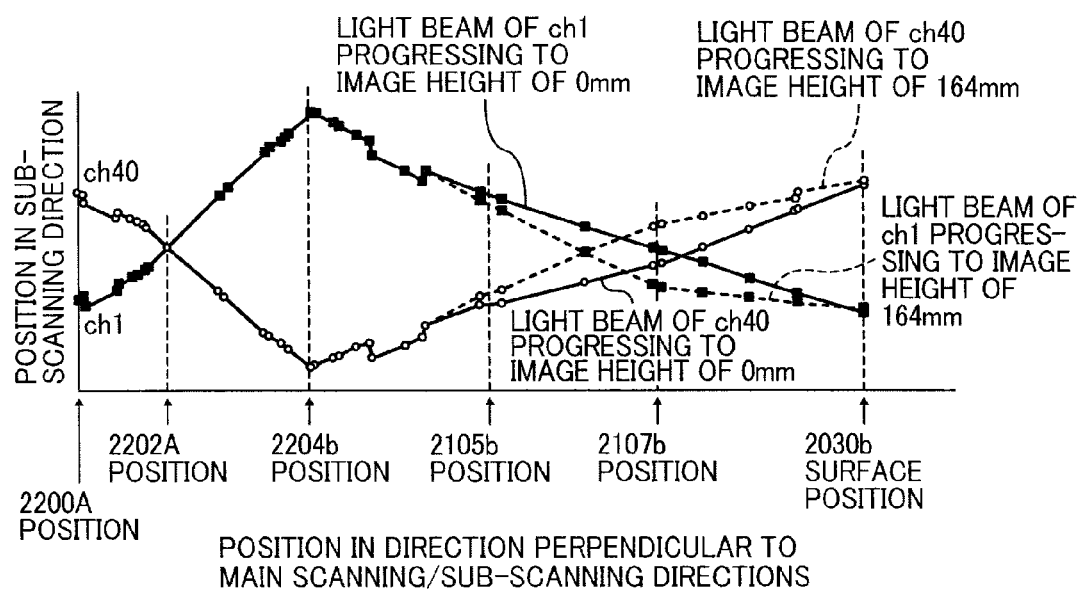
Figure 17:
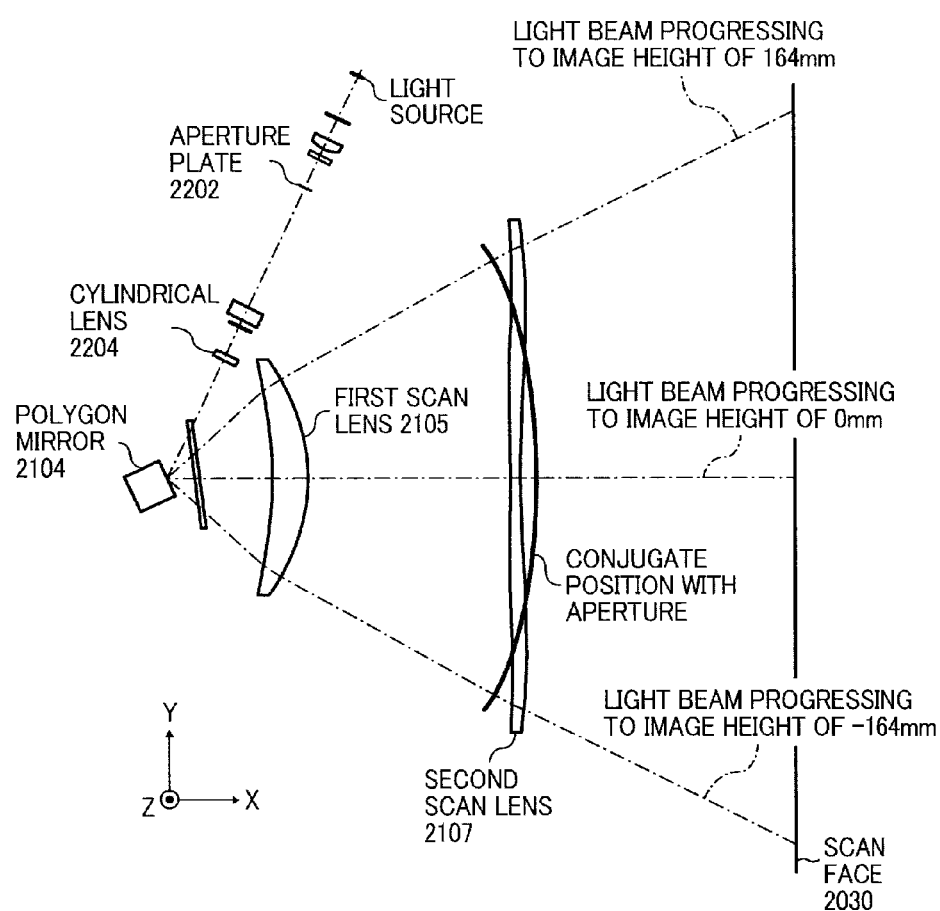
FIG. 17 schematically shows positions of scan lenses and conjugated position with respect to an aperture.

FIG. 16B shows a light path of a main light beam of light beams emitted from the light-emitting element ch1 of the light source 2200A and progressing to the photoconductor 2030b, and a light path of a main light beam of light beams emitted from the light-emitting element ch40 of the light source 2200A and progressing to the photoconductor 2030b. In FIGS. 16A and 16B, the light-path length d6 corresponding to the light path in the beam splitter 2206A is not shown to simplify the explanation.

Each main light beam passes through the center of the aperture of the aperture plate 2202A, and then is curved greatly by the corresponding cylindrical lens. The main light beam of light beams progressing from ch1 to the image height of 0 mm and the main light beam of light beams progressing from ch40 to the image height of 0 mm intersect or contact with each other at a position after the corresponding second scan lens, and the main light beam of light beams progressing from ch1 to the image height of 164 mm and the main light beam of light beams progressing from ch40 to the image height of 164 mm intersect or contact with each other at a position before the corresponding second scan lens.

If it is assumed that the light source 2200A is aligned with the center of the aperture of the aperture plate 2202A, the conjugate point for the aperture for the light beam progressing to the image height of 0 mm is set at a position after the corresponding second scan lens. The conjugate point shifts toward the polygon mirror 2104 side as the absolute value of the image height increases, and the conjugate point for the aperture for the light beam progressing to the image height of 164 mm is set at a position before the corresponding second scan lens (see FIG. 17).

Figure 18A:
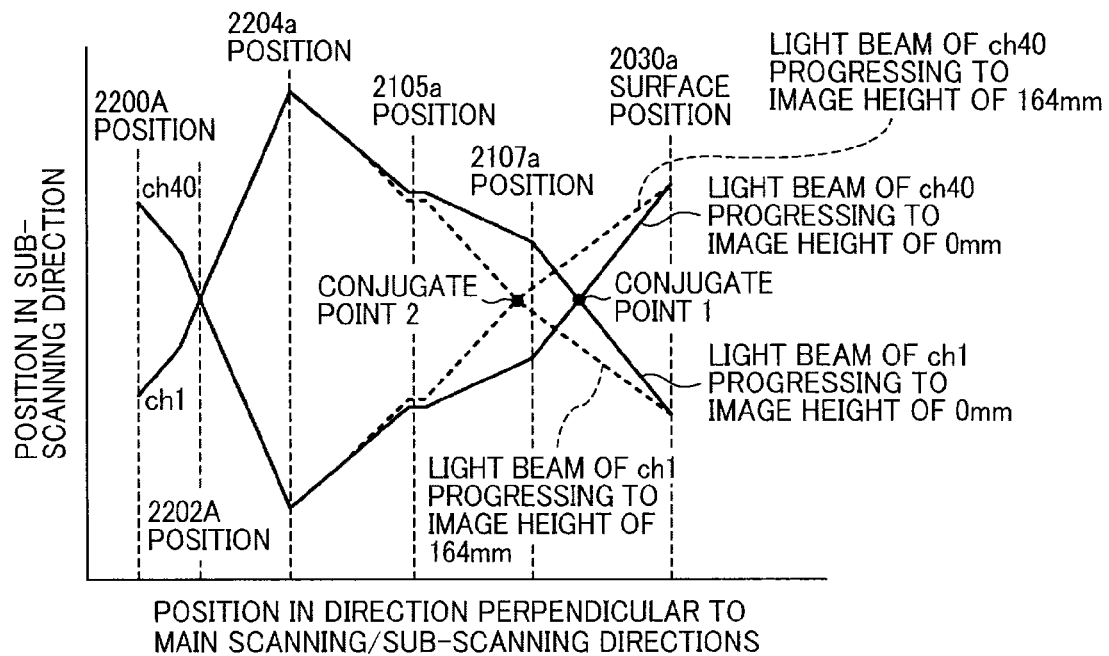
FIG. 18A and FIG. 18B respectively show positional relationship between a second scan lens and conjugate points with respect to an aperture.

As for an example embodiment, FIG. 18A shows a relationship between the position of the second scan lens 2107a and a conjugate point (hereinafter, conjugate point 1) of the light beam progressing to the image height of 0 mm on the photoconductor 2030a, and a relationship between the position of the second scan lens 2107a and a conjugate point (hereinafter, conjugate point 2) of the light beam progressing to the image height of 164 mm on the photoconductor 2030a.

As shown in FIG. 18A, the second scan lens 2107a is positioned between the conjugate point 1 and the conjugate point 2 when viewed from the direction perpendicular to the main-scanning/sub-scanning directions.

Figure 18B:
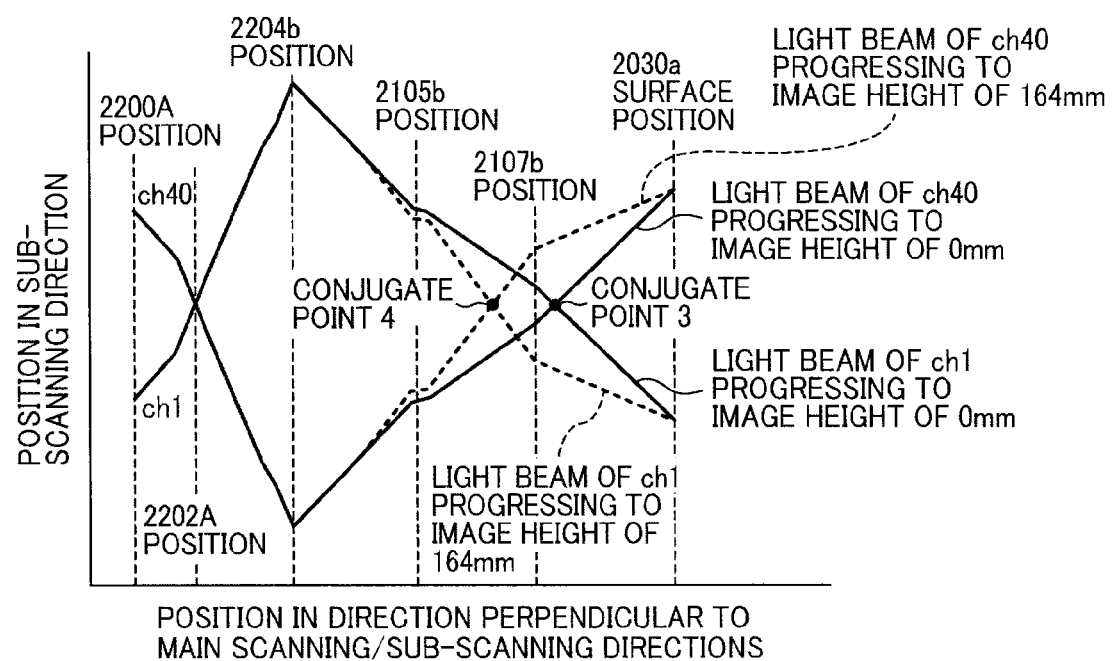

As for an example embodiment, FIG. 18B shows a relationship between the position of the second scan lens 2107b and a conjugate point (hereinafter, conjugate point 3) of the light beam progressing to the image height of 0 mm on the photoconductor 2030b, and a relationship between the position of the second scan lens 2107b and a conjugate point (hereinafter, conjugate point 2) of the light beam progressing to the image height of 164 mm on the photoconductor 2030b.

As shown in FIG. 18B, the second scan lens 2107b is positioned between the conjugate point 3 and the conjugate point 4 when viewed from the direction perpendicular to the main-scanning/sub-scanning directions.

The position of conjugate point with respect to the aperture plate can be adjusted by adjusting at least any one of the focal length of the coupling lens, the focal length of the cylindrical lens, the power on axis of the first scan lens, and the power on outside of axis of the first scan lens.

Figure 19A:
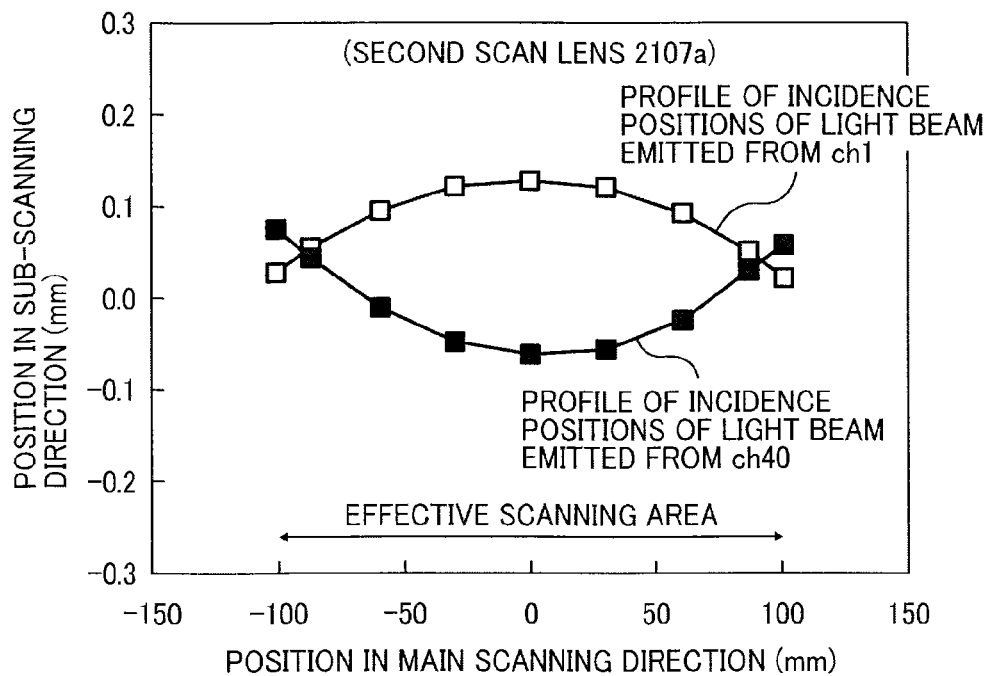
FIG. 19A and FIG. 19B respectively show incidence positions of light beam emitted from light-emitting element ch1 and incidence positions of light beam emitted from light-emitting element ch40 at the second scan lens.

FIG. 19A shows incidence positions of light beam emitted from the light-emitting element ch1 and incidence positions of light beam emitted from the light-emitting element ch40 in the effective scanning area of the incidence face of the second scan lens 2107a. In an example embodiment, the profile of incidence positions of light beam emitted from the light-emitting element ch1 and the profile of incidence positions of light beam emitted from the light-emitting element ch40 intersect or contact with each other. In this disclosure, the incidence positions of light beam emitted from each light-emitting element in the effective scanning area of the incidence face of a lens such as the second scan lens 2107 can refer as a scan line. Scan lines corresponding to a plurality of the light-emitting elements intersect or contact with each other in example embodiments according to the present invention. Further, the scan line may be referred as the profile of incidence positions of light beam in the drawings.

Figure 19B:
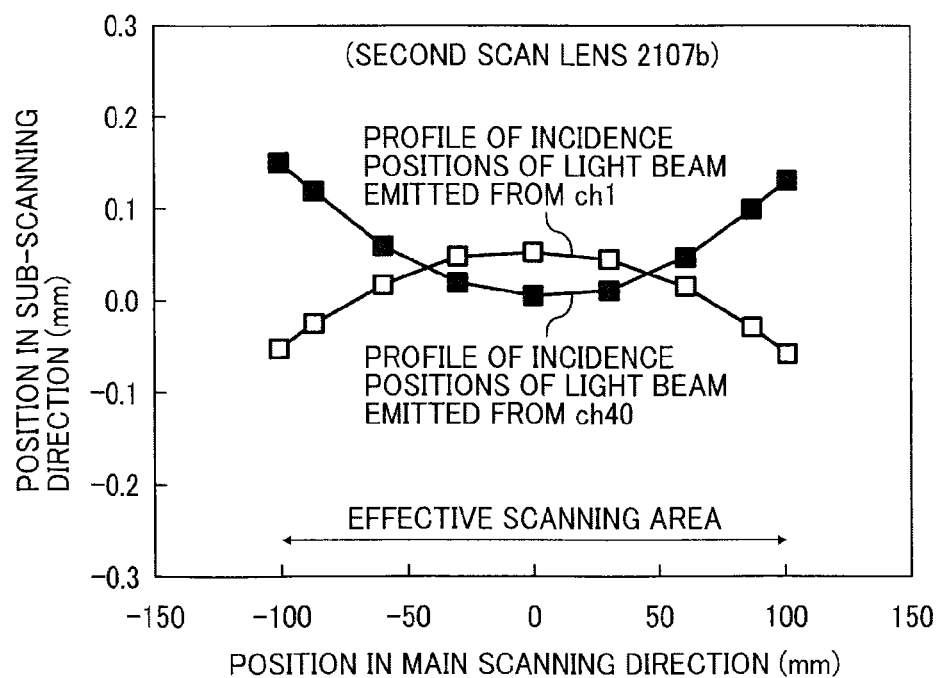

FIG. 19B shows incidence positions of light beam emitted from the light-emitting element ch1 and incidence positions of light beam emitted from the light-emitting element ch40 in the effective scanning area of the incidence face of the second scan lens 2107b. In an example embodiment, the profile of incidence positions of light beam emitted from the light-emitting element ch1 and the profile of incidence positions of light beam emitted from the light-emitting element ch40 intersect or contact with each other.

At the second scan lens, the interval between the incidence positions of the light beam emitted from the light-emitting element ch1 and the incidence positions of the light beam emitted from the light-emitting element ch40 in the sub-scanning direction is, for example, about 0.2 mm at maximum. As such, at each second scan lens, a plurality of light beams can pass through at positions that are close with each other with respect to the sub-scanning direction.

Then, the ambient temperature is changed to compute the ch1-ch40 interval at each temperature. The computed ch1-ch40 interval at each temperature is compared with the design value of the ch1-ch40 interval (e.g., 407 µm) to compute the difference between the computed ch1-ch40 interval and the design value of the ch1-ch40 interval. Hereinafter, the computed difference value is referred to "ch1-ch40 interval deviation." The interval deviation may be also referred to the interval fluctuation.

Figure 20A:
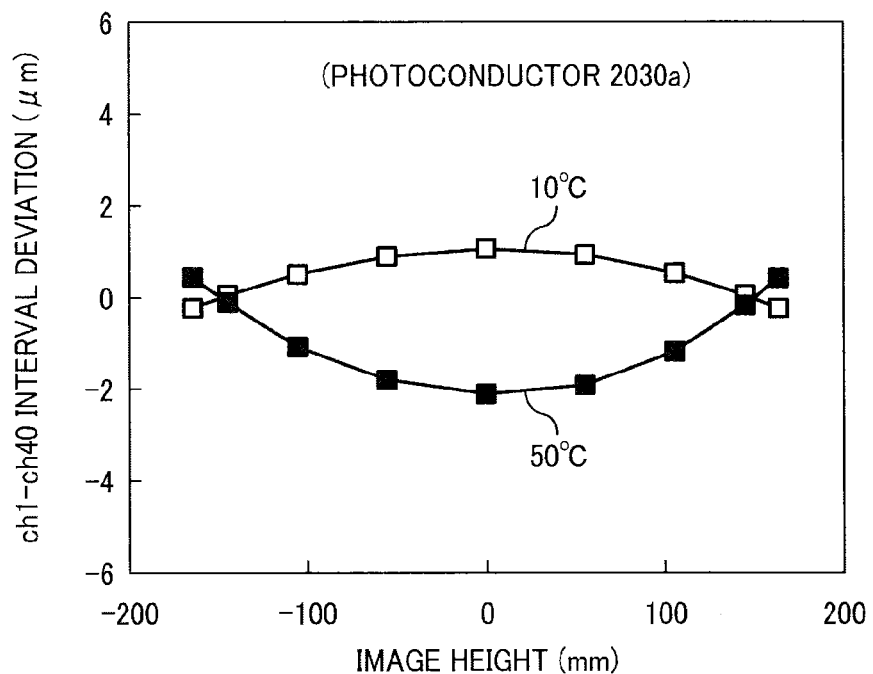
FIG. 20A and FIG. 20B respectively show relationships between ch1-ch40 interval deviation and temperature change.

FIG. 20A shows a relationship between the ch1-ch40 interval deviation and the image height at the photoconductor 2030a when the ambient temperature is set 10 Celsius degrees and 50 Celsius degrees.

Figure 20B:
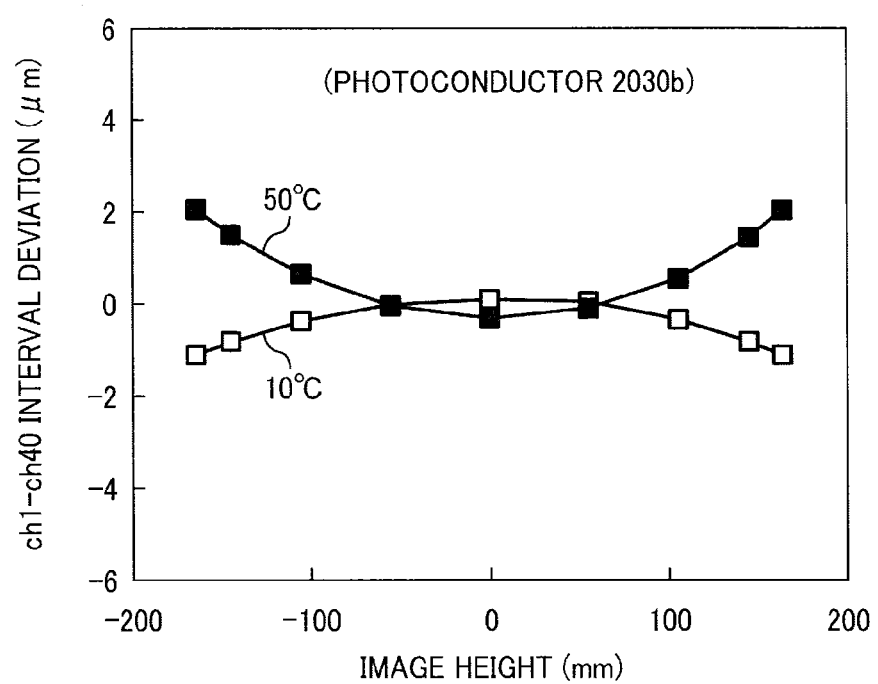

FIG. 20B shows a relationship between the ch1-ch40 interval deviation and the image height at the photoconductor 2030b when the ambient temperature is set 10 Celsius degrees and 50 Celsius degrees.

When the ambient temperature range is from 10 Celsius degrees to 50 Celsius degrees, the maximum value of the ch1-ch40 interval deviation was 2 µm. Therefore, even if the manufacturing error or the like may occur, the maximum value of the ch1-ch40 interval deviation can be suppressed within, for example, 5 µm.

In an example embodiment, the K optical system and C optical system use optical members or devices having the same properties. In an example embodiment, the beam pitch fluctuation in the sub-scanning direction at the photoconductor 2030a and the photoconductor 2030b, which may be caused by the temperature change, can be reduced. Further, an effect of manufacturing error and assembly error of parts to the beam pitch fluctuation can be suppressed or reduced. Further, even if an adjustment such as changing a position of the second scan lens and/or rotating the second scan lens to correct the curving and slanting of scanning line is conducted, an effect of such correction to the beam pitch fluctuation can be reduced.

When FIGS. 19A and 20A are compared, and FIGS. 19B and 20B are compared, it can be understood that there is a strong correlation between the interval of the incidence positions of light beam emitted from the light-emitting element ch1 and the incidence positions of light beam emitted from the light-emitting element ch40 in the sub-scanning direction, and the ch1-ch40 interval deviation at the second scan lens. Such correlation can be explained based on properties of the second scan lens. When the ambient temperature changes, the properties such as shape and refractive index of the second scan lens change, by which the power of second scan lens changes at its each portion, in which light beams that have entered different positions in the sub-scanning direction receive the effect of power of the second scan lens differently.

Such effect for the light beam passing the center of the second scan lens in the sub-scanning direction can also occur for the light beam that passes a position far from the center of the second scan lens with respect to the sub-scanning direction. For example, if the incidence positions of two light beams are close with each other, the change of lens power that each light beam receives can be set smaller if two light beams are close with each other, in which the effect of change of ambient temperature can reduced.

Comparison Example 1

In comparison example 1, compared to the above described example embodiment, the distance between the aperture plate and the cylindrical lens is set shorter by 10 mm.

FIG. 21A shows a relationship between the position of the second scan lens 2107a, the conjugate point 1, and the conjugate point 2 in comparison example 1, in which the second scan lens 2107a is positioned before both of the conjugate points when viewed from the direction perpendicular to the main-scanning/sub-scanning directions.

FIG. 21B shows a relationship between the position of the second scan lens 2107b, the conjugate point 3, and the conjugate point 4 in comparison example 1, in which the second scan lens 2107a is positioned before both of the conjugate points when viewed from the direction perpendicular to the main-scanning/sub-scanning directions.

Figure 22A:
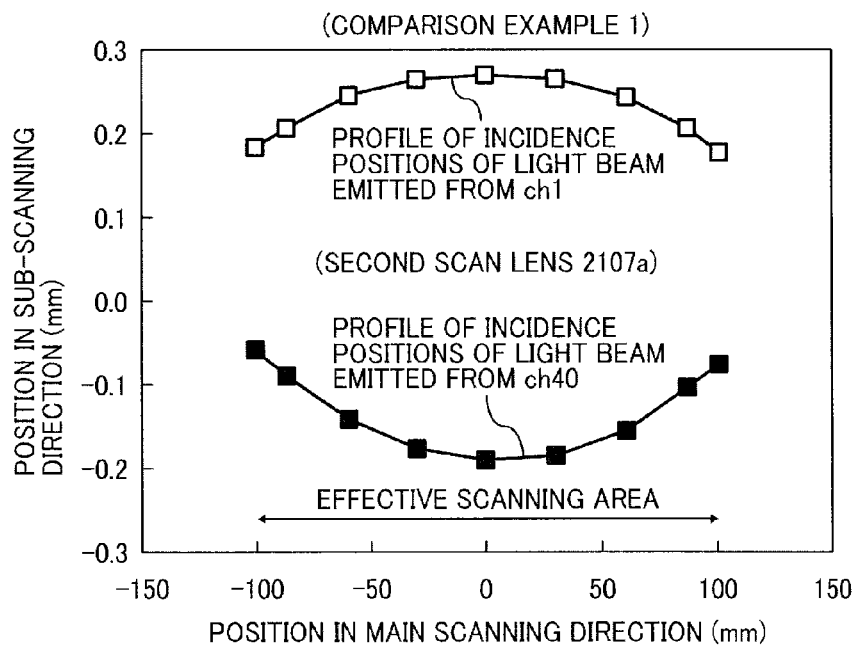
FIG. 22A and FIG. 22B respectively show incidence positions of light beam emitted from light-emitting element ch1 and incidence positions of light beam emitted from light-emitting element ch40 at the second scan lens in comparison example 1.

FIG. 22A shows the incidence positions of light beam emitted from the light-emitting element ch1 and the incidence positions of light beam emitted from the light-emitting element ch40 in the effective scanning area of the incidence face of the second scan lens 2107a. The profile of incidence position of light beam emitted from the light-emitting element ch1 and the profile of incidence position of light beam emitted from the light-emitting element ch40 are separated with respect to the sub-scanning direction, which means that two profiles do not intersect or contact with each other.

Figure 22B:
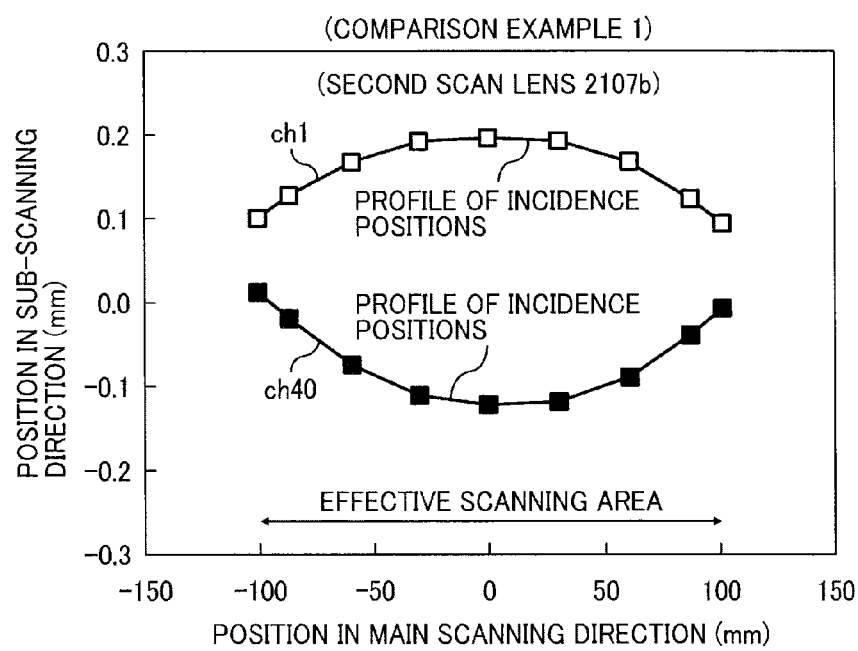

FIG. 22B shows the incidence positions of light beam emitted from the light-emitting element ch1 and the incidence positions of light beam emitted from the light-emitting element ch40 in the effective scanning area of the incidence face of the second scan lens 2107b. The profile of incidence position of light beam emitted from the light-emitting element ch1 and the profile of incidence positions of light beam emitted from the light-emitting element ch40 are separated with respect to the sub-scanning direction, which means that two profiles do not intersect or contact with each other.

At the second scan lens, the interval between the incidence positions of the light beam emitted from the light-emitting element ch1 and the incidence positions of the light beam emitted from the light-emitting element ch40 in the sub-scanning direction is, for example, about 0.5 mm at maximum.

Figure 23A:
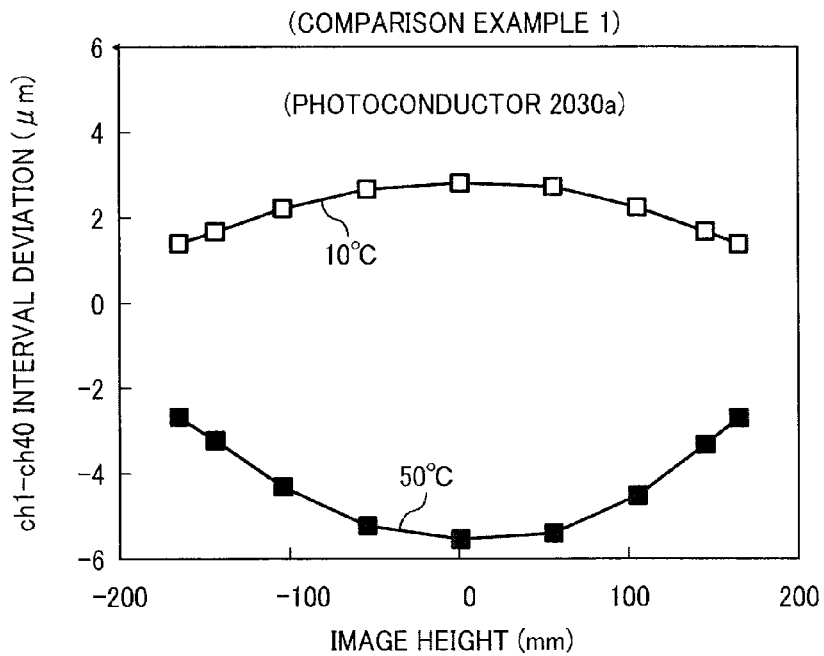
FIG. 23A and FIG. 23B respectively show relationship between ch1-ch40 interval deviation and temperature change in comparison example 1.

FIG. 23A shows a relationship between the ch1-ch40 interval deviation and the image height at the photoconductor 2030a when the ambient temperature is set 10 Celsius degrees and 50 Celsius degrees.

Figure 23B:
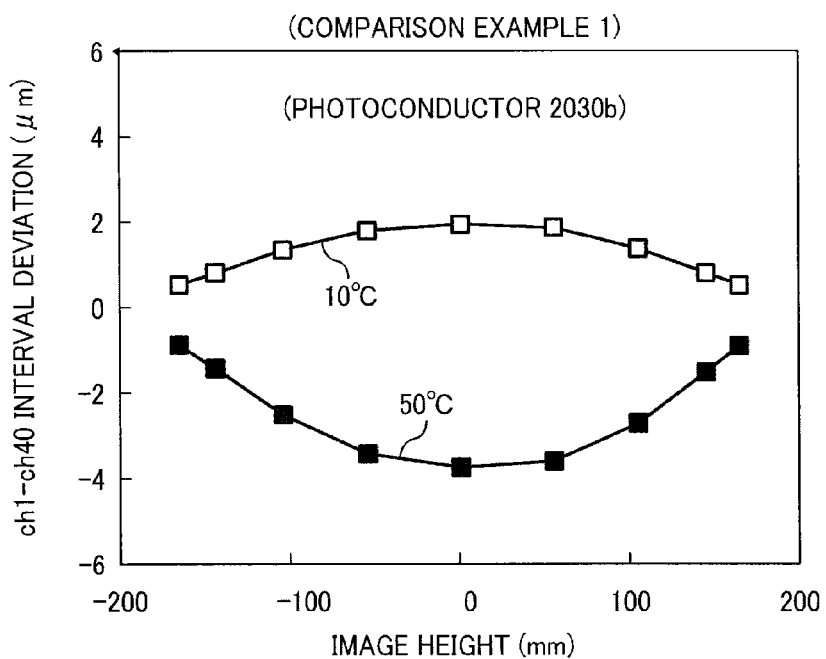

FIG. 23B shows a relationship between the ch1-ch40 interval deviation and the image height at the photoconductor 2030b when the ambient temperature is set 10 Celsius degrees and 50 Celsius degrees.

When the ambient temperature range is from 10 Celsius degrees to 50 Celsius degrees, the maximum value of the ch1-ch40 interval deviation was 6 μm.

Comparison Example 2

In comparison example 2, compared to the above described example embodiment, the distance between the aperture plate and the cylindrical lens is set longer by 10 mm.

Figure 24A:
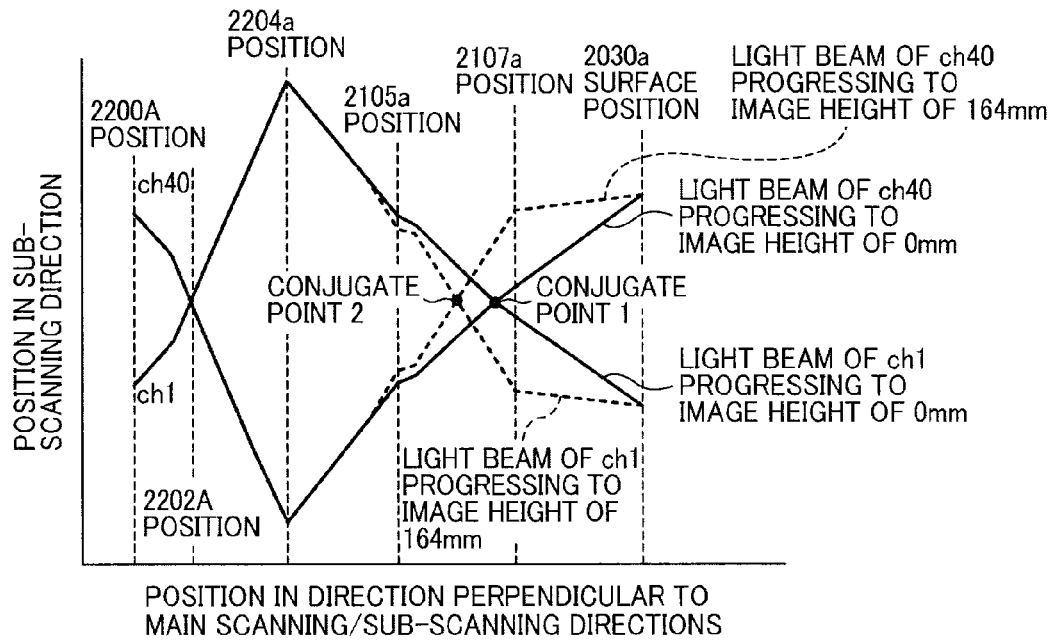
FIG. 24A and FIG. 24B respectively show positional relationship between a second scan lens and conjugate points with respect to an aperture in comparison example 2.

FIG. 24A shows a relationship between the position of the second scan lens 2107a, the conjugate point 1, and the conjugate point 2 in comparison example 2, in which the second scan lens 2107a is positioned after both of the conjugate points when viewed from the direction perpendicular to the main-scanning/sub-scanning directions.

Figure 24B:
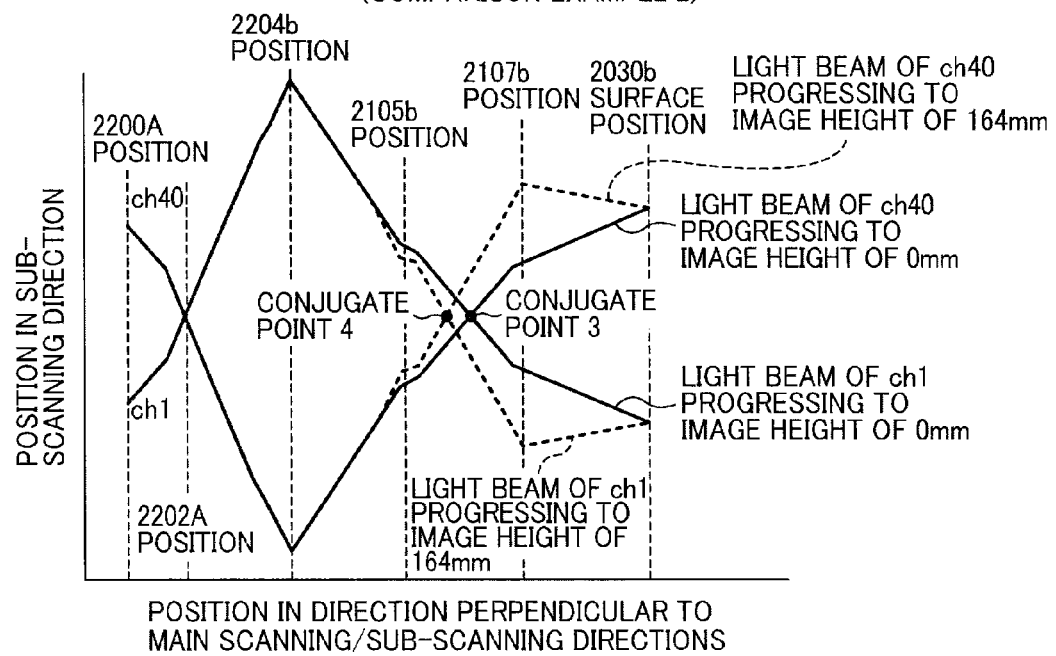

FIG. 24B shows a relationship between the position of the second scan lens 2107b, the conjugate point 3, and the conjugate point 4 in comparison example 2, in which the second scan lens 2107b is positioned after both of the conjugate points when viewed from the direction perpendicular to the main-scanning/sub-scanning directions.

Figure 25A:
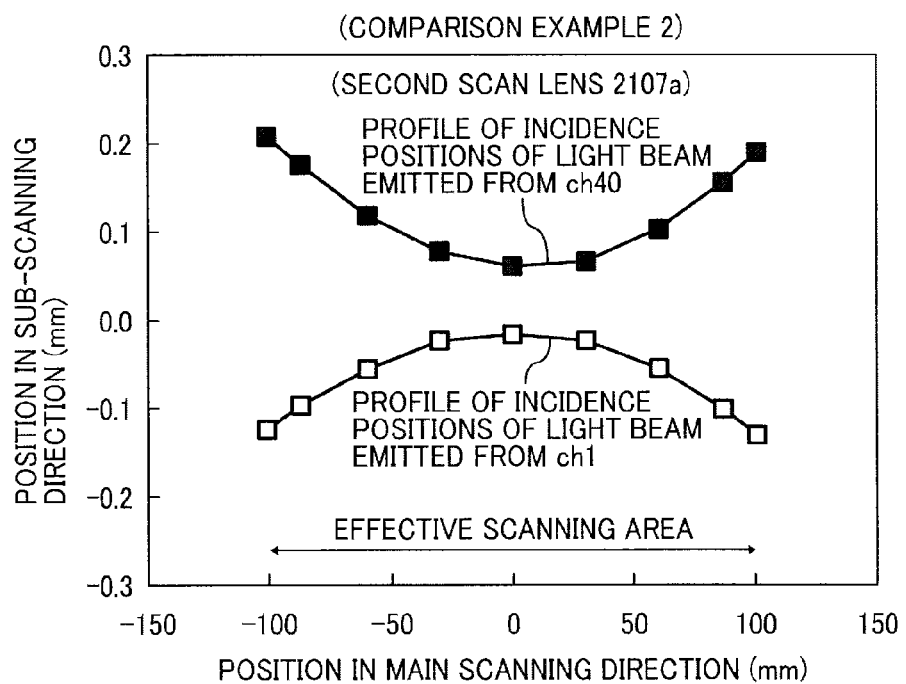
FIG. 25A and FIG. 25B respectively show incidence positions of light beam emitted from light-emitting element ch1 and incidence positions of light beam emitted from light-emitting element ch40 at the second scan lens in comparison example 2.

FIG. 25A shows the incidence positions of light beam emitted from the light-emitting element ch1 and the incidence positions of light beam emitted from the light-emitting element ch40 in the effective scanning area of the incidence face of the second scan lens 2107a. The profile of incidence positions of light beam emitted from the light-emitting element ch1 and the profile of incidence positions of light beam emitted from the light-emitting element ch40 are separated with respect to the sub-scanning direction, which means that two profiles do not intersect or contact with each other.

Figure 25B:
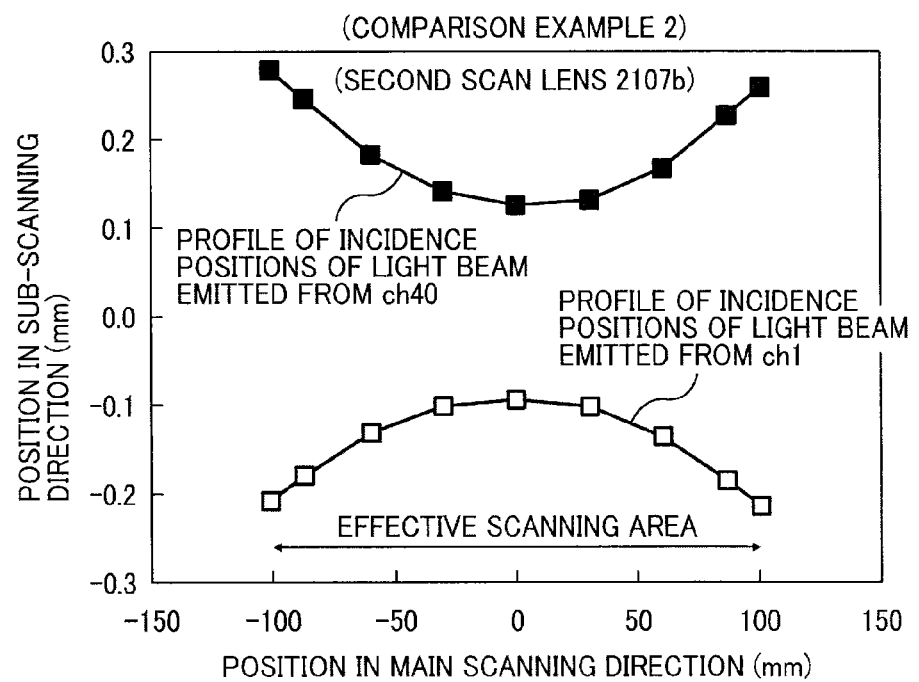

FIG. 25B shows the incidence positions of light beam emitted from the light-emitting element ch1 and the incidence positions of light beam emitted from the light-emitting element ch40 in the effective scanning area of the incidence face of the second scan lens 2107b. The profile of incidence positions of light beam emitted from the light-emitting element ch1 and the profile of incidence positions of light beam emitted from the light-emitting element ch40 are separated with respect to the sub-scanning direction, which means that two profiles do not intersect or contact with each other.

At the second scan lens, the interval between the incidence positions of the light beam emitted from the light-emitting element ch1 and the incidence positions of the light beam emitted from the light-emitting element ch40 in the sub-scanning direction is, for example, about 0.5 mm at maximum.

FIG. 26A shows a relationship between the ch1-ch40 interval deviation and the image height at the photoconductor 2030a when the ambient temperature is set 10 Celsius degrees and 50 Celsius degrees.

FIG. 26B shows a relationship between the ch1-ch40 interval deviation and the image height at the photoconductor 2030b when the ambient temperature is set 10 Celsius degrees and 50 Celsius degrees.

When the ambient temperature range is from 10 Celsius degrees to 50 Celsius degrees, the maximum value of the ch1-ch40 interval deviation was 5 p.m.

In the above described comparison examples 1 and 2, the distance between the aperture plate and the cylindrical lens is changed slightly compared to the above described example embodiment. However, such change may effect image quality greatly.

In the above described example embodiment, the optical writing unit 2010 includes, for example, two light source units (light source units LU1, LU2), two beam splitters (beam splitters 2206A, 2206B), four ¼ wavelength plate (¼ wavelength plate 2207a, 2207b, 2207c, 2207d), four cylindrical lenses (cylindrical lenses 2204a, 2204b, 2204c, 2204d), the polygon mirror 2104, the scanning optical system A, the scanning optical system B, and the scan controller.

Each of the light source units includes, for example, a light source, ¼ wavelength plate, a coupling optical system, and an aperture plate. The light source includes, for example, a surface emitting laser array arranged forty (40) light emitting elements in a two dimensional pattern.

The scanning optical system A may include the K and C optical systems, and the scanning optical system B may include M and Y optical systems. Each of K, C, M, Y optical systems includes, for example, the first scan lens employing a resin lens and the second scan lens employing a resin lens. Further, at each of K, C, M, Y optical systems, for example, the exit plane of the second scan lens is a face having the strongest power in the sub-scanning direction.

Further, at each of the second scan lenses, a plurality of light beams passes through at positions that are close to each other with respect to the sub-scanning direction. Further, in the K, C, M, Y optical systems, the second scan lens is positioned between a conjugate point of the aperture for the light beam progressing to the image height of 0 mm on the photoconductor drum, and a conjugate point of the aperture for the light beam progressing to the image height of 164 mm on the photoconductor drum when viewed from the direction perpendicular to the main-scanning/sub-scanning directions.

In such a configuration, even if the numbers of light beams is set greater than two, the beam pitch deviation on a target surface in the sub-scanning direction can be reduced. Therefore, the image forming apparatus 2000 employing the optical writing unit 2010 can form high quality images constantly.

A description is given of a plurality of modified examples of the above described example embodiment, and a plurality of comparison examples explained with each modified example. In the followings, the difference with respect to above described example embodiment is mainly explained, and the same references characters or numbers are attached to the same parts or similar parts, and the explanation for such parts may be simplified or omitted.

Modified Example 1

In modified example 1, instead of the above described light source, a light source having two light-emitting elements ch1 and ch2 and adapted to 600 dpi is used. Further, the light-emitting element ch1 and the light-emitting element ch2 are disposed separately with a given distance each other with respect to the sub-scanning direction. In such a configuration, the interval of the beam spot of light beam emitted by the light-emitting element ch1 and the beam spot of light beam emitted by the light-emitting element ch2 in the sub-scanning direction (hereinafter, ch1-ch2 interval) is designed to, for example, 42.3 µm. Further, the ambient temperature is designed to, for example, 25 Celsius degrees.

FIG. 27A shows the incidence positions of light beam emitted from the light-emitting element ch1 and the incidence positions of light beam emitted from the light-emitting element ch2 in the effective scanning area of the incidence face of the second scan lens 2107a. The profile of incidence positions of light beam emitted from the light-emitting element ch1 and the profile of incidence positions of light beam emitted from the light-emitting element ch2 intersect or contact with each other.

FIG. 27B shows the incidence positions of light beam emitted from the light-emitting element ch1 and the incidence positions of light beam emitted from the light-emitting element ch2 in the effective scanning area of the incidence face of the second scan lens 2107b. The profile of incidence positions of light beam emitted from the light-emitting element ch1 and the profile of incidence positions of light beam emitted from the light-emitting element ch2 intersect or contact with each other.

At the second scan lens, the interval between the incidence positions of the light beam emitted from the light-emitting element ch1 and the incidence positions of the light beam emitted from the light-emitting element ch2 in the sub-scanning direction is, for example, about 0.02 mm at maximum.

Then, the ambient temperature is changed to compute the ch1-ch2 interval at each temperature. The computed ch1-ch2 interval at each temperature is compared with the design value of the ch1-ch2 interval (e.g., 42.3 µm) to compute the difference between the computed ch1-ch2 interval and the design value of the ch1-ch2 interval. Hereinafter, the computed difference value is referred to "ch1-ch2 interval deviation."

FIG. 28A shows a relationship between the ch1-ch2 interval deviation and the image height at the photoconductor 2030a when the ambient temperature is set 10 Celsius degrees and 50 Celsius degrees.

FIG. 28B shows a relationship between the ch1-ch2 interval deviation and the image height at the photoconductor 2030b when the ambient temperature is set 10 Celsius degrees and 50 Celsius degrees.

When the ambient temperature range is from 10 Celsius degrees to 50 Celsius degrees, the maximum value of the ch1-ch2 interval deviation was 0.22 µm.

Comparison Example 3

In comparison example 3, compared to the modified example 1, the distance between the aperture plate and the cylindrical lens is set shorter by 10 mm.

FIG. 29A shows the incidence positions of light beam emitted from the light-emitting element ch1 and the incidence positions of light beam emitted from the light-emitting element ch2 in the effective scanning area of the incidence face of the second scan lens 2107a. The profile of incidence positions of light beam emitted from the light-emitting element ch1 and the profile of incidence positions of light beam emitted from the light-emitting element ch2 are separated with respect to the sub-scanning direction, which means that two profiles do not intersect or contact with each other.

FIG. 29B shows the incidence positions of light beam emitted from the light-emitting element ch1 and the incidence positions of light beam emitted from the light-emitting element ch2 in the effective scanning area of the incidence face of the second scan lens 2107b. The profile of incidence positions of light beam emitted from the light-emitting element ch1 and the profile of incidence positions of light beam emitted from the light-emitting element ch2 are separated with respect to the sub-scanning direction, which means that two profiles do not intersect or contact with each other.

At the second scan lens, the interval between the incidence positions of the light beam emitted from the light-emitting element ch1 and the incidence positions of the light beam emitted from the light-emitting element ch2 in the sub-scanning direction is, for example, about 0.04 mm at maximum.

FIG. 30A shows a relationship between the ch1-ch2 interval deviation and the image height at the photoconductor 2030a when the ambient temperature is set 10 Celsius degrees and 50 Celsius degrees.

FIG. 30B shows a relationship between the ch1-ch2 interval deviation and the image height at the photoconductor 2030b when the ambient temperature is set 10 Celsius degrees and 50 Celsius degrees.

When the ambient temperature range is from 10 Celsius degrees to 50 Celsius degrees, the maximum value of the ch1-ch2 interval deviation was 0.48 µm.

Comparison Example 4

In comparison example 4, compared to the modified example 1, the distance between the aperture plate and the cylindrical lens is set longer by 10 mm.

FIG. 31A shows the incidence positions of light beam emitted from the light-emitting element ch1 and the incidence positions of light beam emitted from the light-emitting element ch2 in the effective scanning area of the incidence face of the second scan lens 2107a. The profile of incidence positions of light beam emitted from the light-emitting element ch1 and the profile of incidence positions of light beam emitted from the light-emitting element ch2 are separated with respect to the sub-scanning direction, which means that two profiles do not intersect or contact with each other.

FIG. 31B shows the incidence positions of light beam emitted from the light-emitting element ch1 and the incidence positions of light beam emitted from the light-emitting element ch2 in the effective scanning area of the incidence face of the second scan lens 2107b. The profile of incidence positions of light beam emitted from the light-emitting element ch1 and the profile of incidence positions of light beam emitted from the light-emitting element ch2 are separated with respect to the sub-scanning direction, which means that two profiles do not intersect or contact with each other.

At the second scan lens, the interval between the incidence positions of the light beam emitted from the light-emitting element ch1 and the incidence positions of the light beam emitted from the light-emitting element ch2 in the sub-scanning direction is, for example, about 0.06 mm at maximum.

FIG. 32A shows a relationship between the ch1-ch2 interval deviation and the image height at the photoconductor 2030a when the ambient temperature is set 10 Celsius degrees and 50 Celsius degrees.

FIG. 32B shows a relationship between the ch1-ch2 interval deviation and the image height at the photoconductor 2030b when the ambient temperature is set 10 Celsius degrees and 50 Celsius degrees.

When the ambient temperature range is from 10 Celsius degrees to 50 Celsius degrees, the maximum value of the ch1-ch2 interval deviation was 0.49 µm.

As such, the modified example 1 can achieve the similar effect of the above described example embodiment.

Modified Example 2

In modified example 2, instead of the above described light source, a light source having four light-emitting elements ch1 to ch4 and adapted to 1200 dpi is used. Further, among the four light-emitting elements, the light-emitting element ch1 and the light-emitting element ch4 are disposed at each end in the sub-scanning direction. In such a configuration, the interval of the beam spot of light beam emitted by the light-emitting element ch1 and the beam spot of light beam emitted by the light-emitting element ch4 in the sub-scanning direction (hereinafter, ch1-ch4 interval) is designed to, for example, 63.6 µm. Further, the ambient temperature is designed to, for example, 25 Celsius degrees.

FIG. 33A shows the incidence positions of light beam emitted from the light-emitting element ch1 and the incidence positions of light beam emitted from the light-emitting element ch4 in the effective scanning area of the incidence face of the second scan lens 2107a. The profile of incidence positions of light beam emitted from the light-emitting element ch1 and the profile of incidence positions of light beam emitted from the light-emitting element ch4 intersect or contact with each other.

FIG. 33B shows the incidence positions of light beam emitted from the light-emitting element ch1 and the incidence positions of light beam emitted from the light-emitting element ch4 in the effective scanning area of the incidence face of the second scan lens 2107b. The profile of incidence positions of light beam emitted from the light-emitting element ch1 and the profile of incidence positions of light beam emitted from the light-emitting element ch4 intersect or contact with each other.

At the second scan lens, the interval between the incidence positions of the light beam emitted from the light-emitting element ch1 and the incidence positions of the light beam emitted from the light-emitting element ch4 in the sub-scanning direction is, for example, about 0.04 mm at maximum.

Then, the ambient temperature is changed to compute the ch1-ch4 interval at each temperature. The computed ch1-ch4 interval at each temperature is compared with the design value of the ch1-ch4 interval (e.g., 63.6 µm) to compute the difference between the computed ch1-ch4 interval and the design value of the ch1-ch4 interval. Hereinafter, the computed difference value is referred to "ch1-ch4 interval deviation."

FIG. 34A shows a relationship between the ch1-ch4 interval deviation and the image height at the photoconductor 2030a when the ambient temperature is set 10 Celsius degrees and 50 Celsius degrees.

FIG. 34B shows a relationship between the ch1-ch4 interval deviation and the image height at the photoconductor 2030b when the ambient temperature is set 10 Celsius degrees and 50 Celsius degrees.

When the ambient temperature range is from 10 Celsius degrees to 50 Celsius degrees, the maximum value of the ch1-ch4 interval deviation was 0.31 µm.

Comparison Example 5

In comparison example 5, compared to the modified example 2, the distance between the aperture plate and the cylindrical lens is set shorter by 10 mm.

FIG. 35A shows the incidence positions of light beam emitted from the light-emitting element ch1 and the incidence positions of light beam emitted from the light-emitting element ch4 in the effective scanning area of the incidence face of the second scan lens 2107a. The profile of incidence positions of light beam emitted from the light-emitting element ch1 and the profile of incidence positions of light beam emitted from the light-emitting element ch4 are separated with respect to the sub-scanning direction, which means that two profiles do not intersect or contact with each other.

FIG. 35B shows the incidence positions of light beam emitted from the light-emitting element ch1 and the incidence positions of light beam emitted from the light-emitting element ch4 in the effective scanning area of the incidence face of the second scan lens 2107b. The profile of incidence positions of light beam emitted from the light-emitting element ch1 and the profile of incidence positions of light beam emitted from the light-emitting element ch4 are separated with respect to the sub-scanning direction, which means that two profiles do not intersect or contact with each other.

At the second scan lens, the interval between the incidence positions of the light beam emitted from the light-emitting element ch1 and the incidence positions of the light beam emitted from the light-emitting element ch4 in the sub-scanning direction is, for example, about 0.08 mm at maximum.

FIG. 36A shows a relationship between the ch1-ch4 interval deviation and the image height at the photoconductor 2030a when the ambient temperature is set 10 Celsius degrees and 50 Celsius degrees.

FIG. 36B shows a relationship between the ch1-ch4 interval deviation and the image height at the photoconductor 2030b when the ambient temperature is set 10 Celsius degrees and 50 Celsius degrees.

When the ambient temperature range is from 10 Celsius degrees to 50 Celsius degrees, the maximum value of the ch1-ch4 interval deviation was 0.73 p.m.

Comparison Example 6

In comparison example 6, compared to the modified example 2, the distance between the aperture plate and the cylindrical lens is set longer by 10 mm.

FIG. 37A shows the incidence positions of light beam emitted from the light-emitting element ch1 and the incidence positions of light beam emitted from the light-emitting element ch4 in the effective scanning area of the incidence face of the second scan lens 2107a. The profile of incidence positions of light beam emitted from the light-emitting element ch1 and the profile of incidence positions of light beam emitted from the light-emitting element ch4 are separated with respect to the sub-scanning direction, which means that two profiles do not intersect or contact with each other.

FIG. 37B shows the incidence positions of light beam emitted from the light-emitting element ch1 and the incidence positions of light beam emitted from the light-emitting element ch4 in the effective scanning area of the incidence face of the second scan lens 2107b. The profile of incidence positions of light beam emitted from the light-emitting element ch1 and the profile of incidence positions of light beam emitted from the light-emitting element ch4 are separated with respect to the sub-scanning direction, which means that two profiles do not intersect or contact with each other.

At the second scan lens, the interval between the incidence positions of the light beam emitted from the light-emitting element ch1 and the incidence positions of the light beam emitted from the light-emitting element ch4 in the sub-scanning direction is, for example, about 0.08 mm at maximum.

FIG. 38A shows a relationship between the ch1-ch4 interval deviation and the image height at the photoconductor 2030a when the ambient temperature is set 10 Celsius degrees and 50 Celsius degrees.

FIG. 38B shows a relationship between the ch1-ch4 interval deviation and the image height at the photoconductor 2030b when the ambient temperature is set 10 Celsius degrees and 50 Celsius degrees.

When the ambient temperature range is from 10 Celsius degrees to 50 Celsius degrees, the maximum value of the ch1-ch4 interval deviation was 0.72 μm.

As such, the modified example 2 can achieve the similar effect of the above described example embodiment.

Modified Example 3

In modified example 3, instead of the above described light source, a light source having eight light-emitting elements ch1 to ch8 and adapted to 1200 dpi is used. Further, among the eight light-emitting elements, the light-emitting element ch1 and the light-emitting element ch8 are disposed at each end in the sub-scanning direction. In such a configuration, the interval of the beam spot of light beam emitted by the light-emitting element ch1 and the beam spot of light beam emitted by the light-emitting element ch8 in the sub-scanning direction (hereinafter, ch1-ch8 interval) is designed to, for example, 148.4 μm. Further, the ambient temperature is designed to, for example, 25 Celsius degrees.

FIG. 39A shows the incidence positions of light beam emitted from the light-emitting element ch1 and the incidence positions of light beam emitted from the light-emitting element ch8 in the effective scanning area of the incidence face of the second scan lens 2107a. The profile of incidence positions of light beam emitted from the light-emitting element ch1 and the profile of incidence positions of light beam emitted from the light-emitting element ch8 intersect or contact with each other.

FIG. 39B shows the incidence positions of light beam emitted from the light-emitting element ch1 and the incidence positions of light beam emitted from the light-emitting element ch8 in the effective scanning area of the incidence face of the second scan lens 2107b. The profile of incidence positions of light beam emitted from the light-emitting element ch1 and the profile of incidence positions of light beam emitted from the light-emitting element ch8 intersect or contact with each other.

At the second scan lens, the interval between the incidence positions of the light beam emitted from the light-emitting element ch1 and the incidence positions of the light beam emitted from the light-emitting element ch8 in the sub-scanning direction is, for example, about 0.08 mm at maximum.

Then, the ambient temperature is changed to compute the ch1-ch8 interval at each temperature. The computed ch1-ch8 interval at each temperature is compared with the design value of the ch1-ch8 interval (e.g., 148.4 μm) to compute the difference between the computed ch1-ch8 interval and the design value of the ch1-ch8 interval. Hereinafter, the computed difference value is referred to "ch1-ch8 interval deviation."

FIG. 40A shows a relationship between the ch1-ch8 interval deviation and the image height at the photoconductor 2030a when the ambient temperature is set 10 Celsius degrees and 50 Celsius degrees.

FIG. 40B shows a relationship between the ch1-ch8 interval deviation and the image height at the photoconductor 2030b when the ambient temperature is set 10 Celsius degrees and 50 Celsius degrees.

When the ambient temperature range is from 10 Celsius degrees to 50 Celsius degrees, the maximum value of the ch1-ch8 interval deviation was 0.66 μm.

Comparison Example 7

In comparison example 7, compared to the modified example 3, the distance between the aperture plate and the cylindrical lens is set shorter by 10 mm.

FIG. 41A shows the incidence positions of light beam emitted from the light-emitting element ch1 and the incidence positions of light beam emitted from the light-emitting element ch8 in the effective scanning area of the incidence face of the second scan lens 2107a. The profile of incidence positions of light beam emitted from the light-emitting element ch1 and the profile of incidence positions of light beam emitted from the light-emitting element ch8 are separated with respect to the sub-scanning direction, which means that two profiles do not intersect or contact with each other.

FIG. 41B shows the incidence positions of light beam emitted from the light-emitting element ch1 and the incidence positions of light beam emitted from the light-emitting element ch8 in the effective scanning area of the incidence face of the second scan lens 2107b. The profile of incidence positions of light beam emitted from the light-emitting element ch1 and the profile of incidence positions of light beam emitted from the light-emitting element ch8 are separated with respect to the sub-scanning direction, which means that two profiles do not intersect or contact with each other.

At the second scan lens, the interval between the incidence positions of the light beam emitted from the light-emitting element ch1 and the incidence positions of the light beam emitted from the light-emitting element ch8 in the sub-scanning direction is, for example, about 0.16 mm at maximum.

FIG. 42A shows a relationship between the ch1-ch8 interval deviation and the image height at the photoconductor 2030a when the ambient temperature is set 10 Celsius degrees and 50 Celsius degrees.

FIG. 42B shows a relationship between the ch1-ch8 interval deviation and the image height at the photoconductor 2030b when the ambient temperature is set 10 Celsius degrees and 50 Celsius degrees.

When the ambient temperature range is from 10 Celsius degrees to 50 Celsius degrees, the maximum value of the ch1-ch8 interval deviation was 1.69 μm.

Comparison Example 8

In comparison example 8, compared to the modified example 3, the distance between the aperture plate and the cylindrical lens is set longer by 10 mm.

FIG. 43A shows the incidence positions of light beam emitted from the light-emitting element ch1 and the incidence positions of light beam emitted from the light-emitting element ch8 in the effective scanning area of the incidence face of the second scan lens 2107a. The profile of incidence positions of light beam emitted from the light-emitting element ch1 and the profile of incidence positions of light beam emitted from the light-emitting element ch8 are separated with respect to the sub-scanning direction, which means that two profiles do not intersect or contact with each other.

FIG. 43B shows the incidence positions of light beam emitted from the light-emitting element ch1 and the incidence positions of light beam emitted from the light-emitting element ch8 in the effective scanning area of the incidence face of the second scan lens 2107b. The profile of incidence positions of light beam emitted from the light-emitting element ch1 and the profile of incidence positions of light beam emitted from the light-emitting element ch8 are separated with respect to the sub-scanning direction, which means that two profiles do not intersect or contact with each other.

At the second scan lens, the interval between the incidence positions of the light beam emitted from the light-emitting element ch1 and the incidence positions of the light beam emitted from the light-emitting element ch8 in the sub-scanning direction is, for example, about 0.18 mm at maximum.

FIG. 44A shows a relationship between the ch1-ch8 interval deviation and the image height at the photoconductor 2030a when the ambient temperature is set 10 Celsius degrees and 50 Celsius degrees.

FIG. 44B shows a relationship between the ch1-ch8 interval deviation and the image height at the photoconductor 2030b when the ambient temperature is set 10 Celsius degrees and 50 Celsius degrees.

When the ambient temperature range is from 10 Celsius degrees to 50 Celsius degrees, the maximum value of the ch1-ch8 interval deviation was 1.62 μm.

As such, the modified example 3 can achieve the similar effect of the above described example embodiment.

Modified Example 4

In modified example 4, instead of the above described light source, a light source having twenty light-emitting elements ch1 to ch20 and adapted to 1200 dpi is used. Further, among the twenty light-emitting elements, the light-emitting element ch1 and the light-emitting element ch20 are disposed at each end in the sub-scanning direction or Z-axis direction. In such a configuration, the interval of the beam spot of light beam emitted by the light-emitting element ch1 and the beam spot of light beam emitted by the light-emitting element ch20 in the sub-scanning direction (hereinafter, ch1-ch20 interval) is designed to, for example, 400.9 μm. Further, the ambient temperature is designed to, for example, 25 Celsius degrees.

FIG. 45A shows the incidence positions of light beam emitted from the light-emitting element ch1 and the incidence positions of light beam emitted from the light-emitting element ch20 in the effective scanning area of the incidence face of the second scan lens 2107a. The profile of incidence positions of light beam emitted from the light-emitting element ch1 and the profile of incidence positions of light beam emitted from the light-emitting element ch20 intersect or contact with each other.

FIG. 45B shows the incidence positions of light beam emitted from the light-emitting element ch1 and the incidence positions of light beam emitted from the light-emitting element ch20 in the effective scanning area of the incidence face of the second scan lens 2107b. The profile of incidence positions of light beam emitted from the light-emitting element ch1 and the profile of incidence positions of light beam emitted from the light-emitting element ch20 intersect or contact with each other.

At the second scan lens, the interval between the incidence positions of the light beam emitted from the light-emitting element ch1 and the incidence positions of the light beam emitted from the light-emitting element ch20 in the sub-scanning direction is, for example, about 0.20 mm at maximum.

Then, the ambient temperature is changed to compute the ch1-ch20 interval at each temperature. The computed ch1-ch8 interval at each temperature is compared with the design value of the ch1-ch20 interval (e.g., 400.9 μm) to compute the difference between the computed ch1-ch20 interval and the design value of the ch1-ch20 interval. Hereinafter, the computed difference value is referred to "ch1-ch20 interval deviation."

FIG. 46A shows a relationship between the ch1-ch20 interval deviation and the image height at the photoconductor 2030a when the ambient temperature is set 10 Celsius degrees and 50 Celsius degrees.

FIG. 46B shows a relationship between the ch1-ch20 interval deviation and the image height at the photoconductor 2030b when the ambient temperature is set 10 Celsius degrees and 50 Celsius degrees.

When the ambient temperature range is from 10 Celsius degrees to 50 Celsius degrees, the maximum value of the ch1-ch20 interval deviation was 1.75 μm.

Comparison Example 9

In comparison example 9, compared to the modified example 4, the distance between the aperture plate and the cylindrical lens is set shorter by 10 mm.

FIG. 47A shows the incidence positions of light beam emitted from the light-emitting element ch1 and the incidence positions of light beam emitted from the light-emitting element ch20 in the effective scanning area of the incidence face of the second scan lens 2107a. The profile of incidence positions of light beam emitted from the light-emitting element ch1 and the profile of incidence positions of light beam emitted from the light-emitting element ch20 are separated with respect to the sub-scanning direction, which means that two profiles do not intersect or contact with each other.

FIG. 47B shows the incidence positions of light beam emitted from the light-emitting element ch1 and the incidence positions of light beam emitted from the light-emitting element ch20 in the effective scanning area of the incidence face of the second scan lens 2107b. The profile of incidence positions of light beam emitted from the light-emitting element ch1 and the profile of incidence positions of light beam emitted from the light-emitting element ch20 are separated with respect to the sub-scanning direction, which means that two profiles do not intersect or contact with each other.

At the second scan lens, the interval between the incidence positions of the light beam emitted from the light-emitting element ch1 and the incidence positions of the light beam emitted from the light-emitting element ch20 in the sub-scanning direction is, for example, about 0.46 mm at maximum.

FIG. 48A shows a relationship between the ch1-ch20 interval deviation and the image height at the photoconductor 2030a when the ambient temperature is set 10 Celsius degrees and 50 Celsius degrees.

FIG. 48B shows a relationship between the ch1-ch20 interval deviation and the image height at the photoconductor 2030b when the ambient temperature is set 10 Celsius degrees and 50 Celsius degrees.

When the ambient temperature range is from 10 Celsius degrees to 50 Celsius degrees, the maximum value of the ch1-ch20 interval deviation was 4.60 μm.

Comparison Example 10

In comparison example 10, compared to the modified example 4, the distance between the aperture plate and the cylindrical lens is set longer by 10 mm.

FIG. 49A shows the incidence positions of light beam emitted from the light-emitting element ch1 and the incidence positions of light beam emitted from the light-emitting element ch20 in the effective scanning area of the incidence face of the second scan lens 2107a. The profile of incidence positions of light beam emitted from the light-emitting element ch1 and the profile of incidence positions of light beam emitted from the light-emitting element ch20 are separated with respect to the sub-scanning direction, which means that two profiles do not intersect or contact with each other.

FIG. 49B shows the incidence positions of light beam emitted from the light-emitting element ch1 and the incidence positions of light beam emitted from the light-emitting element ch20 in the effective scanning area of the incidence face of the second scan lens 2107b. The profile of incidence positions of light beam emitted from the light-emitting element ch1 and the profile of incidence positions of light beam emitted from the light-emitting element ch20 are separated with respect to the sub-scanning direction, which means that two profiles do not intersect or contact with each other.

At the second scan lens, the interval between the incidence positions of the light beam emitted from the light-emitting element ch1 and the incidence positions of the light beam emitted from the light-emitting element ch20 in the sub-scanning direction is, for example, about 0.48 mm at maximum.

FIG. 50A shows a relationship between the ch1-ch20 interval deviation and the image height at the photoconductor 2030a when the ambient temperature is set 10 Celsius degrees and 50 Celsius degrees.

FIG. 50B shows a relationship between the ch1-ch20 interval deviation and the image height at the photoconductor 2030b when the ambient temperature is set 10 Celsius degrees and 50 Celsius degrees.

When the ambient temperature range is from 10 Celsius degrees to 50 Celsius degrees, the maximum value of the ch1-ch20 interval deviation was 4.32 µm.

As such, the modified example 4 can achieve the similar effect of the above described example embodiment.

In the above described example embodiments, the exit plane of the second scan lens is set with the strongest power in the sub-scanning direction, but the configuration is not limited thereto. For example, the incidence plane of the second scan lens can be set with the strongest power in the sub-scanning direction. In this case, the incidence plane of the second scan lens is preferably positioned between a conjugate point for the aperture for the light beam progressing to the image height of 0 mm on the photoconductor drum, and a conjugate point for the aperture for the light beam progressing to the image height of 164 mm on the photoconductor drum when viewed from the direction perpendicular to the main-scanning/sub-scanning directions.

Further, in the above described example embodiments, a third scan lens set with the strongest power in the sub-scanning direction can be further disposed. In this case, a plane (e.g., incidence or exit plane) of the third scan lens set with the strongest power in the sub-scanning direction is used as a plane that the light beam emitted by the light emitting-element ch1 and the light beam emitted by the light emitting-element ch40 passes through close with each other with respect to the sub-scanning direction. The plane of third scan lens having the strongest power in the sub-scanning direction is preferably positioned between the conjugate point for the aperture for the light beam progressing to the image height of 0 mm on the photoconductor drum, and the conjugate point for the aperture for the light beam progressing to the image height of 164 mm on the photoconductor drum when viewed from the direction perpendicular to the main-scanning/sub-scanning directions.

Further, in the above described example embodiments, each light source unit uses a surface emitting laser array having forty (40) light emitting elements, but not limited thereto.

Further, in the above described example embodiments, the light source unit uses the aperture plate, but not limited thereto. For example, as shown in FIG. 51, a first aperture member to shape light flux with respect to the sub-scanning direction, and a second aperture member to shape light flux with respect to the main scanning direction can be collectively used. In this case, the conjugate point of the first aperture member can be used as the conjugate point of the aperture plate described in the above example embodiments.

Further, in the above described example embodiments, light flux emitted from one light source unit is split into two light fluxes by the beam splitter, and the two light fluxes are guided to different photoconductor drums, but not limited thereto. For example, as shown in FIG. 52, light flux emitted from one of two light sources can be reflected at a mirror and then entered to a polygon mirror.

Further, as shown in FIG. 53, two light sources can be disposed at different positions so that the incidence angles of emitted light fluxes at a polygon mirror become different. If a light source having a number of light emitting elements such as a surface emitting laser array is used, a control board may become great. Therefore, to prevent an interference of the two light sources, the two light sources may be shifted their positions with each other. Even in such a case, by employing the configuration of the above described example embodiments, the beam pitch deviation in the sub-scanning direction, causable by temperature change, can be reduced even if a scan lens made of resin is employed.

Further, in the above described example embodiments, the first scan lens is not required to employ a resin lens.

Further, in the above described example embodiments, the scanning optical system can include a focus mirror as described in JP-3337510-B (or JP-H06-123844-A).

In this case, similar to above described example embodiments, the conjugate point of the aperture is set at a given position with respect to a scan lens such as a long toroidal lens made of resin and set with the strongest power.

In the above described optical scanning apparatus, the beam pitch deviation on a target surface in a second direction such as the sub-scanning direction can be reduced, wherein a first direction corresponds to the main-scanning direction.

Further, in the above described example embodiments, the optical scanning apparatus is used for printers, but the optical scanning apparatus can be preferably used for image forming apparatuses other than printers. For example, the optical scanning apparatus can be preferably used for copiers, facsimile machines, or multi-functional apparatuses having at least two of such functions.

Further, in the above described example embodiments, color printers having four photoconductor drums are described as the image forming apparatuses, but not limited thereto. For example, color printers can further include a photoconductor drum for a supplemental color.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An optical scanning apparatus for scanning a target surface using a plurality of light beams simultaneously along a first direction of the target surface, the optical scanning apparatus comprising:

a light source having a plurality of light emitting elements to emit light beams;

an optical deflector to deflect the plurality of light beams coming from the light source;

an aperture member having an aperture disposed between the light source and the optical deflector; and a scanning optical system to guide the plurality of light beams deflected by the optical deflector to the target surface, the scanning optical system including a plurality of lenses, disposed after the optical deflector, a lens of the plurality of lenses having a strongest power in a second direction perpendicular to the first direction, wherein the plurality of light beams, corresponding to a plurality of scan lines on the target surface, deflected by the optical deflector intersect or contact each other at an optical face of the lens, and wherein a first conjugate point of light, emitted from the light source and passing an end portion in the long side direction of the lens, with respect to the aperture is set at a position on a path between the optical deflector and the optical face of the lens.

2. The optical scanning apparatus of claim 1,
wherein a second conjugate point of light, emitted from the light source and passing a center in a long side direction of the lens, with respect to the aperture is set at a position on a path between the optical face of the lens and the target surface.

3. The optical scanning apparatus of claim 1, wherein the lens has one optical face having the strongest power in the second direction.

4. The optical scanning apparatus of claim 1, further comprising a light flux splitter, disposed between the light source and the optical deflector, to split a light flux coming from the light source into a first light flux and a second light flux,
wherein a light-path length of the first light flux from the light source to the optical deflector and a light-path length of the second light flux from the light source to the optical deflector are different.

5. The optical scanning apparatus of claim 4, wherein the scanning optical system guides the first light flux and the second light flux to different target surfaces.

6. The optical scanning apparatus of claim 4, further wherein the aperture member is disposed between the light source and the light flux splitter.

7. The optical scanning apparatus of claim 4, wherein the scanning optical system includes a first scanning optical system through which the first light flux passes and a second scanning optical system through which the second light flux passes,
wherein a scan lens of the first scanning optical system and a scan lens of the second scanning optical system have the same property.

8. The optical scanning apparatus of claim 1, wherein the light source is a surface emitting laser array.

9. An image forming apparatus, comprising:
a photoconductor to carry an image thereon; and
the optical scanning apparatus of claim 1 to scan a photoconductor using light beams.

* * * * *